(12) United States Patent
Shirasaki et al.

(10) Patent No.: US 6,341,176 B1
(45) Date of Patent: *Jan. 22, 2002

(54) METHOD AND APPARATUS FOR CHARACTER RECOGNITION

(75) Inventors: Yasuyo Shirasaki, Tokyo; Tomoko Tanabe, Kawasaki; Chuichi Kikuchi, Ichikawa, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,155

(22) Filed: Nov. 13, 1997

(30) Foreign Application Priority Data

Nov. 20, 1996 (JP) .............................................. 8-308961
Sep. 10, 1997 (JP) .............................................. 9-245039

(51) Int. Cl.⁷ .............................. G06K 9/72; G06K 9/03
(52) U.S. Cl. ....................................... 382/229; 382/310
(58) Field of Search ................................ 382/309, 229, 382/161, 176, 197, 310

(56) References Cited

U.S. PATENT DOCUMENTS

| | | | | |
|---|---|---|---|---|
| 4,589,142 A | * | 5/1986 | Bednar .......................... | 382/37 |
| 4,979,227 A | * | 12/1990 | Mittelbach et al. ........... | 382/40 |
| 4,985,863 A | * | 1/1991 | Fujisawa et al. ............. | 364/900 |
| 5,131,053 A | * | 7/1992 | Bernzott et al. .............. | 382/9 |
| 5,133,023 A | * | 7/1992 | Bokser ......................... | 382/40 |
| 5,321,770 A | * | 6/1994 | Huttenlocher et al. ........ | 382/22 |
| 5,325,444 A | * | 6/1994 | Cass et al. ..................... | 382/9 |
| 5,359,673 A | * | 10/1994 | De La Beaujardiere ...... | 382/40 |
| 5,369,714 A | * | 11/1994 | Withgott et al. ............. | 382/229 |
| 5,377,280 A | * | 12/1994 | Nakayama .................... | 382/17 |
| 5,436,983 A | * | 7/1995 | Berznott et al. ............. | 382/229 |
| 5,438,628 A | * | 8/1995 | Spitz et al. .................. | 382/181 |
| 5,448,692 A | * | 9/1995 | Ohta ........................... | 395/147 |
| 5,524,066 A | * | 6/1996 | Kaplan et al. ............... | 382/229 |
| 5,526,443 A | * | 6/1996 | Nakayama .................... | 382/229 |
| 5,642,435 A | * | 6/1997 | Loris ........................... | 382/229 |
| 5,717,794 A | * | 2/1998 | Koga et al. .................. | 382/309 |
| 5,745,602 A | * | 4/1998 | Chen et al. .................. | 382/229 |
| 5,757,983 A | * | 5/1998 | Kawaguchi et al. ......... | 382/305 |
| 5,764,799 A | * | 6/1998 | Hong et al .................. | 382/225 |
| 5,825,926 A | * | 10/1998 | Tanaka ........................ | 382/229 |
| 5,825,943 A | * | 10/1998 | DeVito et al. ............... | 382/306 |
| 5,850,480 A | * | 12/1998 | Scanlon ....................... | 382/229 |
| 5,860,075 A | * | 1/1999 | Hashizume et al. ......... | 707/530 |
| 5,875,263 A | * | 2/1999 | Froessl ........................ | 382/181 |
| 5,892,842 A | * | 4/1999 | Bloomberg .................. | 382/173 |

OTHER PUBLICATIONS

Malyan R Et Al: "Handprinted text reader that learns by experience", Microprocessors and Microsystems, Sep. 1986, UK, vol. 10, No. 7, ISSN 0141–9331, pp. 377–385, XP002063714.

Anigbogu J C: "Application of Hidden Markov Models to Multifont Text recognition", 1st Int. Conf. on Document Analysis and Recognition, Sep. 30, 1991—Oct. 2, 1991, Los Alamitos, CA, US, pp. 785–793, XP000431220.

* cited by examiner

*Primary Examiner*—Amelia M. Au
*Assistant Examiner*—Martin Miller
(74) *Attorney, Agent, or Firm*—Israel Gopstein

(57) ABSTRACT

A character recognizing apparatus has a post-processing unit which makes character strings including a plurality of conversion candidates, respectively, made by a character recognizing unit, and a full text searching unit performs a full text search for the character strings in a plurality of documents having been converted into text data, whereby the post-processing unit determines a correct character on the basis of results of the search to correct misrecognition.

68 Claims, 40 Drawing Sheets

FIG. 3
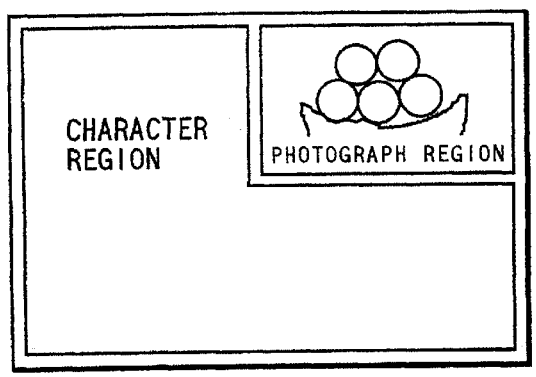
FIG. 4
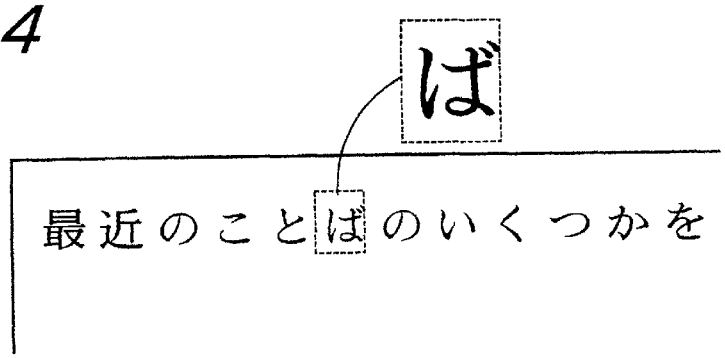
FIG. 5
| CHAR-ACTER | CONVERSION CANDIDATE 1 | | CONVERSION CANDIDATE 2 | | . . | | CONVERSION CANDIDATE N | |
|---|---|---|---|---|---|---|---|---|
| | CHAR-ACTER | EVALUA-TION VALUE | CHAR-ACTER | EVALUA-TION VALUE | | | CHAR-ACTER | EVALUA-TION VALUE |
| 1ST : MTH | | | | | | | | |

FIG. 6

| CHARAC-TER | CONVERSION CANDIDATE 1 | | CONVERSION CANDIDATE 2 | | CONVERSION CANDIDATE 3 | | CONVERSION CANDIDATE 4 | |
|---|---|---|---|---|---|---|---|---|
| 1TH | 最 | 0.910 | 届 | 0.709 | 接 | 0.483 | 島 | 0.461 |
| 2ND | 近 | 0.891 | 五 | 0.194 | 迷 | 0.059 | 立 | 0.057 |
| 3RD | の | 0.569 | c | 0.133 | 刃 | 0.124 | 目 | 0.122 |
| 4TH | こ | 0.795 | り | 0.165 | 苓 | 0.102 | じ | 0.081 |
| 5TH | と | 0.763 | 土 | 0.188 | i | 0.162 | 左 | 0.106 |
| 6TH | ぽ | 0.978 | ぽ | 0.924 | ば | 0.600 | は | 0.554 |
| 7TH | の | 0.824 | め | 0.105 | 刃 | 0.065 | 均 | 0.062 |
| 8TH | い | 0.731 | ぃ | 0.698 | け | 0.166 | ら | 0.163 |
| ⋮ MTH | | | | | | | | |

FIG. 7

| CHARAC-TER | CONVERSION CANDIDATE 1 | | CONVERSION CANDIDATE 2 | | CONVERSION CANDIDATE 3 | | CONVERSION CANDIDATE 4 | |
|---|---|---|---|---|---|---|---|---|
| 1TH | 最 | 0.910 | 届 | 0.709 | 接 | 0.483 | 島 | 0.461 |
| 2ND | 近 | 0.891 | 五 | 0.194 | 迷 | 0.059 | 立 | 0.057 |
| 3RD | の | 0.569 | c | 0.133 | 刃 | 0.124 | 目 | 0.122 |
| 4TH | こ | 0.795 | り | 0.165 | 苓 | 0.102 | じ | 0.081 |
| 5TH | と | 0.763 | 土 | 0.188 | i | 0.162 | 左 | 0.106 |
| 6TH | ぽ | 0.978 | ぽ | 0.924 | ば | 0.600 | は | 0.554 |
| 7TH | の | 0.824 | め | 0.105 | 刃 | 0.065 | 均 | 0.062 |
| 8TH | い | 0.731 | ぃ | 0.698 | け | 0.166 | ら | 0.163 |
| ⋮ MTH | | | | | | | | |

FIG. 8

| SEARCH | SEARCH CHARACTER STRING | SEARCH RESULT |
|---|---|---|
| 1ST (CONVERSION CANDIDATE 1) | 最近の | 400 |
| 2ND (CONVERSION CANDIDATE 2) | 届近の | 6 |

FIG. 15

| SEARCH | SEARCH CHARACTER STRING | RESULT 1 | RESULT 2 |
|---|---|---|---|
| CONVERSION CANDIDATE 1 | とぼの | 0 | 98 |
| CONVERSION CANDIDATE 2 | とぼの | 1 | 89 |
| CONVERSION CANDIDATE 3 | とばの | 5 | 107 |

| REGION | SEARCH CONDITION | SEARCH RESULT |
|---|---|---|
| 1→2 | こと | 859 |
| 1→3 | こ雑 | 37 |
| 2→3 | 複雑 | 732 |
| 2→1 | 複最 | 12 |
| 3→1 | 。最 | 465 |
| 3→2 | 。と | 372 |

| CHARAC-TER | CONVERSION CANDIDATE 1 | CONVERSION CANDIDATE 2 | .. | CONVERSION CANDIDATE N |
|---|---|---|---|---|
| 1TH | | | | |
| : MTH | | | | |

FIG. 27

| CHARAC-TER | CONVERSION CANDIDATE CHARACTER 1 | CONVERSION CANDIDATE CHARACTER 2 | CONVERSION CANDIDATE CHARACTER 3 | CONVERSION CANDIDATE CHARACTER 4 |
|---|---|---|---|---|
| 1TH | 最 | 届 | | |
| 2ND | 近 | 五 | 迷 | |
| 3RD | の | c | | |
| 4TH | こ | り | 苓 | |
| 5TH | と | 土 | i | 左 |
| 6TH | ぽ | ぽ | ば | は |
| 7TH | の | め | 刃 | |
| 8TH | い | い | | |
| : MTH | | | | |

FIG. 28A

| SEARCH | SEARCH CHARACTER STRING | SEARCH RESULT |
|---|---|---|
| 1ST | 最近 | 400 |
| 2ND | 届近 | 0 |
| 3RD | 最五 | 0 |
| 4TH | 届五 | 0 |
| 5TH | 最迷 | 0 |
| 6TH | 届迷 | 0 |

FIG. 28B

| SEARCH | SEARCH CHARACTER STRING | SEARCH RESULT |
|---|---|---|
| 1ST | 最近の | 230 |
| 2ND | 最近c | 2 |

FIG. 28C

| SEARCH | SEARCH CHARACTER STRING | SEARCH RESULT |
|---|---|---|
| 1ST | 近のこ | 46 |
| 2ND | 近のり | 20 |
| 3RD | 近の苓 | 3 |

FIG. 31

| ATTRIBUTE / RECORD NO. | DATA | WRITER | MODE (HAND-WRITTEN, PRINTED) | KIND | MAIN BODY |
|---|---|---|---|---|---|
| 1 | 1991/03/01 | TARO MATSUSHITA | HAND-WRITTEN | REPORT | 本報告書は |
| 2 | 1991/04/01 | ICHIRO MATSUSHITA | HAND-WRITTEN | PAPER | はじめに... |
| 3 | 1992/03/23 | ICHIRO MATSUSHITA | PRINTED | REPORT | 最近の..... |
| 4 | 1992/03/24 | TARO MATSUSHITA | PRINTED | PAPER | 文字認識... |
| 5 | 1992/04/01 | TARO MATSUSHITA | HAND-WRITTEN | PAPER | ... |
| 6 | 1992/04/02 | TARO MATSUSHITA | PRINTED | PAPER | ... |
| 7 | 1992/04/03 | ICHIRO MATSUSHITA | PRINTED | PAPER | ... |
| 8 | 1992/05/10 | JIRO MATSUSHITA | HAND-WRITTEN | REPORT | ... |
| 9 | 1992/05/23 | TARO MATSUSHITA | HAND-WRITTEN | PAPER | ... |
| : | | | | | |

FIG. 35

| RECORD NO. | MISRECOGNITION CHARACTER STRING | CORRECT CHARACTER STRING |
|---|---|---|
| 1 | 届近の | 最近の |
| 2 | ことぼ | ことば |
| : | | |

１９９７年度第１回営業会議議事録

1，日　時　　平成９年４月３日（木）　午後１時～５時
2，場　所　　本社第２会議室
3，出席者　　本社　取締役営業部長
　　　　　　　　　業務課長
　　　　　　　　　営業推進課長
　　　　　　支社　各支社長
　　　　　　　　　各営業所長
4，議　題　　①１９９７年度売上げ目標設定の件
　　　　　　②新年度所長評価基準についての説明
　　　　　　③採用について
5，決定事項
　　　　　①今年度売上げ１０％増を最低目標ラインとして、各支社・営業所ごとの
　　　　　　目標数値をまとめ、４月２５日までに本社業務課まで提出のこと。
　　　　　②売上げアップ率２０ポイント、利益率アップ３０ポイント、売上げ高グ
　　　　　　ロス６０ポイントの配分でボーナスを査定する。
　　　　　③各支社において年間６人の中途採用者を獲得すること。
　　　　　　　　　　　　　　　　　　　　　　　　　　　　　　　　　以上
6，今後の予定
　　　　　　各支社、営業所の目標売上げ額が決定後、５月９日に第２回営業会議を
　　　　　開催。場所は本社第１会議室とする。

|  | X1 | Y1 | X2 | Y2 |  |
|---|---|---|---|---|---|
| CHARACTER REGION 1 | 5 | 5 | 100 | 80 | NULL |
| CHARACTER REGION 2 | 5 | 80 | 150 | 240 | NULL |
| GRAPHIC REGION | 103 | 4 | 150 | 75 | zu1.bmp |

|  | X1 | X2 | Y1 | Y2 | FONT |
|---|---|---|---|---|---|
| 1ST CHARACTER | 2 | 7 | 5 | 10 | GOTHIC |
| 2ND CHARACTER | 9 | 14 | 5 | 10 | GOTHIC |
| 3RD CHARACTER | 16 | 21 | 5 | 10 | GOTHIC |
| : |  |  |  |  | GOTHIC |
| 6TH CHARACTER | 37 | 42 | 6 | 11 | GOTHIC |
| : | : | : | : | : |  |

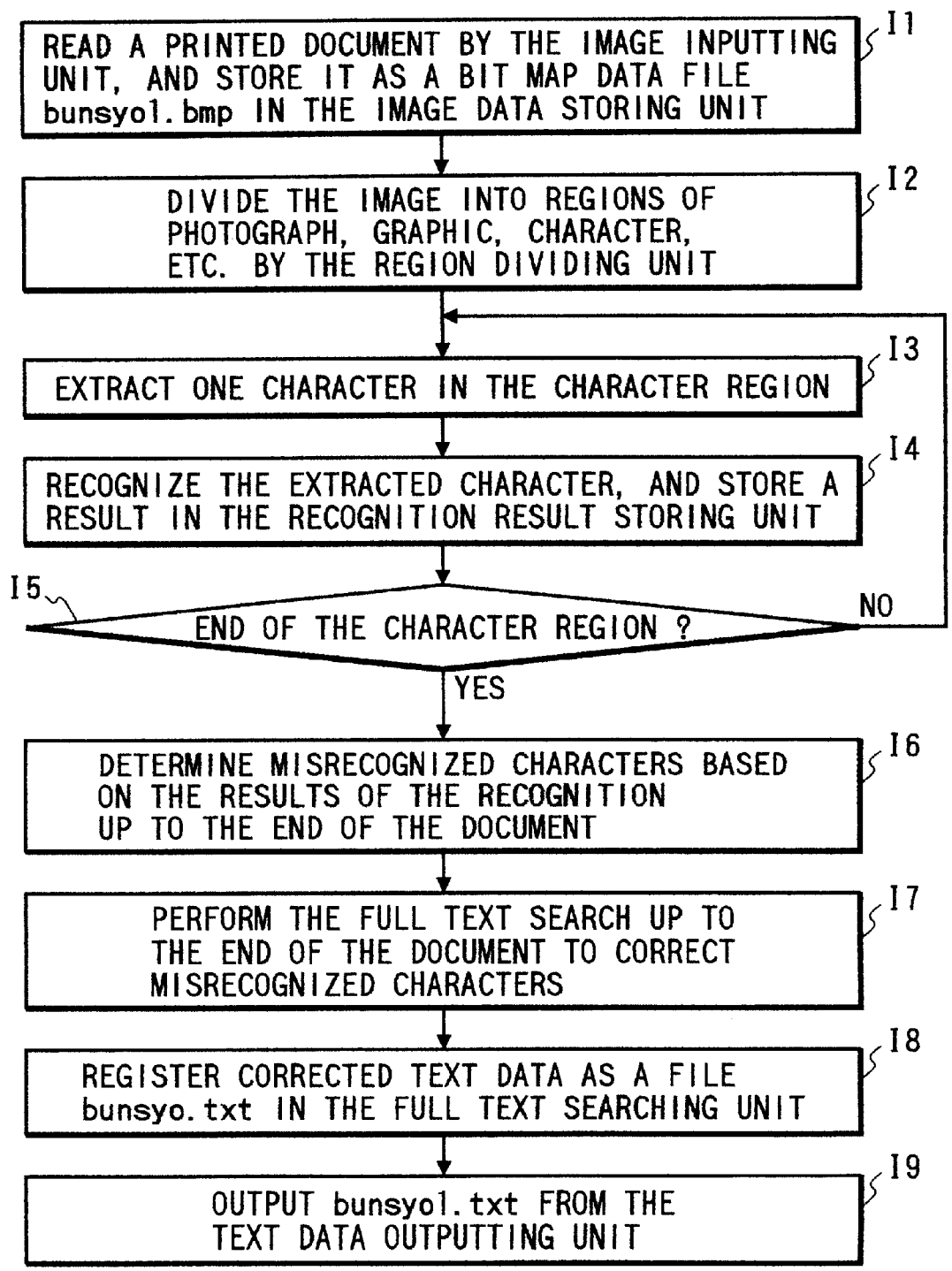

FIG. 43

Currently, we are confronted with
such global environmental problems
as global warming, depletion of the
ozone layer, exhaustion of resources,
and acid rain. As a global corporate

FIG. 44

Curre*n*tly, we are conf*r*onted with
such glob*a*l environmental problems
as global warmin*g*, depletion of the
ozone layer, exhaustion of resources,
and acid rain. As a global corporate

○ : MISRECOGNIZED
CHARACTER

| SEARCH CHARACTER STRING |
|---|
| □Currently,□ |
| □confronted□ |
| □global□ |
| □warning,□ |

□ : SPACE

METHOD AND APPARATUS FOR CHARACTER RECOGNITION

BACKGROUND OF THE INVENTION (1) Field of the Invention

The present invention relates to a method and an apparatus for character recognition used when a document such as a printed document, a hand-written document or the like, which is not converted into text data, is converted into text data.

(2) Related Art

There is a certain type of a character recognizing apparatus for converting a printed document or a hand-written document into text data, into which a post-processing is introduced to propose a plurality of candidate characters if the apparatus cannot accurately recognize a character in the document so as to determine a correct character among the plural candidate characters, whereby a rate of recognition is improved.

FIG. 45 is a block diagram showing a general character recognizing apparatus. Now, an operation of the general character recognizing apparatus will be described with reference to FIG. 45. An image inputting unit 10 captures a paper document, and converts it into image data in a form of bit map. A region dividing unit 31 divides the image data into a character region and a region of picture, graphics or the like other than the character region.

A character extracting unit 32 extracts one character from the divided character region, and supplies it to a character recognizing unit 33. The character recognizing unit 33 recognizes the character to convert it into character data, and makes a plurality of conversion candidate characters. When a process of recognizing all characters in the character region is completed, a post-processing unit 34 morphologically analyzes a sentence configured with a combination of the conversion candidate characters.

Namely, the post-processing unit 34 requests a dictionary searching unit 20 to search for a word as a search condition. The dictionary searching unit 20 searches for the given word in a word dictionary 40, and replies as to whether or not there is the word in the word dictionary 40. The post-processing unit 34 outputs the word as a correct word if the word exists in the word dictionary 40.

The character recognizing apparatus corrects a character improperly recognized by the character recognizing unit 33, using the dictionary, as above.

However, the above character recognizing apparatus with the above structure requires enormous labor and time to make a dictionary such as the word dictionary, and maintenance thereof since the morphological analysis is carried out using the dictionary as a post-processing.

Further, the morphological analysis requires complex processes, a lot of time to configure and operate a system therefor, and tends to make a lot of mistakes if there exists an unrecognizable word in the document.

In the light of the above problems, an object of the present invention is to provide a method and an apparatus for character recognition, which can accurately correct misrecognition, and whose system can be configured readily and within a short period of time.

SUMMARY OF THE INVENTION

The object of the present invention is achieved by providing a character recognizing method, comprising the steps of:

recognizing an input character image indicating an input character of an input document as one or more conversion candidate characters denoting candidates for the input, character for each of input character images indicating input characters of the input document;

selecting a series of search character images indicating a series of search input characters from the series of input character images;

selecting a plurality of particular conversion candidate character strings respectively corresponding to the series of search character images from the particular conversion candidate characters;

preparing registered text data indicating one or more registered documents;

searching the registered text data for one particular conversion candidate character string for each of the particular conversion candidate character strings to count an occurrence frequency of the particular conversion candidate character string in the registered text data for each of the particular conversion candidate character strings;

selecting a specific particular conversion candidate character string corresponding to the highest occurrence frequency among those of the particular conversion candidate character strings from the particular conversion candidate character strings; and determining a series of specific particular conversion candidate characters composing the specific particular conversion candidate character string as a series of correct characters for the series of search character images.

The object of the present invention is also achieved by providing a character recognizing apparatus, comprising:

character recognizing means for recognizing an input character image indicating an input character of an input document as one or more conversion candidate characters denoting candidates for the input character for each of input character images indicating input characters of the input document, selecting a series of search character images indicating a series of search input characters from the series of input character images and selecting a plurality of particular conversion candidate character strings respectively corresponding to the series of search character images from the particular conversion candidate characters;

registered text data storing means for storing registered text data indicating one or more registered documents;

full text searching means for searching the registered text data stored by the registered text data storing means for one particular conversion candidate character string for each of the-particular conversion candidate character strings recognized by the character recognizing means to count an occurrence frequency of the particular conversion candidate character string in the registered text data for each of the particular conversion candidate character strings;

post-processing means for selecting a specific particular conversion candidate character string corresponding to the highest occurrence frequency among those of the particular conversion candidate character strings counted by the full text searching means from the particular conversion candidate character strings recognized by the character recognizing means and determining a series of specific particular conversion candidate characters composing the specific particular conversion candidate character string as a series of correct characters for the series of search character images; and registered text data outputting means for outputting the series of correct characters determined by the post-processing means as the series of search character images.

In the above steps and configuration, under circumstances where a character recognition cannot be correctly performed, an input character image indicating an input character is recognized as one or more conversion candidate characters for each of input character images indicating input characters. The conversion candidate characters denote candidates for the input character. Thereafter, a series of search character images is selected from the input character images, and a plurality of particular conversion candidate character strings respectively corresponding to the series of search character images are produced from the particular conversion candidate characters by repeatedly selecting the series of particular conversion candidate characters corresponding to the series of search character images. Thereafter, the registered text data indicating one or more registered documents is searched for each particular conversion candidate character string. Therefore, an occurrence frequency of each particular conversion candidate character string in the registered text data can be counted. Thereafter, a specific particular conversion candidate character string corresponding to the highest occurrence frequency is selected, and a series of specific particular conversion candidate characters composing the specific particular conversion candidate character string is determined as a series of correct characters. Therefore, the series of search character images can be correctly recognized as the series of correct characters.

Accordingly, because the invention searches registered text data for each particular conversion candidate character string to count an occurrence frequency of each particular conversion candidate character string in the registered text data and to select the specific particular conversion candidate character string corresponding to the highest occurrence frequency, it is unnecessary to prepare a dictionary such as a word dictionary requiring a lot of labor, time and maintenance, and it is unnecessary to perform a morphological analysis requiring a lot of time to configure a conventional character recognizing apparatus or perform a conventional character recognizing method in order to conduct complex processes, although tending to make a lot of mistakes. As a result, it is possible to readily configure the character recognizing apparatus, and correctly recognize characters within a short period.

Also, because the invention performs a full text search rather than a keyword search, segmentation of a series of search input characters is not restricted by the concept of a word, a sentence, a clause or the like, and the series of search input characters can be freely set. It is therefore possible to desirably set a speed or an accuracy of the post processing at need.

The object of the present invention is further achieved by the provision of a character recognizing method, comprising the steps of:

recognizing an input character image indicating an input character of an input document as one or more conversion candidate characters denoting candidates for the input character for each of input character images indicating input characters of the input document;

calculating an evaluation value indicating a degree of certainty of one conversion candidate character for each of the conversion candidate characters corresponding to the input character images;

selecting one or more particular conversion candidate characters corresponding to the evaluation values higher than those of the other conversion candidate characters from the conversion candidate characters corresponding to one input character image for each of the input character images;

selecting a series of search character images indicating a series of search input characters from the series of input character images;

selecting a plurality of particular conversion candidate character strings respectively corresponding to the series of search character images from the particular conversion candidate characters;

preparing registered text data indicating one or more registered documents;

searching the registered text data for one particular conversion candidate character string for each of the particular conversion candidate character strings to select a specific particular conversion candidate character string frequently occurred in the registered text data from the particular conversion candidate character strings; and determining a series of specific particular conversion candidate characters composing the specific particular conversion candidate character string as a series of correct characters for the series of search character images.

The object of the present invention is also achieved by providing a character recognizing apparatus, comprising:

character recognizing means for recognizing an input character image indicating an input character of an input document as one or more conversion candidate characters denoting candidates for the input character for each of input character images indicating input characters of the input document, calculating an evaluation value indicating a degree of certainty of one conversion candidate character for each of the conversion candidate characters corresponding to the input character images, selecting one or more particular conversion candidate characters corresponding to the evaluation values higher than those of the other conversion candidate characters from the conversion candidate characters corresponding to one input character image for each of the input character images, selecting a series of search character images indicating a series of search input characters from the series of input character images and selecting a plurality of particular conversion candidate character strings respectively corresponding to the series of search character images from the particular conversion candidate characters;

registered text data storing means for storing registered text data indicating one or more registered documents;

fill text searching means for searching the registered text data stored by the registered text data storing means for one particular conversion candidate character string for each of the particular conversion candidate character strings produced by the character recognizing means to obtain a full text search result;

post-processing means for selecting a specific particular conversion candidate character string frequently occurred in the registered text data from the particular conversion candidate character strings according to the full text search result obtained by the full text searching means and determining a series of specific particular conversion candidate characters composing the specific particular conversion candidate character string as a series of correct characters for the series of search character images; and registered text data outputting means for outputting the series of correct characters determined by the post-processing means as the series of search character images.

In the above steps and configuration, an evaluation value indicating a degree of certainty of one conversion candidate character is calculated for each of the conversion candidate characters, and one or more particular conversion candidate characters corresponding to the evaluation values higher than those of the other conversion candidate characters are selected from the conversion candidate characters for each of the input character images. Thereafter, the registered text data is searched for each particular conversion candidate character string, a specific particular conversion candidate character string frequently occurred in the registered text data is selected from the particular conversion candidate character strings, and a series of specific particular conversion candidate characters composing the specific particular conversion candidate character string is determined as a series of correct characters. Therefore, the series of search character images can be correctly recognized as the series of correct characters.

Accordingly, because the invention calculates an evaluation value of one conversion candidate character for each of the conversion candidate characters to select one or more particular conversion candidate characters corresponding to the higher evaluation values from the conversion candidate characters for each of the input character images, the number of particular conversion candidate character strings can be reduced, and a time required for a full text searching operation can be reduced. Also, because a specific particular conversion candidate character string frequently occurred in the registered text data is selected from the particular conversion candidate character strings, it is unnecessary to prepare a dictionary such as a word dictionary requiring a significant amount of labor, time and maintenance, and it is unnecessary to perform a morphological analysis requiring a significant amount of time to configure a conventional character recognizing apparatus or perform a conventional character recognizing method in order to conduct complex processes, although tending to make a lot of mistakes. As a result, it is possible to readily configure the character recognizing apparatus, and to correct misrecognized characters within a short period.

Preferably, the step of searching the registered text data comprises the step of searching the registered text data and the input document for one particular conversion candidate character string for each of the particular conversion candidate character strings to count an occurrence frequency of the particular conversion candidate character string in the registered text data and the input document for each of the particular conversion candidate character strings.

In accordance with the invention, it is also preferred that the step of searching the registered text data comprise the step of searching the registered text data and the input document for one particular conversion candidate character string for each of the particular conversion candidate character strings to select a specific particular conversion candidate character string frequently occurred in the registered text data and the input document from the particular conversion candidate character strings.

In accordance with the invention, it is further preferred that the step of searching the registered text data comprise the steps of:

searching the registered text data for one particular conversion candidate character string for each of the particular conversion candidate character strings to count a first occurrence frequency of the particular conversion candidate character string in the registered text data for each of the particular conversion candidate character strings;

determining a threshold value lower than the highest first occurrence frequency by a prescribed value;

selecting one or more first selected conversion candidate character strings corresponding to the first occurrence frequencies equal to or higher than the threshold value among those of the particular conversion candidate character strings from the particular conversion candidate character strings;

searching the input document for one first selected conversion candidate character string for each of the first selected conversion candidate character strings to count a second occurrence frequency of the first selected conversion candidate character string in the input document for each of the first selected conversion candidate character strings; and selecting a specific particular conversion candidate character string corresponding to the highest second occurrence frequency among those of the first selected conversion candidate character strings from the first selected conversion candidate character strings.

In the above steps, because the input document itself is used for a full text searching operation, tendency of the input document such as words, grammar and the like used in the input document can be reflected upon correctly recognizing characters, and an unregistered word not registered in any registered documents can be searched since the unregistered word very likely appears in its own document. Therefore, a rate of character recognition can be improved.

In accordance with the invention, it is preferred that the step of recognizing an input character image include the steps of:

determining a character image position of each input character image in the input document; and extracting each input character image from the input document according to the character image position, and that the step of calculating an evaluation value include the steps of:

again determining a second character image position of the input character image in cases where all evaluation values of the conversion candidate characters corresponding to the input character image supposed to be placed at the first character image position are lower than a threshold value and again extracting the input character image supposed to be placed at the second character image position from the input document, again recognizing the input character image placed at the second character image position as one or more conversion candidate characters; and again calculating an evaluation value of each conversion candidate character corresponding to the input character image placed at the second character image position.

In the above steps, in cases where all evaluation values of the conversion candidate characters corresponding to the input character image placed at the second character image position are lower than a threshold value, it is judged that the input character image placed at the second character image position is extracted from the input document according to the character image position not correctly indicating a position thereof. Therefore, the input character image placed at the second character image position is again extracted from the input document according to the character image position thereof, is recognized as one or more conversion candidate characters, and an evaluation value of each conversion candidate character is again calculated.

Accordingly, even though an input character image is incorrectly extracted from the input document, the input character image can be again extracted from the input document, so that a rate of character recognition can be improved.

In accordance with the invention, it is preferred that:

the step of recognizing an input character image includes the steps of specifying a plurality of character regions existing in the input document; and extracting each of the input character images from the character regions; that the step of selecting a series of search character images includes the step of combining one or a series of particular input character images extracted from a final portion of one character region and one or a series of particular input character images extracted from a top portion of another character region into the series of search character images, for each pair of character regions, and that the step of determining a series of specific particular conversion candidate characters includes the step of coupling a first character region and a second character region together in that order, in cases where one particular conversion candidate character string corresponding to one series of search character images obtained by combining one or a series of particular input character images extracted from a final portion of the first character region and one or a series of particular input character images extracted from a top portion of the second character region is selected as one specific particular conversion candidate character string, for each specific particular conversion candidate character string.

In accordance with the invention, it is also preferred that the character recognizing apparatus further comprise:

character extracting means for specifying a plurality of character regions existing in the input document and extracting each of the input character images from the character regions, wherein one or a series of particular input character images extracted from a final portion of one character region and one or a series of particular input character images extracted from a top portion of another character region are combined into the series of search character images by the character recognizing means, for each pair of character regions; and region coupling means for coupling a first character region and a second character region extracted by the character extracting means together in that order, in cases where one particular conversion candidate character string corresponding to one series of search character images obtained by combining one or a series of particular input character images extracted from a final portion of the first character region and one or a series of particular input character images extracted from a top portion of the second character region is selected as one specific particular conversion candidate character string by the post-processing means, for each specific particular conversion candidate character string.

In the above steps and configuration, even though a character area of the input document is divided into a plurality of character regions, because a first character region and a second character region are coupled together in that order in cases where one particular conversion candidate character string corresponding to one series of search character images obtained by combining one or a series of particular input character images extracted from a final portion of the first character region and one or a series of particular input character images extracted from a top portion of the second character region is selected as one specific particular conversion candidate character string, the character regions can be coupled together in a correct order.

In accordance with the invention, it is preferred that the step of searching the registered text data comprise the steps of selecting a plurality of shortened conversion candidate character strings corresponding to a series of search character images from the particular conversion candidate character strings;

searching the registered text data for one shortened conversion candidate character string for each of the shortened conversion candidate character strings to count an occurrence frequency of the shortened conversion candidate character string in the registered text data for each of the shortened conversion candidate character strings;

selecting a specific shortened conversion candidate character string corresponding to the highest occurrence frequency along those of the shortened conversion candidate character strings from the shortened conversion candidate character strings;

producing a plurality of particular conversion candidate character strings respectively including the specific shortened conversion candidate character string and corresponding to the series of search character images; and searching the registered text data for each particular conversion candidate character string to count an occurrence frequency of each particular conversion candidate character string in the registered text data.

In the above steps, because the invention permits a full text searching operation for each shortened conversion candidate character string to be performed before a full text searching operation for each particular conversion candidate character string is performed, a time required for the full text searching operation can be shortened, and characters can be correctly recognized at a short time.

In accordance with the invention, it is preferred that the step of recognizing an input character image include the step of specifying an input attribute of the input document, that the step of preparing registered text data includes the step of classifying the registered text data into the plurality of registered documents respectively specified by a registered attribute, and that the step of searching the registered text data comprises the steps of selecting one or more particular registered documents respectively specified by the registered attribute, which is the same as the input attribute of the input document, from the registered documents; and searching the particular registered documents for one particular conversion candidate character string for each of the particular conversion candidate character strings to count an occurrence frequency of the particular conversion candidate character string in the registered text data for each of the particular conversion candidate character strings.

In accordance with the invention, it is also preferred that the step of recognizing an input character image include the step of specifying an input attribute of the input document, that the step of preparing registered text data includes the step of classifying the registered text data into the plurality of registered documents respectively specified by a registered attribute, and that the step of searching the registered text data comprises the steps of selecting one or more particular registered documents respectively specified by the registered attribute, which is the same as the input attribute of the input document, from the registered documents; and searching the particular registered documents for one particular conversion candidate character string for each of the particular conversion candidate character strings to select a specific particular conversion candidate character string frequently occurred in the registered text data from the particular conversion candidate character strings.

In the above steps, because the invention searches particular registered documents, having the same attribute as that of the input document, for each particular conversion candidate character string, a character recognition reflecting upon an attribute of the input document can be performed, and the character recognition can be more correctly performed.

It is preferred that the step of preparing registered text data include the step of preparing pieces of misrecognition data respectively composed of a misrecognized character string including a misrecognized character and a correct character string made of a plurality of correct characters, and that the step of searching the registered text data comprise the steps of searching the misrecognized character strings of the pieces of misrecognition data for one particular conversion candidate character string for each of the particular conversion candidate character strings;

recognizing the series of search character images as a series of correct characters composing a correct character string corresponding to one particular conversion candidate character string in the pieces of misrecognition data in cases where the particular conversion candidate character string exists in the misrecognized character strings; and searching the registered text data for one particular conversion candidate character string for each of the particular conversion candidate character strings, in cases where any particular conversion candidate character string does not exist in the misrecognized character strings, to count an occurrence frequency of the particular conversion candidate character string in the registered text data for each of the particular conversion candidate character strings.

In accordance with the invention, it is also preferred that the step of preparing registered text data include the step of preparing pieces of misrecognition data respectively composed of a misrecognized character string including a misrecognized character and a correct character string made of a plurality of correct characters, and that the step of searching the registered text data comprise the steps of searching the misrecognized character strings of the pieces of misrecognition data for one particular conversion candidate character string for each of the particular conversion candidate character strings;

recognizing the series of search character images as a series of correct characters composing a correct character string corresponding to one particular conversion candidate character string in the pieces of misrecognition data in cases where the particular conversion candidate character string exists in the misrecognized character strings; and searching the registered text data for one particular conversion candidate character string for each of the particular conversion candidate character strings, in cases where any particular conversion candidate character string does not exist in the misrecognized character strings, to select a specific particular conversion candidate character string frequently occurred in the registered text data from the particular conversion candidate character strings.

In the above steps, the misrecognized character strings of the pieces of misrecognition data are searched for each particular conversion candidate character string. In cases where one particular conversion candidate character string exists in the misrecognized character strings, the series of search character images is recognized as a series of correct characters composing a correct character string corresponding to the particular conversion candidate character string in the pieces of misrecognition data.

Accordingly, because the invention does not require a searching operation for the registered text data in cases where one particular conversion candidate character string exists in the misrecognized character strings, character recognition can be performed at a short time.

In accordance with the invention, it is preferred that the character recognizing apparatus further comprise layout storing means for storing an input layout of the input character images of the input document recognized by the character recognizing means; and displaying means for displaying a corrected document, which is obtained by replacing the series of search character images of the input document selected by the character recognizing means with the series of correct characters determined by the post-processing means, in the input layout of the input document stored by the layout storing means.

In the above configuration, input character images of the input document are changed to correct characters to obtain a correct document, and the correct document is displayed in the same layout as that of the input document.

Accordingly, the invention makes it possible to display the correct document in a layout looking like the input document, so that the user can see easily the correct document. In addition, because image data is not merely displayed but text data is displayed, it is possible to easily edit the correct document.

In accordance with the invention, it is preferred that the step of a series of search character images comprises the steps of detecting a series of particular input character images sandwiched by a pair of partition symbols from the series of input character images of the input document the input document; and setting the series of particular input character images as the series of search character images indicating the series of search input characters.

In the above steps, because a series of particular input character images sandwiched by a pair of partition symbols is set as the series of search character images, the series of search input characters indicated by the series of particular input character images has a meaning.

Accordingly, the invention makes it possible to recognize characters according to characteristics of a language used in the input document while avoiding a meaningless character string which is a part of a word.

BRIEF DESCRIPTION OF THE DRAWINGS

FIG. 3 shows image data used in the first embodiment;

FIG. 4 illustrates a process of extracting a character according to the first embodiment;

FIG. 5 shows a data structure of results of character recognition according to the first embodiment;

FIG. 6 shows an example of results of the character recognition according to the first embodiment;

FIG. 7 shows an example of results of a misrecognized character determining process according to the first embodiment;

FIG. 8 shows an example of results of a full text search according to the first embodiment;

FIG. 15 shows results of the full text search according to the second embodiment;

FIG. 26 shows a data structure of results of a character recognizing process according to the fifth embodiment;

FIG. 27 shows an example of results of the character recognizing process according to the fifth embodiment;

FIGS. 28A through 28C show an example of results of the full text search according to the fifth embodiment;

FIG. 31 shows a data structure of data in a text storing unit in the character recognizing apparatus according to the sixth embodiment;

FIG. 35 shows a data structure of misrecognition data according to the sixth embodiment;

FIG. 42 is a flowchart illustrating a whole process conducted by the character recognizing apparatus according to the ninth embodiment;

FIG. 43 shows an example of a printed document used in the ninth embodiment;

FIG. 44 shows an example of making a search condition according to the ninth embodiment.

DESCRIPTION OF PREFERRED EMBODIMENTS

Figure 1:
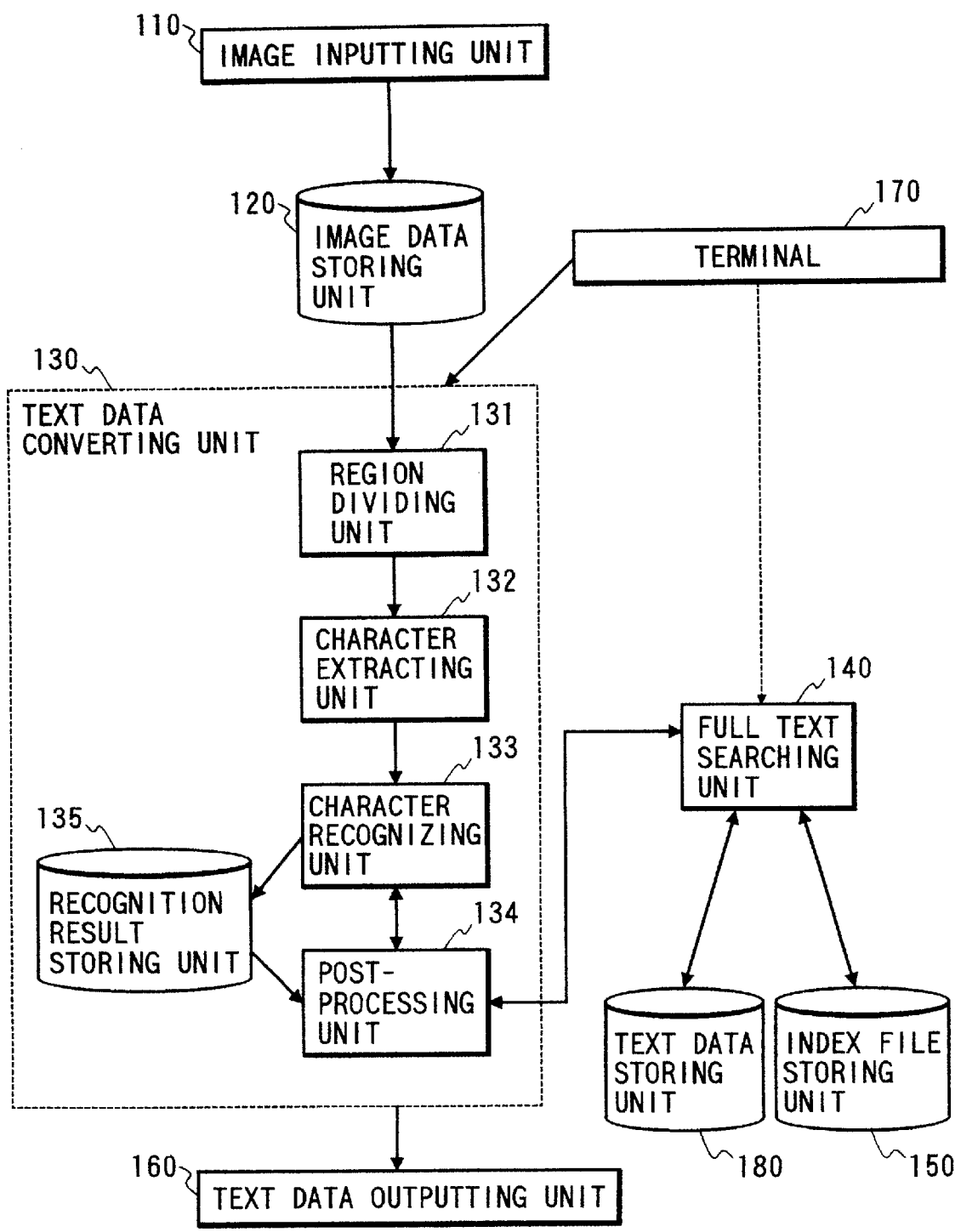
FIG. 1 is a block diagram showing a structure of a character recognizing apparatus according to a first embodiment of this invention.

Hereinafter, embodiments of the present invention will be described with reference to the accompanying drawings, wherein like reference characters designate like or corresponding parts throughout several views.

(a) Description of First Embodiment

Now, a first embodiment of this invention will be described with reference to FIGS. 1 through 11.

FIG. 1 is a block diagram showing a character recognizing apparatus according to the first embodiment of this invention.

In FIG. 1, reference numeral 110 denotes an image inputting unit such as a scanner, facsimile or the like for inputting a printed document, or a hand-written document as image data, 120 an image data storing unit for storing the image data read by the image inputting unit 110 in a form of bit map, 170 a terminal from which a user of the character recognizing apparatus inputs necessary information, or the apparatus outputs information, 130 a text data converting unit for converting the image data stored in the image data storing unit 120 into text data, 140 a full text searching unit having a searching unit for searching for a given character string as a search condition in full text of registered data in response to a request from the text data converting unit 130 and sending back the number of times of occurrence of the search condition in the entire data, and a registering unit for making an index file from document data having been converted into the text data and storing the document data in a form of file, 150 an index file storing unit for storing the index file made by the full text searching unit 140, 180 a text data storing unit for storing the document data registered in the full text searching unit 140 in a form of file, and 160 a text data outputting unit for outputting the document data having been converted into the text data.

The text data converting unit 130 includes a region dividing unit 131 for dividing the image data into regions having different attributes (character region, graphic region, photograph region, etc.), a character extracting unit 132 for extracting a character of the image data one by one from the image data in the character region among the regions divided by the region dividing unit 131, a character recognizing unit 133 for converting the image data extracted as the above character together with a numeral value indicating a degree of certainty of that image data, a post-processing unit 134 for correcting the misrecognition of the text data including misrecognition, which has been converted into the character data by the character recognizing unit 133, and a recognition result storing unit 135 for storing a result of the recognition obtained by the character recognizing unit 133.

Figure 2:
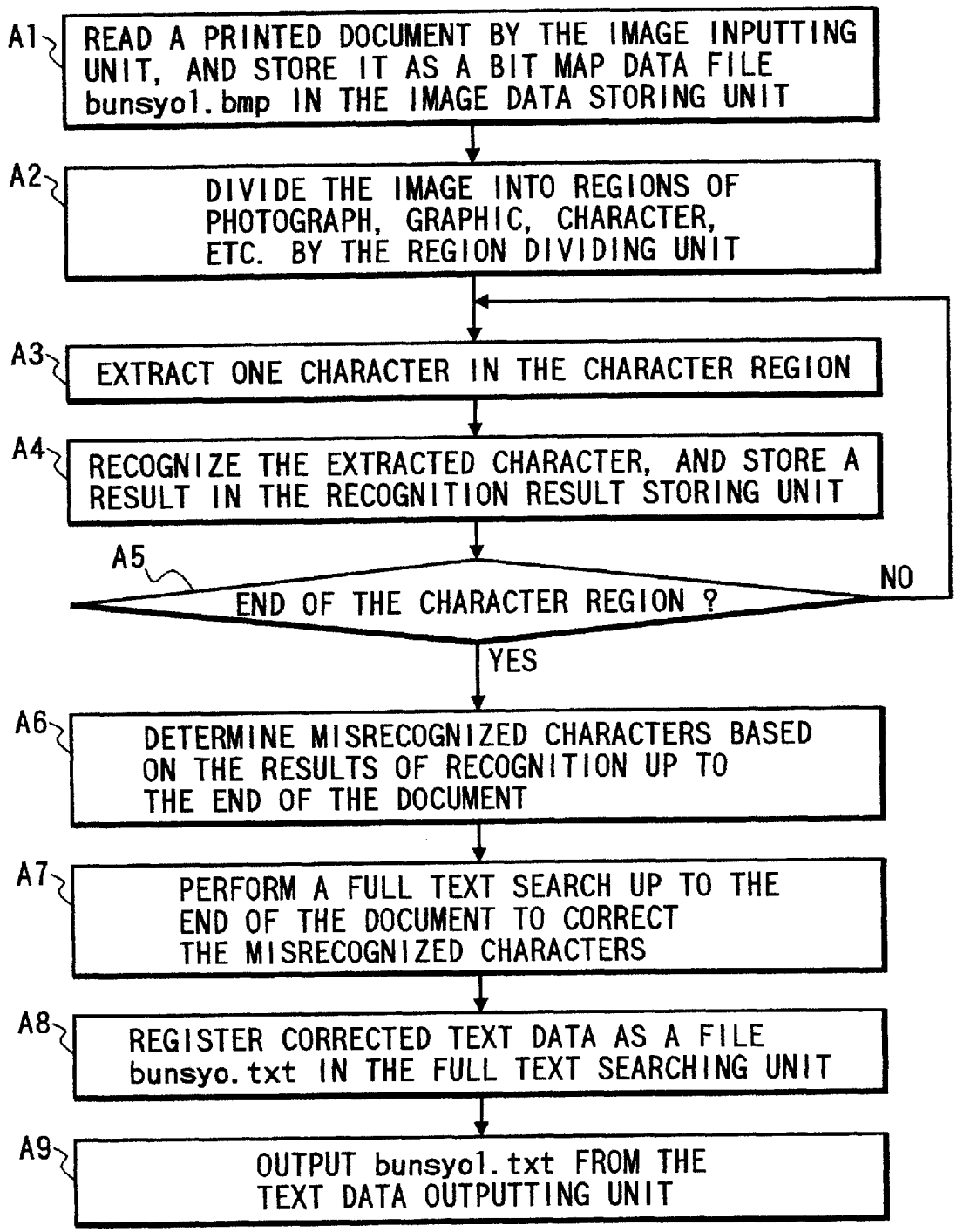
FIG. 2 is a flowchart illustrating a whole process conducted by the character recognizing apparatus according to the first embodiment.

Next, an operation of the character recognizing apparatus with the above structure will be described with reference to FIGS. 2 through 11. FIG. 2 is a flowchart for illustrating a flow of a whole process conducted by the character recognizing apparatus according to this embodiment, in the case where a printed document is used.

Assuming here that the printed document is of a size readable by the image inputting unit 110 in one operation, besides a character region in the printed document is not separated as shown in FIG. 3.

By the image inputting unit 110, the printed document is inputted as image data. After that, the inputted image data is given a unique name and stored in a form of file in the image data storing unit 120. Here, the file is given a name, for example, bunsyo1.bmp (Step A1).

Next, the user selects the image data file bunsyo1.bmp through the terminal 170, and gives an instruction to convert the image data into text data. Responsive to that, the text data converting unit 130 converts the designated image data into text data.

The text data converting unit 130 obtains the image data file (busho1.bmp) designated by the user from the image data storing unit 120. The region dividing unit 131 then divides the image data into different regions such as a photograph region, a graphic region, a character region and the like (Step A2), and sends position information of the character region to the character extracting unit 132.

The character extracting unit 132 determines a region of one character from, for example, spaces in the front and the rear of that character and extracts the character one by one from the beginning of the character region, and supplies information about a position of each of the characters to the character recognizing unit 133. For instance, the character extracting unit 132 extracts a region of a character of "насᵉ" as shown in FIG. 4, and supplies its position to the character recognizing unit 133 (Step A3).

The character recognizing unit 133 recognizes a character obtained from the position information supplied from the character extracting unit 132, and converts the character into character data. The character recognizing unit 133 generates a plurality of candidates for the character as a result of the recognition to make a conversion candidate characters. The character recognizing unit 133 expresses a degree of certainty of each of the conversion candidate characters by a numerical value (called an evaluation value), obtains evaluation values of all the conversion candidate characters, and outputs the conversion candidates in the order of the evaluation value. Conversion candidate characters and their respective evaluation values are stored in a form shown in FIG. 5 in the recognition result storing unit 135 (Step A4). Incidentally, in the drawings, M represents the number of characters in the character region, and N a maximum number of conversion candidate characters. The evaluation value can be calculated using a degree of analogy to a reference pattern, for example. Up to this process, determination of a character string shown in FIG. 4 results in as shown in FIG. 6, for example.

In a similar manner, the character extracting unit 132 conducts a similar process on the next character. The processes conducted by the character extracting unit 132 and the character recognizing unit 133 are repeated up to the last character in the character region (Step A5).

The post-processing unit 134 determines whether or not a conversion candidate 1 of the first character is misrecognized, and repeats this process on all characters of the text data stored in the recognition result storing unit 135.

Figure 9:
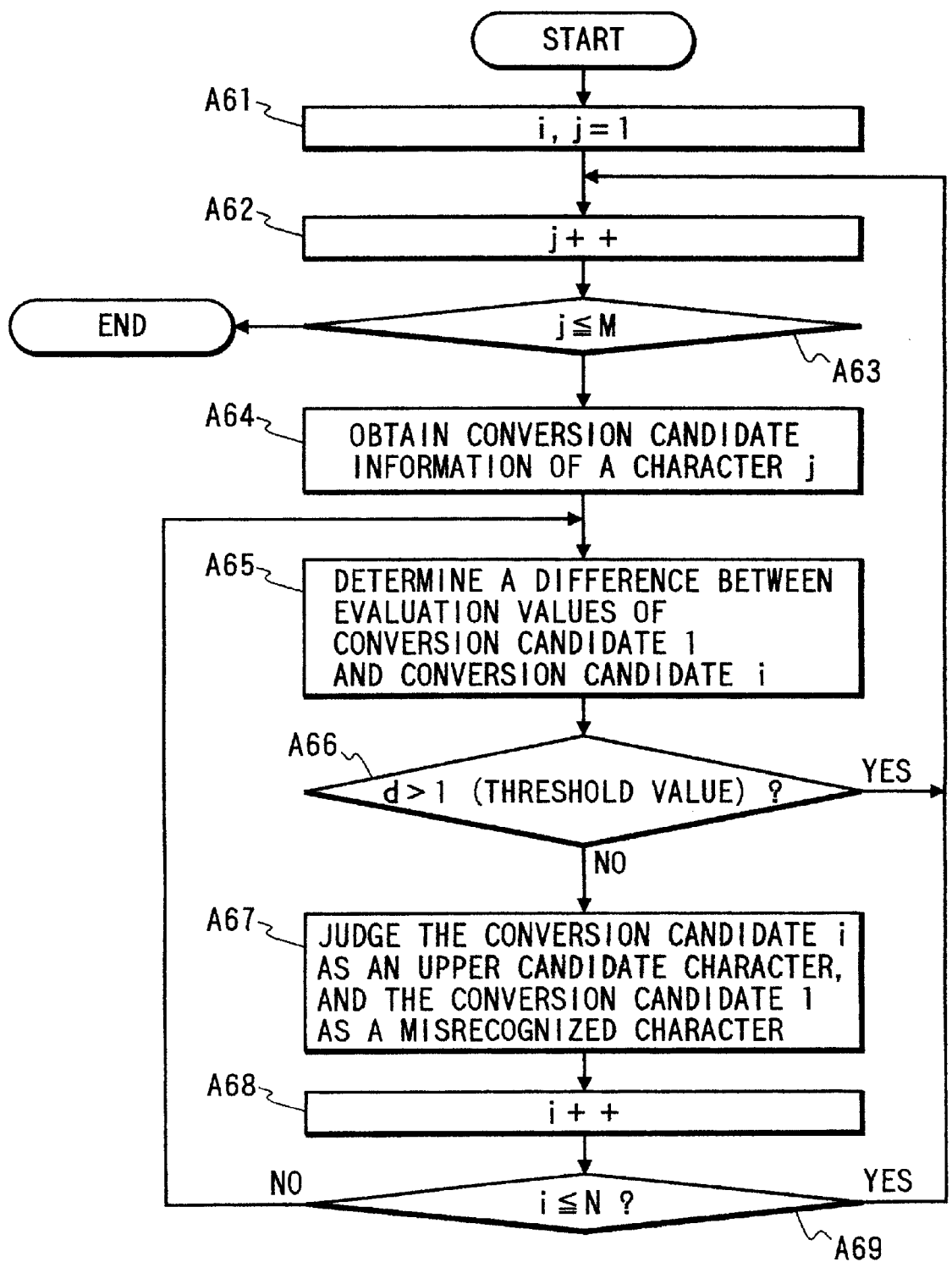
FIG. 9 is a flowchart illustrating a process of determining a misrecognized character according to the first embodiment.

FIG. 9 is a flowchart showing a flow of a process of determining misrecognition. Incidentally, in the drawings, i denotes a count of conversion candidate characters, j denotes a count of characters in the character region. The determination of misrecognition is carried out as follows. First, an evaluation value of the conversion candidate 1 is compared with an evaluation value of the conversion candidate 2, then the evaluation value of the conversion candidate 2 is compared with an evaluation value of the conversion candidate 3 and so on. If a difference d between the evaluation value of the conversion candidate 1 and the evaluation value of the conversion candidate 2 is below a threshold value, it is determined that the conversion candidate 2 is quite analogous to the conversion candidate 1, and the conversion candidate 2 is assigned as an upper conversion candidate character since the candidate character 2 is of a high probability that the candidate character 2 is correct.

At this time, the conversion candidate 1 having the upper conversion candidate character is judged as a misrecognized character. According to this method, a character in a circle is determined as an upper conversion candidate character and a character in a triangle is determined as a misrecognized character in FIG. 7, if the threshold value is set to 0.4 in the example shown in FIG. 6.

The present invention does not specify a method of judging candidate characters using a misrecognized character and upper conversion candidate characters. Therefore, it is alternatively possible that if there are a plurality of conversion candidate characters whose evaluation value are above a certain threshold value, all the conversion candidate characters are assigned as the upper conversion candidate character (Step A6).

Figure 10:
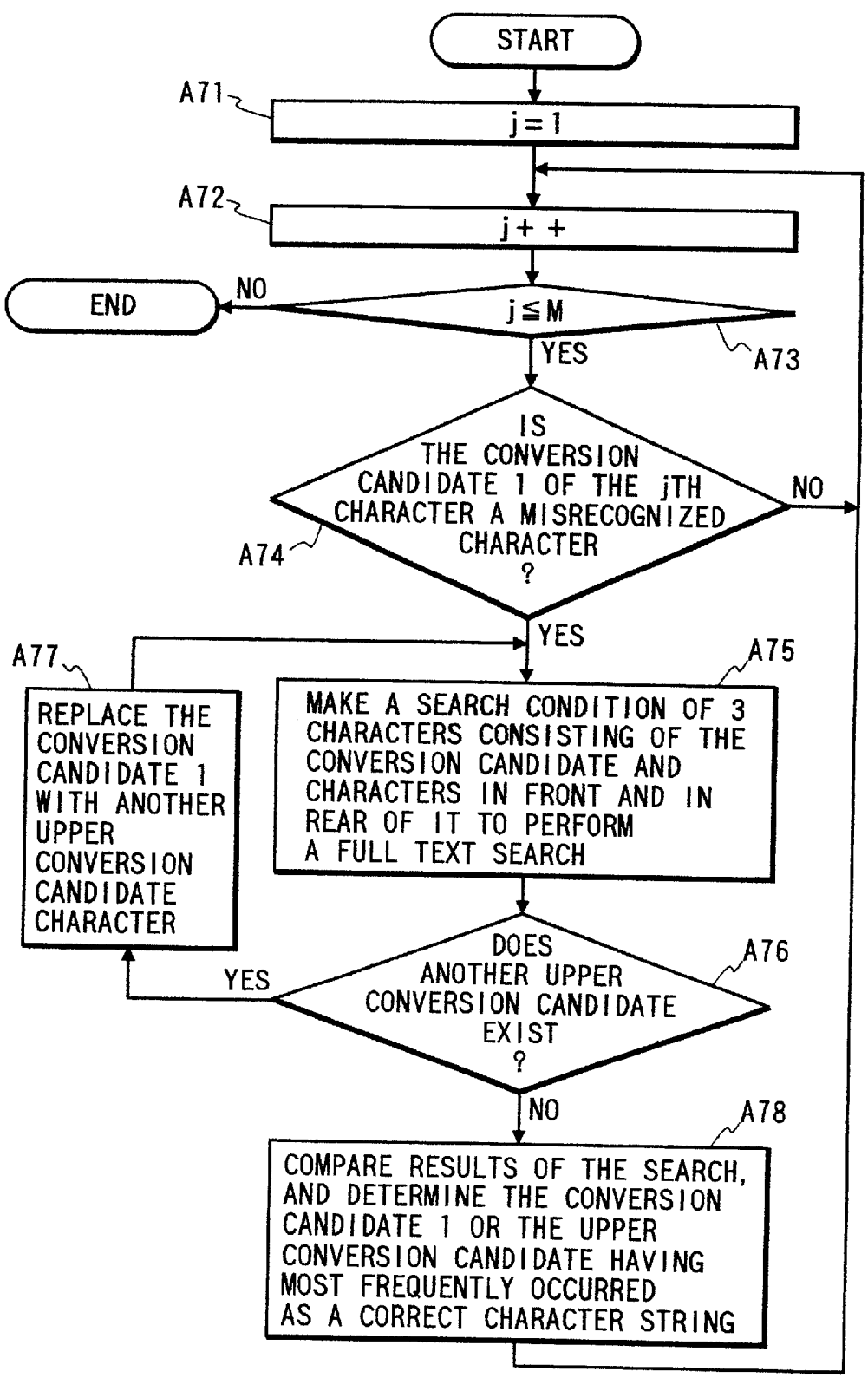
FIG. 10 is a flowchart illustrating a process of correcting a misrecognized character according to the first embodiment.

FIG. 10 is a flowchart showing a flow of a process of correcting a misrecognized character. The post-processing unit 134 requests the full text searching unit 140 to search for a character string of three characters consisting of a character judged as a misrecognized character and characters in the front and the in the rear of that character as a search condition. Further, the post-processing unit 140 replaces the misrecognized character with an upper conversion candidate character thereof in the character string, and requests the full text searching unit 140 to perform a search. If the upper conversion candidate character is plural, the post-processing unit 140 requests the full text searching unit 140 to search for each of all search conditions including respective upper conversion candidate characters.

The full text searching unit 140 performs a full text search in registered data stored in the text data storing unit 180 using the index files stored in the index file storing unit 150, and sends back the number of times of occurrence of the search condition character string in all the registered data as a result of the search to the post-processing unit 134. Assuming here that a lot of document data converted into text data by the full text searching unit 140 have been registered in the text data storing unit 180.

The post-processing unit 134 compares the numbers of times of occurrence of the three-character strings obtained as results of the full text search with each other to determine that a character string having most frequently occurred has the highest probability that the character string is correct, thereby correcting the misrecognized character with that the conversion candidate character assigned in the search condition character string is assumed to be correct.

An example of a manner of making the search condition for the full text search is shown in FIG. 8. In FIG. 8, when "最近の" [search character string in the first search (conversion candidate 1)] is compared with "最近の" [search character string in the second search (conversion candidate 2)], "最近の" has a larger value (400) of a result of the search so that "最近の" is determined to be correct (Step A7).

As the manner of setting the search condition for the full text search, it is possible to variously set the search condition according to a characteristic of a document which is an object of character recognition. For instance, the number of characters included in the search condition may be changed, a character string interposed between two punctuation marks may be set as the search condition, a character string divided at which a different kind of character, for example, Japanese Hiragana Character, Japanese Katakana character, Kanji character or the like, appears may be assigned as the search condition.

The post-processing unit 134 makes a search character string for each misrecognized character to correct the misrecognized character, as stated above. As the registered data, chain information of characters which can be a word is stored so as to configure a knowledge database if the above full text searching unit is applied.

Text data in which correction of misrecognized characters is completed is given a unique name such as bunsho1.txt, and registered in the full text searching unit 140. At this time, if an extension .bmp given by the image inputting unit 110 is changed into .txt, it is possible to correspond the image data to the text data. The text data bunsho1.txt is sent to the text data outputting unit 160.

Figure 11:
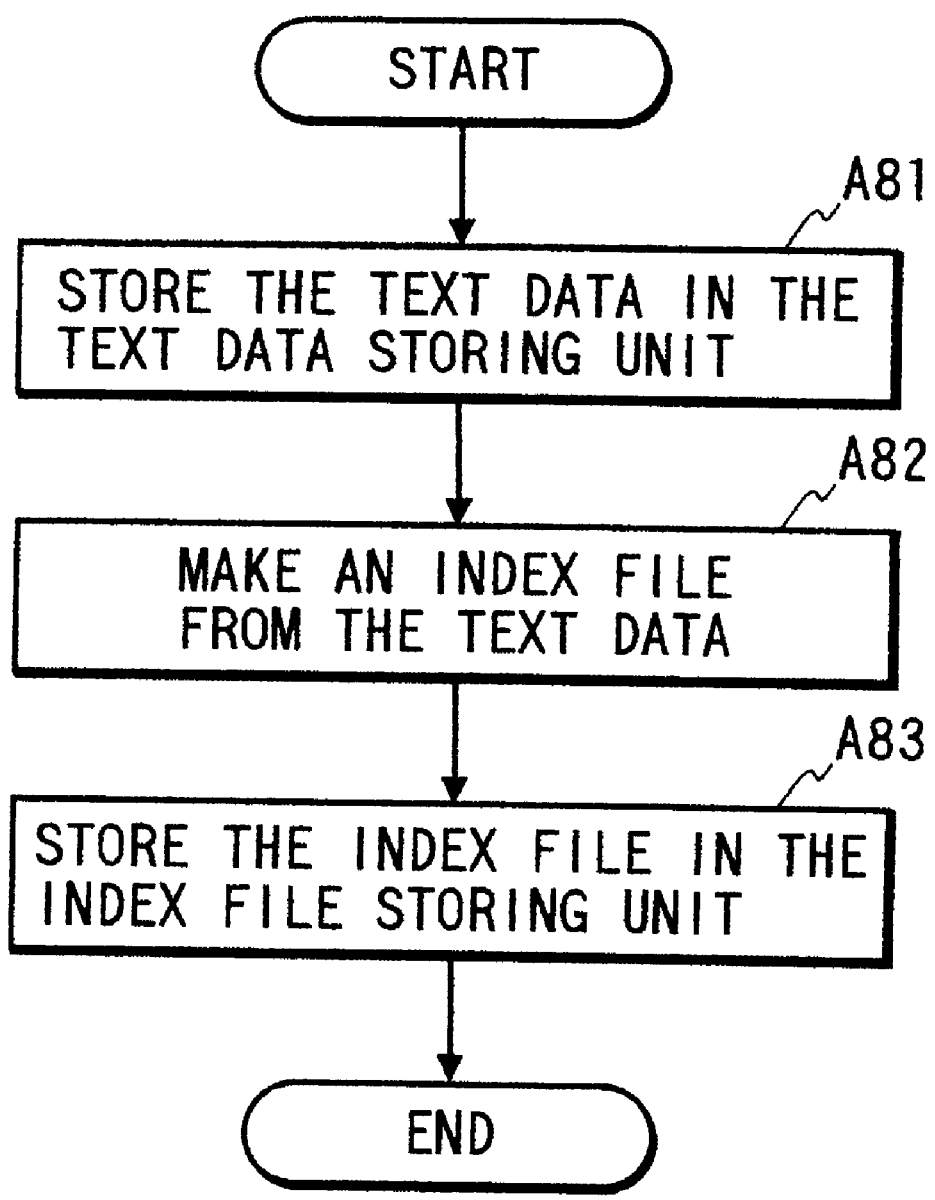
FIG. 11 is a flowchart illustrating a registering process conducted by a full text searching unit of the character recognizing apparatus according to the first embodiment.

The full text searching unit 140 stores the text data bunsho1.txt in the text data storing unit 180, besides making an index file from bunsho1.txt. FIG. 11 shows a flow of the registering process. The index file is stored in the index file storing unit 150, and used as the knowledge database by the post-processing unit 134 from the next data processing (Step A8).

The text data outputting unit 160 outputs the text data bunsho1.text to a display, a facsimile or the like (Step A9).

The character recognizing apparatus according to this embodiment replaces a character which is difficult to be recognized with each of conversion candidate characters to make a search character string, performs the full text search in plural documents which have been converted into text data to find out a correct character among the conversion candidate characters. It is therefore unnecessary to make a dictionary such as a word dictionary requiring a lot of labor and time to make the same, and maintenance thereof, and morphological analysis requiring a lot of time to configure or operate a system therefor in order to conduct complex processes, although tending to make a lot of mistakes. As a result, it is possible to readily configure the system, and correct misrecognized characters within a short period.

Further, the index file of a document converted into text data is made using the full text searching unit 140 one after another, and stored in the index file storing unit 150 so that the knowledge database is automatically enriched even without maintenance.

In particular, most of recent documents have been already converted into text data. If it is desired to convert past paper documents into text data, text data already held is registered in the full text searching unit 140, and character recognition is conducted, going back to the past, whereby it is prevented to misrecognize a character because of occurrence of an unregistered word.

Since the character recognizing apparatus of this embodiment performs, not a keyword search, but a full text search, segmentation of a search character string is not restricted by concept of word, sentence, clause or the like, the search character string can be thus freely set. It is therefore possible to desirably set a speed or an accuracy of the post-processing at need.

According to this embodiment, an index file is made from converted text data to be used as an object of the full text search so that it is possible to manage the documents at the same time.

Meanwhile, the manner of the full text search is not limited to what uses the index file.

Moreover, it is possible to configure the system readily and within a short period by using an existing full text searching apparatus.

(b) Description of Second Embodiment

Figure 12:
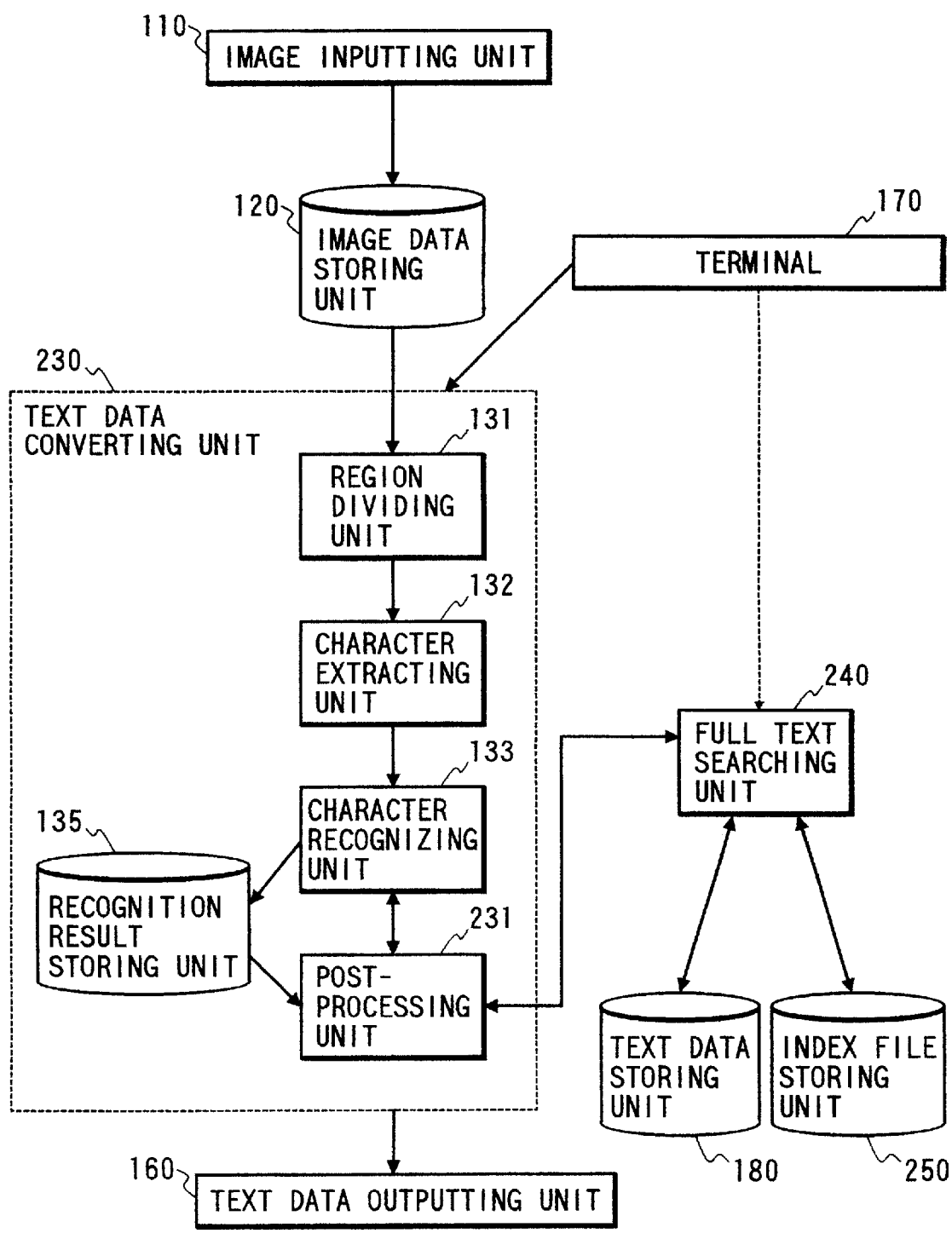
FIG. 12 is a block diagram showing a structure of a character recognizing apparatus according to a second embodiment of this invention.

Now, description will be made of a second embodiment of this invention with reference to FIGS. 12 through 15. FIG. 12 is a block diagram showing a structure of a character recognizing apparatus according to the second embodiment. The character recognizing apparatus has an image inputting unit 110, an image data storing unit 120, a text data converting unit 230 including a region dividing unit 131, a character extracting unit 132, a character recognizing unit 133, a post-processing unit 231 and a recognition result storing unit 135, a terminal 170, a full text searching unit 240, a text data storing unit 180, an index file storing unit 250, and a text data outputting unit 160, which are similar to those of the character recognizing apparatus according to the first. embodiment shown in FIG. 1. However, the second embodiment differs from the first embodiment in that when a misrecognized character is corrected by the post-processing unit 231, an index is made from text data before the post-processing, and not only the registered data but also a document which is an object of the character recognition is also used as the knowledge data.

According to this embodiment, a document which is an object of the character recognition itself is also assigned as an object of the search if the same character string repeatedly appears, and most of the characters are accurately recognized although some characters are misrecognized in the document such as a hand-written document, whereby errors are corrected at a higher speed and with a higher accuracy.

Figure 13:
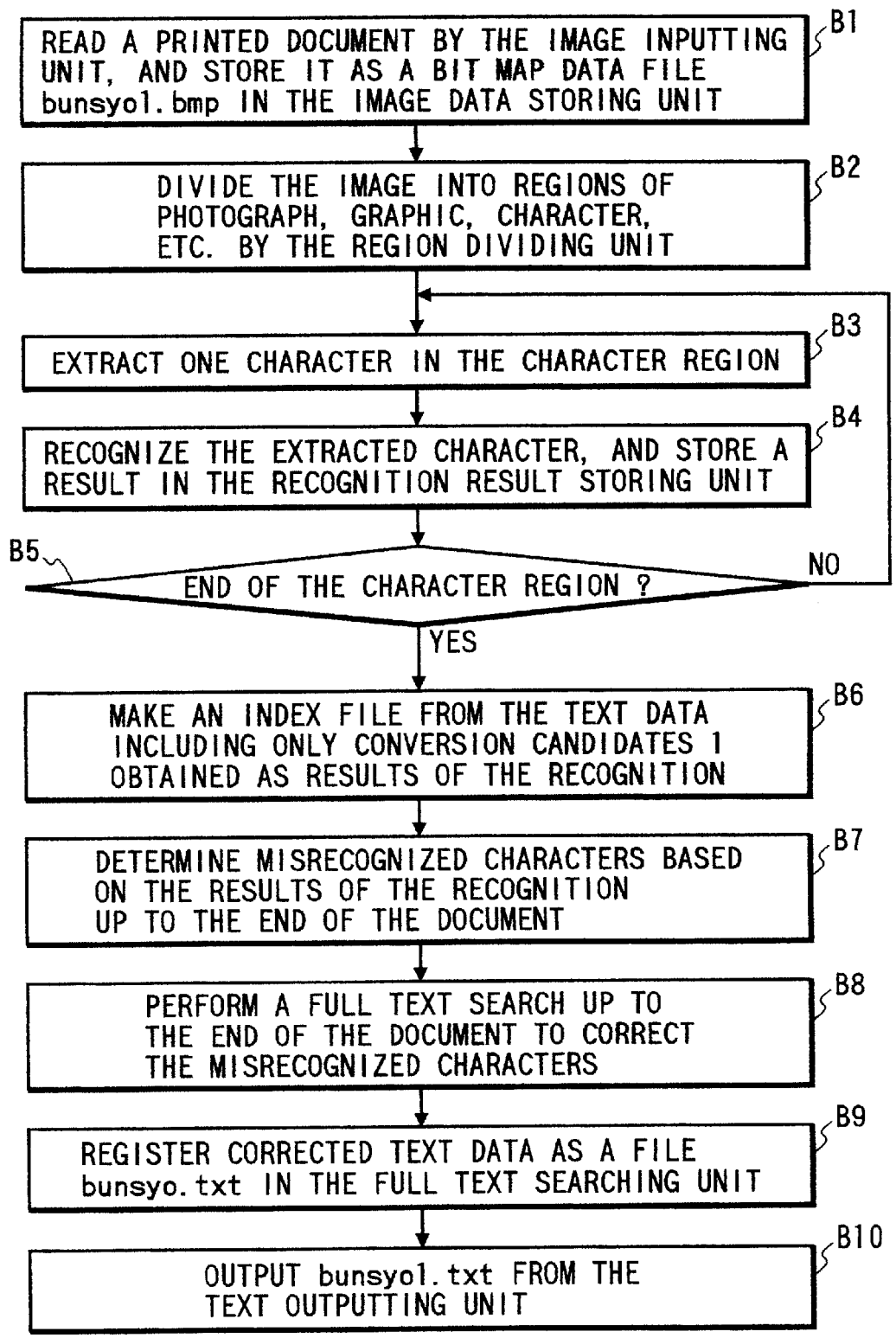
FIG. 13 is a flowchart illustrating a whole process conducted by the character recognizing apparatus according to the second embodiment.

Hereinafter, an operation of the character recognizing apparatus according to the second embodiment will be described with reference to FIG. 13. FIG. 13 shows a flow of a whole process conducted by the apparatus, in which Steps B1 through B5 are similar to Steps A1 through A5 according to the first embodiment shown in FIG. 2. At Step B6 in FIG. 13, the post-processing apparatus 231 obtains results of recognition from the recognition result storing unit 135.

The post-processing unit 231 sends text data obtained from the recognition result storing unit 135 to the full text searching unit 240. The text data is hereinafter called "own document" since it is a document which is an object of the character recognition.

The full text searching unit 240 makes an index file configured with only conversion candidates 1 from the received text data, and stores the index file in the index file storing unit 250, distinguishing from indexes having been registered.

The post-processing unit 231 then determines misrecognized characters in the text data. The process of determining the misrecognized characters is similar to that according to the first embodiment. After that, the post-processing unit 231 corrects the misrecognized characters.

Figure 14:
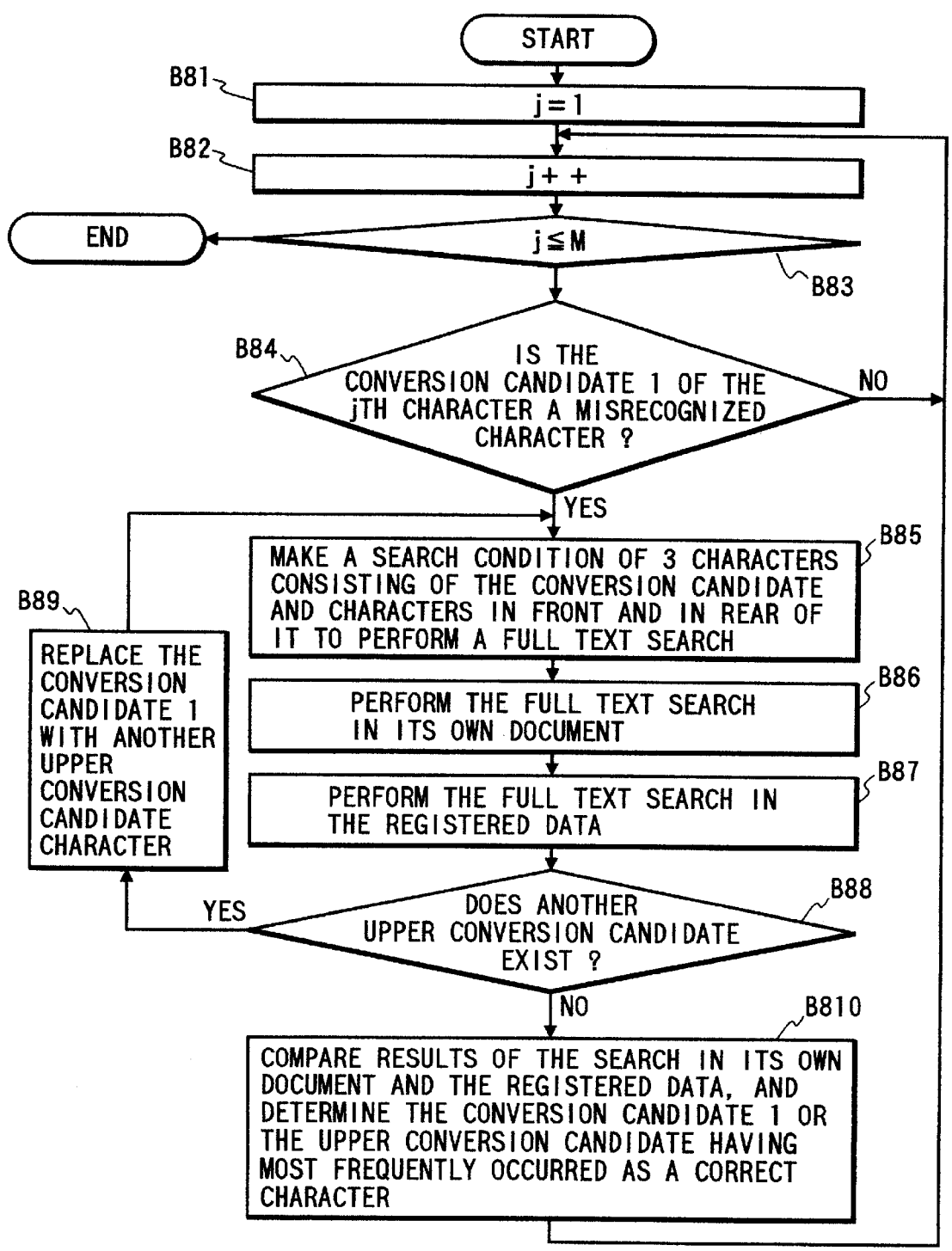
FIG. 14 is a flowchart illustrating a process of correcting a misrecognized character according to the second embodiment.

FIG. 14 shows a flow of the process of correcting the misrecognized character. First, the post-processing unit 231 makes a three-character string consisting of a character determined as a misrecognized character and characters in the front and in the rear of that character as the search condition, then requests the full text searching unit 240 to perform the full text search in its own document under the above search condition. The full test searching unit 240 performs the whole text search in its own document using the index file stored in the index file storing unit 250, and sends back the number of times of occurrence of the search condition character string in its own document as a result of the search to the post-processing unit 231. The post-processing unit 231 holds the result as a result 1.

Next, the post-processing unit 231 requests the full text searching unit to search for the same search condition in the registered data. The full text searching unit 240 performs the full text search in the registered data stored in the text data storing unit 180 using the index files stored in the index file storing unit 250, and sends back the number of times of occurrence of the search condition character string in the all registered data as a result of the search to the post-processing unit 231.

Assuming here that a lot of document data converted into the text data by the full text searching unit 240 have been registered in the text data storing unit 180.

The post-processing unit 231 holds the result as a result 2. The post-processing unit 231 replaces the misrecognized character in the search condition character string with an upper conversion candidate character, and requests the full text searching unit 240 to search for the search condition character string in the above two kinds of texts in the similar manner. When the upper conversion candidate character is plural, each of all the search condition character strings including every upper conversion candidate character is searched.

The post-processing unit 231 compares results 2 obtained by the search with each other. A character string having occurred most frequently has the highest probability to be correct, so that a conversion candidate character assigned in the search condition character string having occurred most frequently is assumed to be a correct character, whereby the misrecognized character is corrected.

When a difference between the numbers of times of occurrence of the search character strings in which the conversion candidate 1 is applied and another search character string is below a certain threshold value, the results 1 of the search for these character strings is referred to, and a character string having occurred most frequently is assumed to be correct.

For instance, when search character strings including conversion candidate characters shown in FIG. 7 is searched in the above manner, the search results in as shown in FIG. 15, for example. As shown in FIG. 15, if the threshold value of the difference in the number of time of occurrence is 10, it is impossible to determine a correct search character string by referring to only the results 2. More specifically, when the results 2 of the search are compared, a difference between a result 2 (98) of the conversion candidate 1 and a result 2 (89) of the conversion candidate 2 is smaller than the threshold value (10), and a difference between the result 2 (98) of the conversion candidate 1 and a result 2 (107) of the conversion candidate 3 is smaller than the threshold value (10), so that the result 2 are not helpful in determining which is a correct search character string among the search character strings 1, 2 and 3. For this, by referring to the results 1, it is found that the conversion candidate search character string "とばの" has occurred most frequently in its own document so that "とばの" is assumed to be correct. The following processes are similar to those according to the first embodiment.

According to this embodiment, a document which is grammatically uniformed, that is, a document in which the same word frequently appears, or the same vein or the same expression are repeatedly used, is also used as the knowledge database so as to be an object of the search in the document itself. Accordingly, tendency of the document such as words, grammar and the like used in the document can be reflected upon correcting misrecognized characters. Moreover, an unregistered word can be searched since such unregistered word very likely appears in its own document, whereby a rate of recognition is improved.

In this embodiment, the search condition character string is of three characters. However, it is alternatively possible to set any number of characters as the search condition character string, not limiting to three characters.

(c) Description of Third Embodiment

Now, description will be made of a third embodiment of the present invention with reference to FIGS. 16 through 19. The third embodiment differs from the first embodiment in that when the numbers of times of occurrence of the conversion candidate character strings for correcting a misrecognized character, which are results of the full text search performed by the full text searching unit, are uniformly small upon correcting the misrecognized character, the post-processing unit decides that an extracting position of the character of image data is improper, and instructs the character extracting unit to extract the character once again.

Figure 16:
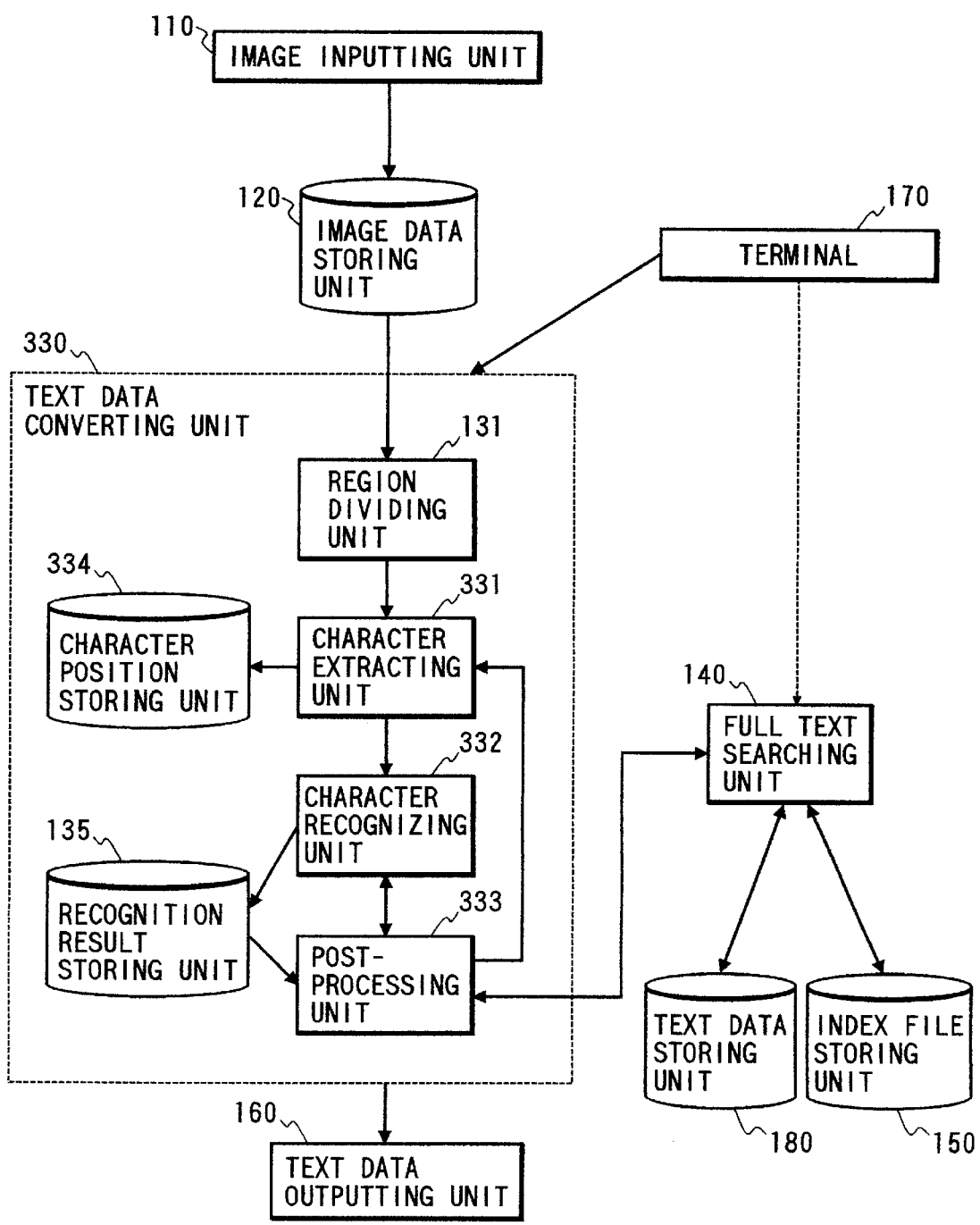
FIG. 16 is a block diagram showing a structure of a character recognizing apparatus according to a third embodiment of this invention.

FIG. 16 is a block diagram showing a structure of a character recognizing apparatus according to the third embodiment of this invention. As shown in FIG. 16, the character recognizing apparatus according to the third embodiment has an image inputting unit 110, an image data storing unit 120, a text data converting unit 330 including a region dividing unit 131, a character extracting unit 331, a character recognizing unit 332, a post-processing unit 333 and a recognition result storing unit 135, a terminal 170, a full text searching unit 140, a text data storing unit 180, an index file storing unit 150, and a text data outputting unit 150, which are similar to those of the character recognizing apparatus according to the first embodiment shown in FIG. 1, excepting that the text data converting unit 330 additionally has a character position storing unit 334 for storing position information of an extracted character in a form of file when the character is extracted, and the post-processing unit 333 instructs the character extracting unit 331 to extract the character once again.

Figure 17:
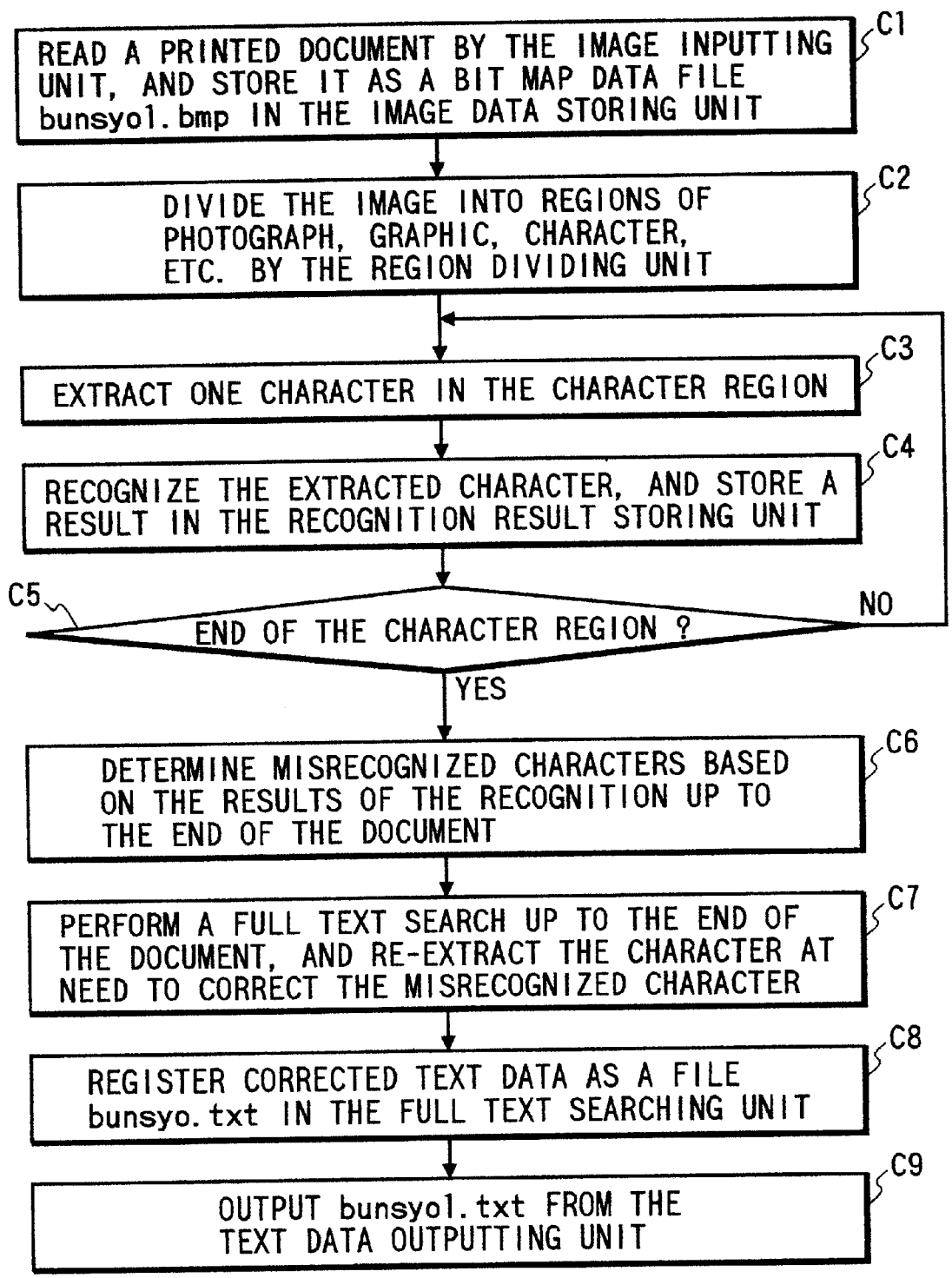
FIG. 17 is a flowchart illustrating a whole process conducted by the character recognizing apparatus according to the third embodiment.
Figure 19:
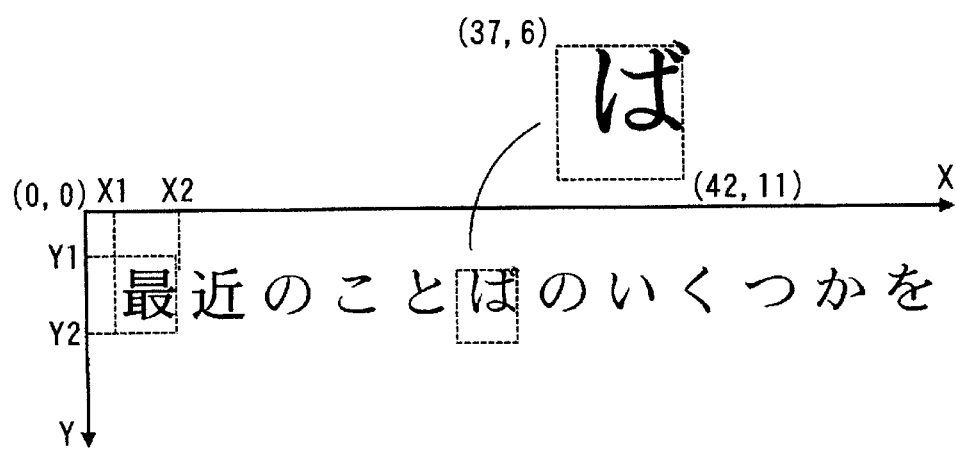
FIG. 19 shows a data structure of position information of characters according to the third embodiment.

Hereinafter, an operation of the character recognizing apparatus according to the third embodiment will be described. FIG. 17 shows a flow of a whole process conducted by the character recognizing apparatus according to the third embodiment, wherein Steps C1 and C2 shown in FIG. 17 are similar to Steps A1 and A2 according to the first embodiment shown in FIG. 2. At Step C3, the character extracting unit 331 stores position information of an extracted character in a form of file when extracting the character. At this time, the file is given a name bunshol.loc, for example. As the position information, there are obtained, with the top left-hand corner of a paper as an origin (0, 0), a horizontal distance X1 from the origin to the left end of a character, a horizontal distance X2 from the origin to the right end of the character, a vertical distance Y1 from the origin to the top end of the character and a vertical distance Y2 from the origin to the bottom end of the character, expressed in cm or with the number of points, for example, as shown in FIG. 19.

Processes at Steps C4 through C6 in FIG. 17 are similar to Steps A4 through A6 in FIG. 2.

Figure 18:
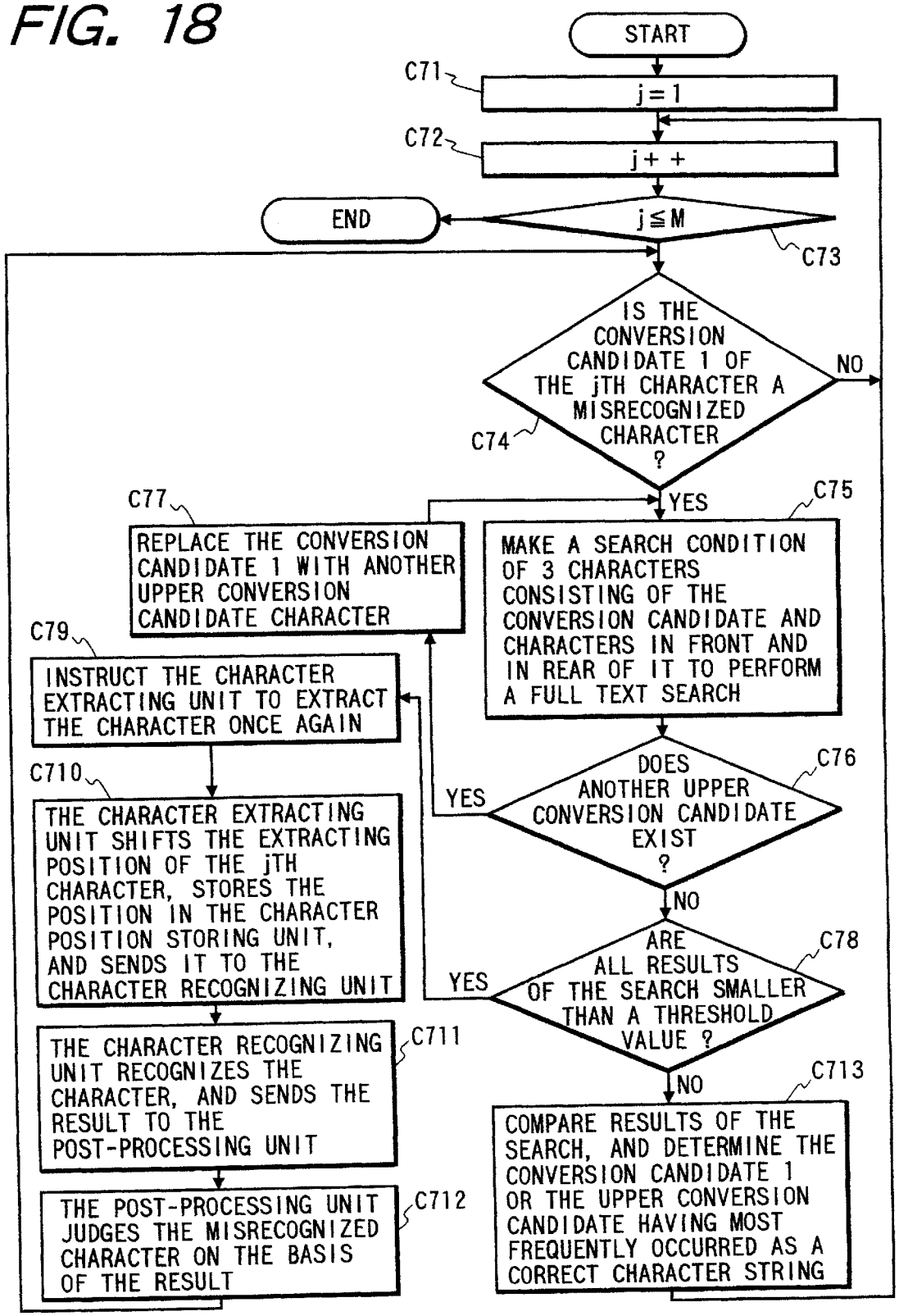
FIG. 18 is a flowchart illustrating a process of correcting a misrecognized character according to the third embodiment.

At Step C7 in FIG. 17, a misrecognized character is corrected. A flow of the process of correcting the misrecognized character is shown in FIG. 18. A manner of making a search condition and a manner of requesting the full text search are similar to those according to the first embodiment. However, when all obtained results of the search for search conditions for a character are smaller than a predetermined threshold value, the post-processing unit 333 determines that the character is extracted at an improper position by the character extracting unit 331, and sends a character number of the character counted from the leading character to the character extracting unit 331 to instruct the same to extract the character once again before determining a correct character by comparing the results of the search.

The character extracting unit 331 obtains position information of the character having the received character number from the character position storing unit 334, appropriately shifts the position in the horizontal and vertical directions, and again stores newly obtained position information in the character position storing unit 334, besides sending the position information to the character recognizing unit 332.

The character recognizing unit 332 recognizes a character in the received character position, and sends a result of the recognition to the post-processing unit 333.

The post-processing unit 333 judges the misrecognized character on the basis of the result of the character recognition supplied from the character recognizing unit 332. If the result is still a misrecognized character, the post-processing unit 33 determines a correct character using again the full text searching unit 140. If the result is correct, the post-processing unit 333 processes the next character.

When a process of correcting all misrecognized characters is completed, the following process is conducted similarly to the first embodiment.

According to the third embodiment of this invention, the post-processing unit 333 of the character recognizing apparatus detects misrecognition caused from that a position at which a character of image data has been extracted is improper when correcting the misrecognized character, and instructs re-extraction of the character, whereby a rate of recognition is improved.

In this embodiment, the search condition character string is of three characters. However, it is alternatively possible to set any number of characters in making the search condition character string, not limiting to three characters.

(d) Description of Fourth Embodiment

Now, description will be made of a fourth embodiment of this invention with reference to FIGS. 20 through 23. The fourth embodiment is characterized in that when a plurality of character regions are generated when image data is divided, a region coupling unit couples the divided plural character regions using the full text search.

Figure 20:
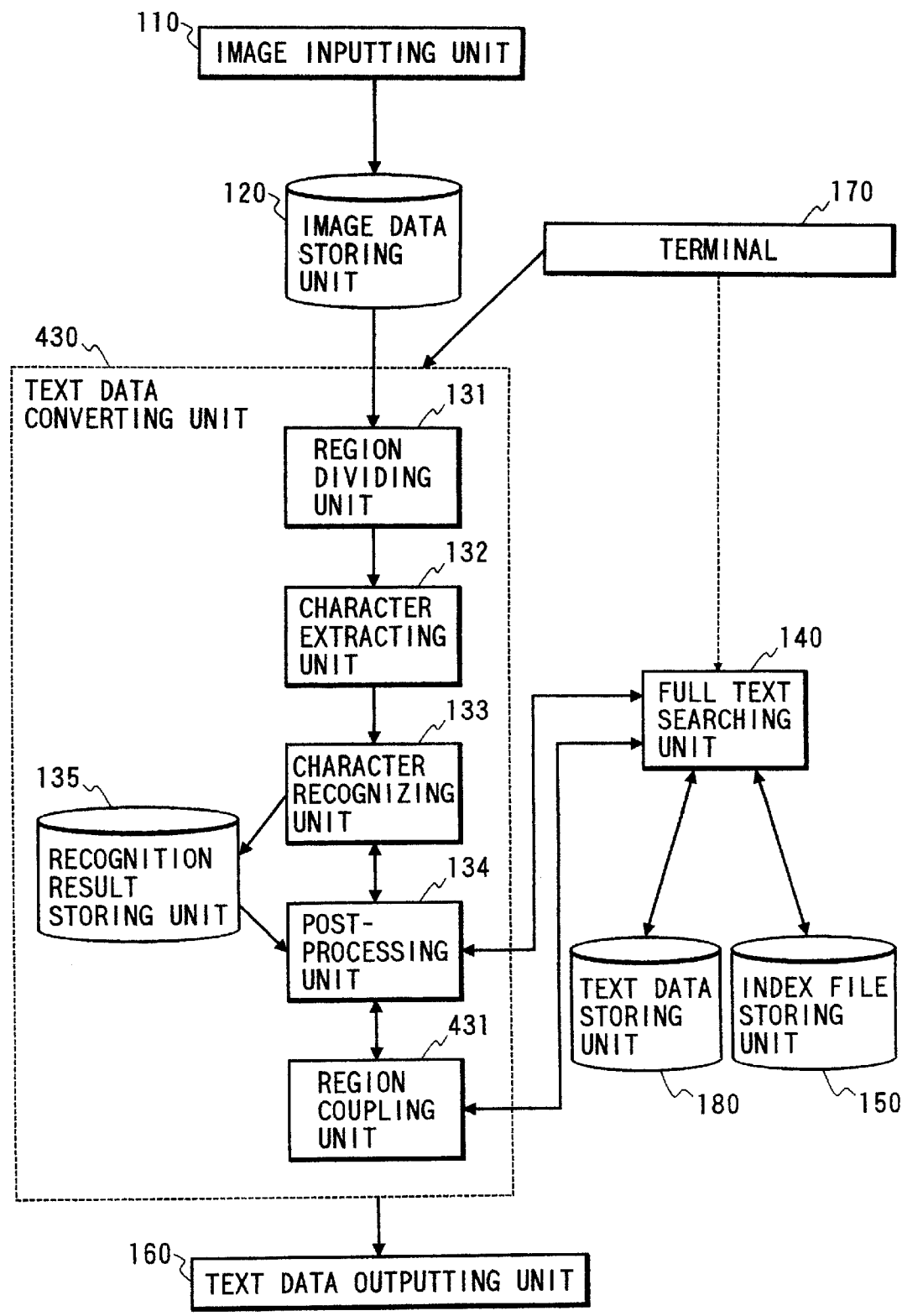
FIG. 20 is a block diagram showing a structure of a character recognizing apparatus according to a fourth embodiment of this invention.

FIG. 20 is a block diagram showing a structure of a character recognizing apparatus according to the fourth embodiment of this invention. The character recognizing apparatus shown in FIG. 20 has an image inputting means 110, an image data storing unit 120, a text data converting unit 430 including a region dividing unit 131, a character extracting unit 132, a character recognizing unit 133, a post-processing unit 134 and a recognition result storing unit 135, a terminal 170, a full text searching unit 140, a text data storing unit 180, an index file storing unit 150 and a text data outputting unit 160, which are similar to those of the character recognizing apparatus according to the first embodiment shown in FIG. 1, excepting that the text data converting unit 430 additionally includes a region coupling unit 431 for coupling a plurality of regions divided by the region dividing unit 131 using the full text searching unit 140.

Figure 21:
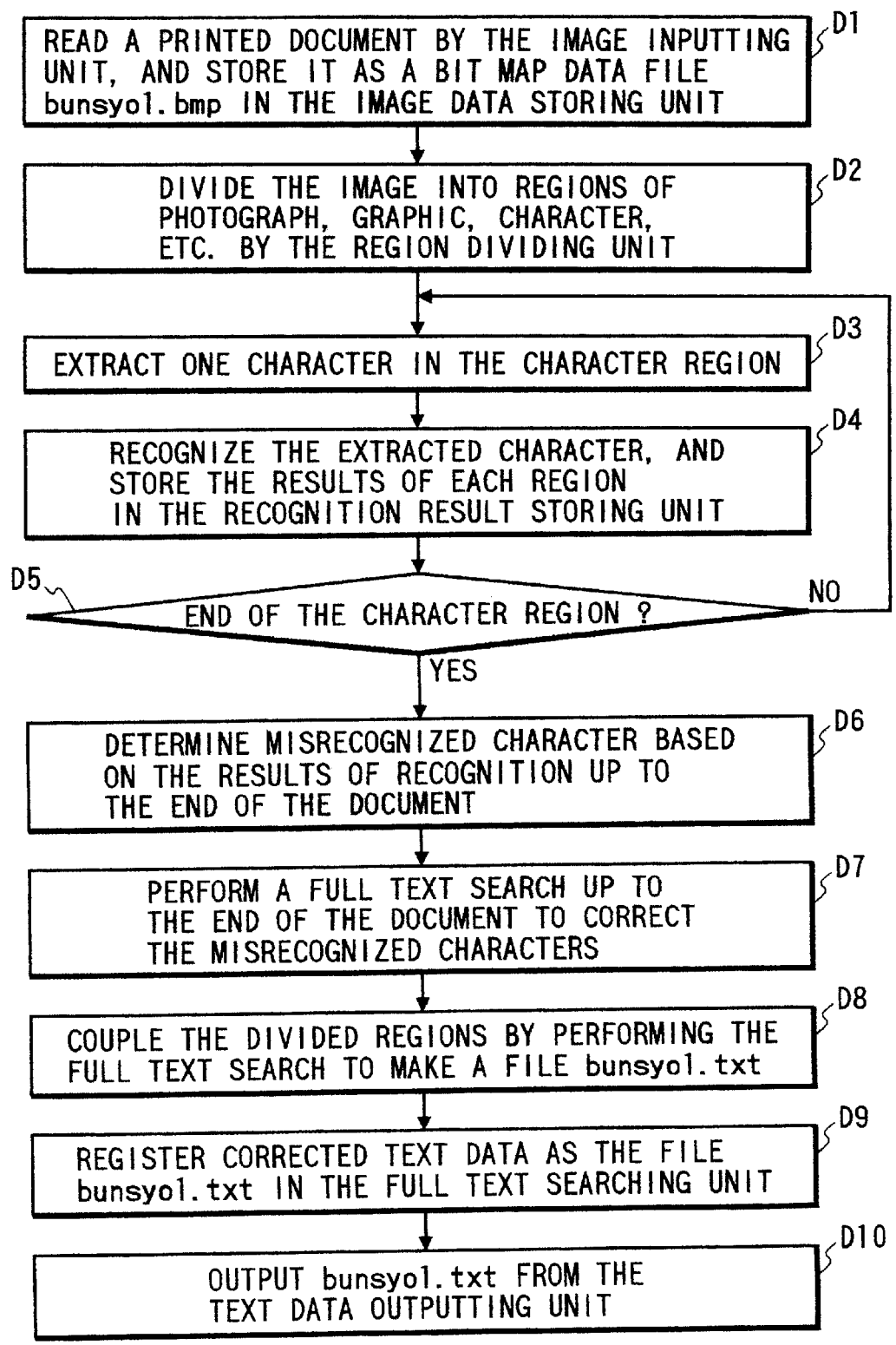
FIG. 21 is a flowchart illustrating a whole process conducted by the character recognizing apparatus according to the fourth embodiment.
Figure 22:
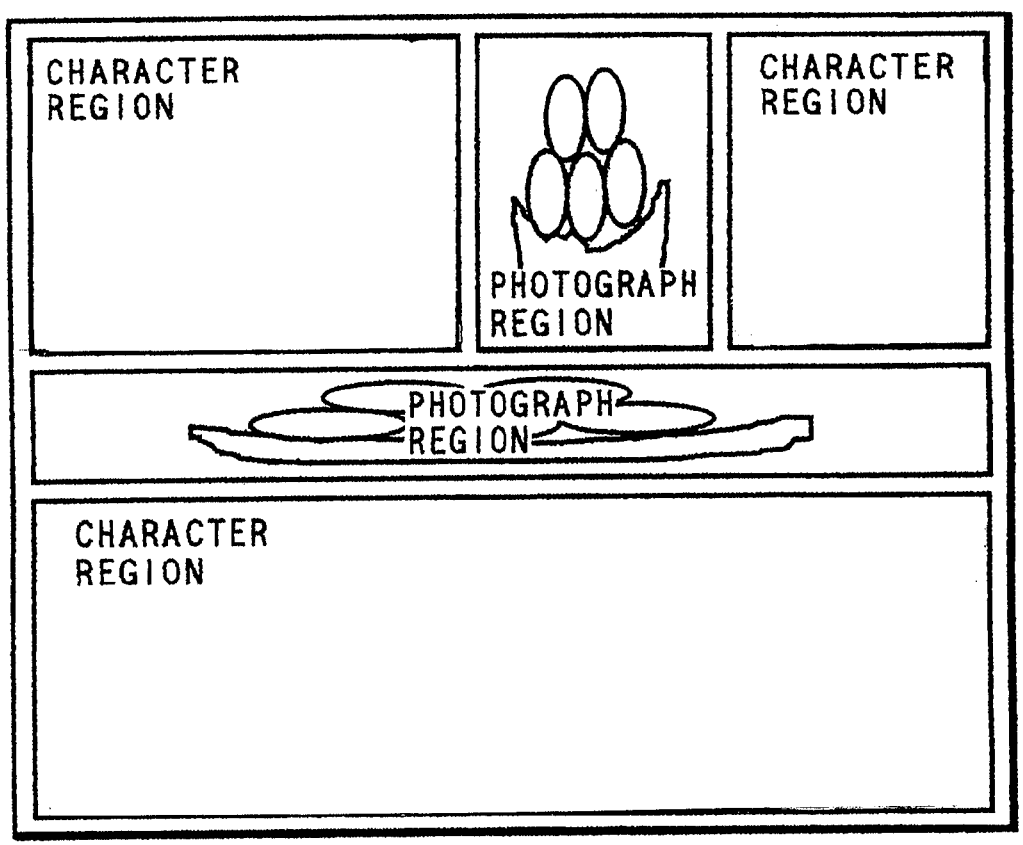
FIG. 22 shows an example of image data of a document used in the fourth embodiment.

Next, an operation of the character recognizing apparatus according to the fourth embodiment with the above structure will be described. FIG. 21 is a flowchart illustrating a whole process conducted by the character recognizing apparatus of this embodiment. Assuming here that a printed document, which is of a size readable in one operation by the image inputting unit 110 and in which the character region is separated by, for example, the photograph regions, as shown in FIG. 22, is applied in this embodiment.

Processes at Steps D1 through D3 are similar to Steps A1 through A3 according to the first embodiment shown in FIG. 2. At step D4, characters are recognized in a similar manner to the first embodiment. When results of the recognition are stored in the recognition result storing unit 135, different names, for example, bunshol$_{13}$1.moj, bunshol$_{13}$2.moj, . . . , are given to respective character regions and the results are stored along with the respective names in the recognition result storing unit 135.

Next, the post-processing unit 134 obtains files of the character regions one by one from the recognition result storing unit 135 to judge misrecognition and correct the same in all the regions in a manner similar to the first embodiment.

When the above judgement and correction of the misrecognition in all the character regions are completed, the post-processing unit 134 sends results of the above processes to the region coupling unit 431.

The region coupling unit 431 determines which region is followed by which region, and couples these regions to form a file. If there are three divided regions 1, 2 and 3, the region coupling unit 431 requests the full text searching unit 140 to search for a character string made by coupling the last character in the region 1 and the leading character in the region 2 as the search condition.

Further, the region coupling unit 431 connects the last character in the region 1 to the leading character in the region 3, the last character in the region 2 to the leading character in the region 3, and the last character in the region 2 to the leading character in the region 1 to make each of the search conditions, and requests the full text searching unit 140 to search for each of the search condition character strings.

The full text searching unit 140 searches for each of the requested search conditions in the registered data, and sends back the number of times of occurrence of each of the search condition character strings in the registered data as a result.

The region coupling unit 431 compares the results of the search received from the full text searching unit 140, determines that a character string having occurred most frequently is a grammatically correct character string to couple the regions.

Figures 23A, 23B, 23C:
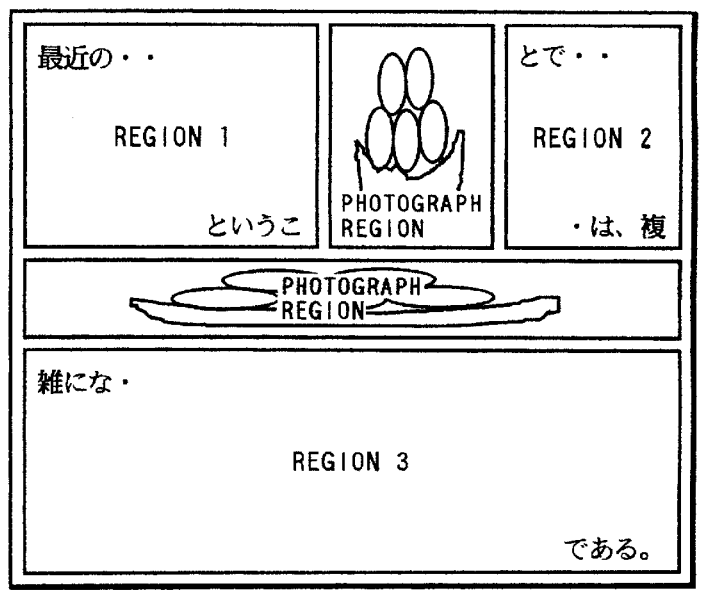
FIGS. 23A through 23C illustrate a process of coupling regions of the image data of the document according to the fourth embodiment.

In an example shown in FIGS. 23A through 23C, it is seen from the results of the search that the order of the regions are the region 1, the region 2 and the region 3. More specifically, as shown in FIG. 23B, when results of the search for the search conditions "こと" and "こ雑" are compared, "こと" has a larger result than "こ雑". Accordingly, the region 1 is followed by the region 2. When results of the search for the search conditions "複雑" and "複最" are compared, "複雑" has a larger result so that the region is followed by the regions 3. Similarly, when result of the search conditions "。最" and "。と" are compared, "。最" has a larger result so that the region 3 is considered to be followed by the region 1. However, the region 3 ends at a punctuation mark "。-". So that the regions are coupled in the order of 1, 2 and 3, as shown in FIG. 23C. Incidentally, document is generally such made that the reader starts reading from the top toward the bottom. Accordingly, it is alternatively possible to use position information of a region obtained when the region is divided as a judgement value since a region in a higher position is followed by a region in a lower position in the document.

The regions are coupled to form one file, and given a unique name bunsho1.txt, as above. After that, the file is registered in the full text searching unit 140, and sent to the text data outputting unit 160. This process is similar to that according to the first embodiment.

The character recognizing apparatus according to the fourth embodiment automatically couples regions when one document is divided into a plurality of regions, and determines the order of the regions. It is therefore possible to efficiently recognize characters without labor.

In this embodiment, there is used a document of a size readable in one operation by the image inputting unit 110. However, it is alternatively possible to separately read one document part by part not in order, and couple results of recognition of plural groups of image data of the document read separately in a correct order.

In this embodiment, the search condition character string is of two characters. However, it is alternatively possible that the search condition character string is of any number of characters, not limiting to two characters.

This embodiment has been described by way of an example where the image data is converted into text data. However, data to be subjected to the process of correcting misrecognition may be patterned data in speech recognition or the like.

(e) Description of Fifth Embodiment

Figure 24:
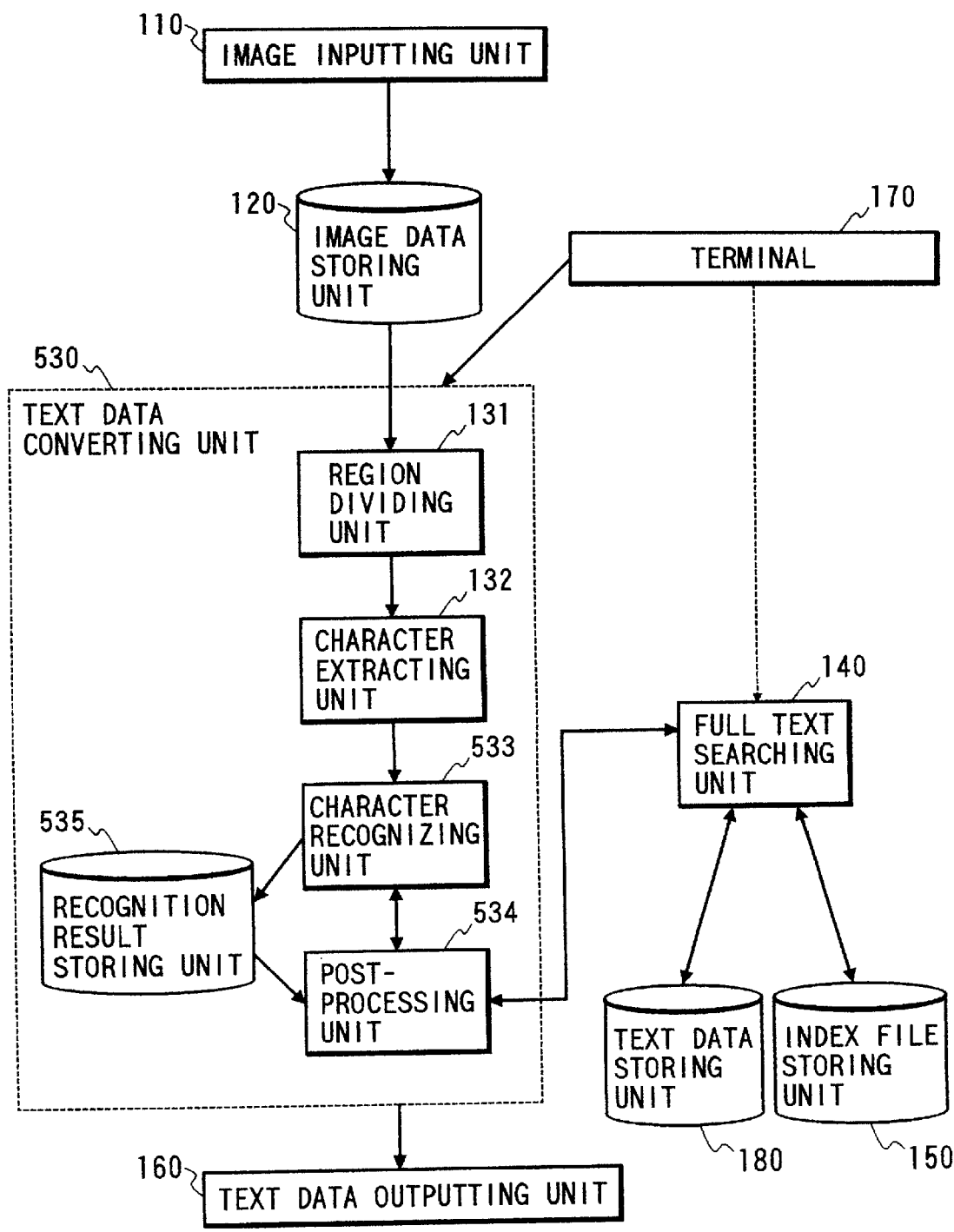
FIG. 24 is a block diagram showing a structure of a character recognizing apparatus according to a fifth embodiment of this invention.

Now, description will be made of a fifth embodiment of this invention with reference to FIGS. 24 through 28. FIG. 24 is a block diagram showing a structure of a character recognizing apparatus according to the fifth embodiment of this invention. In FIG. 24, the character recognizing apparatus has an image inputting unit 110, an image data storing unit 120, a text data converting unit 530 including a region dividing unit 131, a character extracting unit 132, a character recognizing unit 533, a post-processing unit 534 and a recognition result storing unit 535, a terminal 170, a whole text retrieving unit 140, a text data storing unit 180, an index file storing unit 150 and a text data outputting unit 160, which are similar to those of the character recognizing apparatus shown in FIG. 1 according to the first embodiment. However, the character recognizing apparatus according to the fifth embodiment differs from the character recognizing apparatus according to the first embodiment in that image data extracted as a character is converted into at least one character data without an evaluation value by the character recognizing unit 533.

Figure 25:
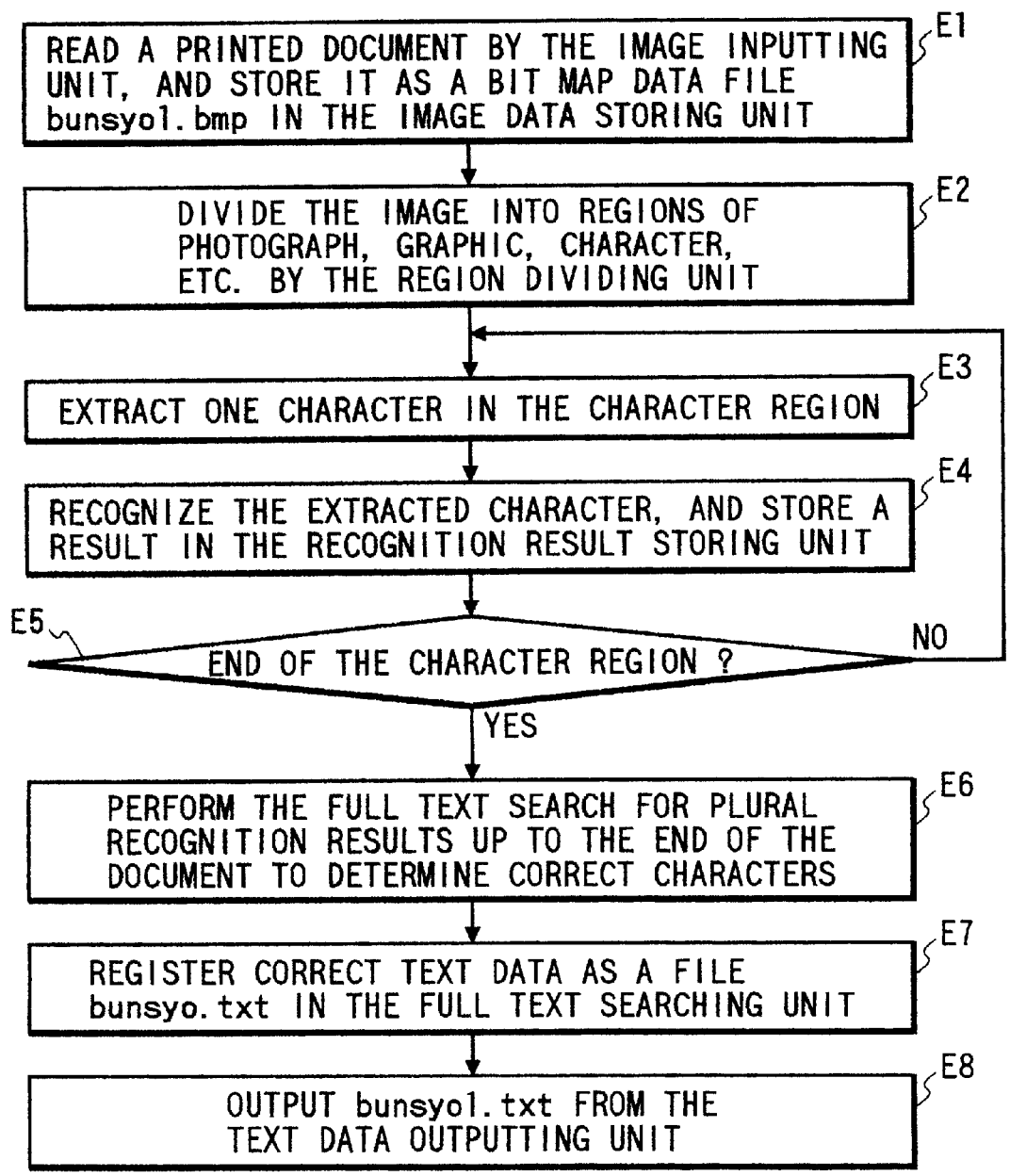
FIG. 25 is a flowchart illustrating a whole process conducted by the character recognizing apparatus according to the fifth embodiment.

Hereinafter, an operation of the character recognizing apparatus of the fifth embodiment will be described. FIG. 25 is a flowchart showing a flow of a whole process conducted by the apparatus. Steps E1 through E3 in FIG. 25 are similar to Steps A1 through A3 according to the first embodiment shown in FIG. 2. At step E4 in FIG. 25, the character recognizing unit 533 recognizes one character obtained from position information supplied from the character extracting unit 132, converts the character into one character data, and stores a result of the conversion in the recognition result storing unit 535 in a form shown in FIG. 26. The character data converted by the character recognizing unit 530 will be hereinafter referred "a conversion candidate character". Up to this character recognizing process, a character string shown in FIG. 4, for example, results in as shown in FIG. 27. Step E5 in FIG. 25 is similar to Step A5 in FIG. 2.

At Step E6 in FIG. 25, the post-processing unit 534 determines a correct recognition result from at least one conversion candidate character stored in the recognition result storing unit 535.

The post-processing unit 534 combines a conversion candidate character 1 of the first character with a conversion candidate character 1 of the second character stored in the recognition result storing unit 535 to make a search condition, and requests the full text searching unit 140 to search for the search condition. Next, the post-processing unit 534 combines a conversion candidate 2 of the first character with a conversion candidate character 1 of the second character to make a search condition, and requests the full text searching unit 140 to search for it. Similarly, the post-processing unit 534 makes every combination of the conversion candidate characters 3, 4, 5, . . . of the first and the second character to make search conditions, and request the full text searching unit 140 to search for each of the search conditions. The post-processing unit 534 eliminates search conditions never occurred or scarcely occurred by comparing results of the search.

The post-processing unit 534 then attaches a conversion candidate character 1 of the third character to the tail of the remaining two-character string to make a search condition, and requests the full text search unit 140 to search for it. Similarly, the post-processing unit 534 adds each of the conversion candidate characters of the third character to the two-character string to make a search condition, and requests the full text searching unit 140 to search for it. The post-processing unit 534 compares results of the search, and determines the conversion candidate character included in the search condition having most frequently occurred as a correct character.

Next, the post-processing unit 534 adds each of the conversion candidate characters of the fourth character to the character string consisting of the second character and the third character determined as correct to make each of search conditions, and requests the full text searching unit 140 to search for the retrieval conditions. The post-processing unit 534 compares results of the retrieval to determine a conversion candidate character included in the search condition having most frequently occurred as a correct character. In a similar manner, the post-processing unit 534 determines the following correct characters. FIGS. 28A through 28C show an example of making a search condition for the full text search. As shown in FIG. 28A, when results of the search are compared, it is seen that a numerical value "400" obtained in the first time is the largest among them so that a search character string "最近" is combined with the third character. As to the third character, a search condition is made as shown in FIG. 28B. When results of the search shown in FIG. 28B are compared, it is seen that a numerical value "230" obtained in the first time is larger than a numerical value "2" obtained in the second time so that a search character string "最近の" is selected as correct. As to the fourth character, a search condition is made as shown in FIG. 28C. When results of the search shown in FIG. 28C are compared, it is seen that a numerical value "46" obtained in the first time is the largest among them so that a search character string "最近の" is determined as being correct.

The following processes are similar to those according to the first embodiment.

In this embodiment, the search condition character string is of three characters, but a manner of making the search condition character string is not limited to the above.

According to this embodiment, it is unnecessary to make a dictionary such as a word dictionary which requires a lot of labor and time to make the same and maintenance thereof similarly to the first embodiment even if the character recognizing apparatus does not (cannot) yield an evaluation value. It is also unnecessary to conduct morphological analysis which requires a lot of time to configure and operate the system therefor since it requires complex processes, although tending to make a lot of mistakes. Therefore, it is possible to configure the system readily and within a short period, and correct misrecognition within a short period.

(f) Description of Sixth Embodiment

Figure 29:
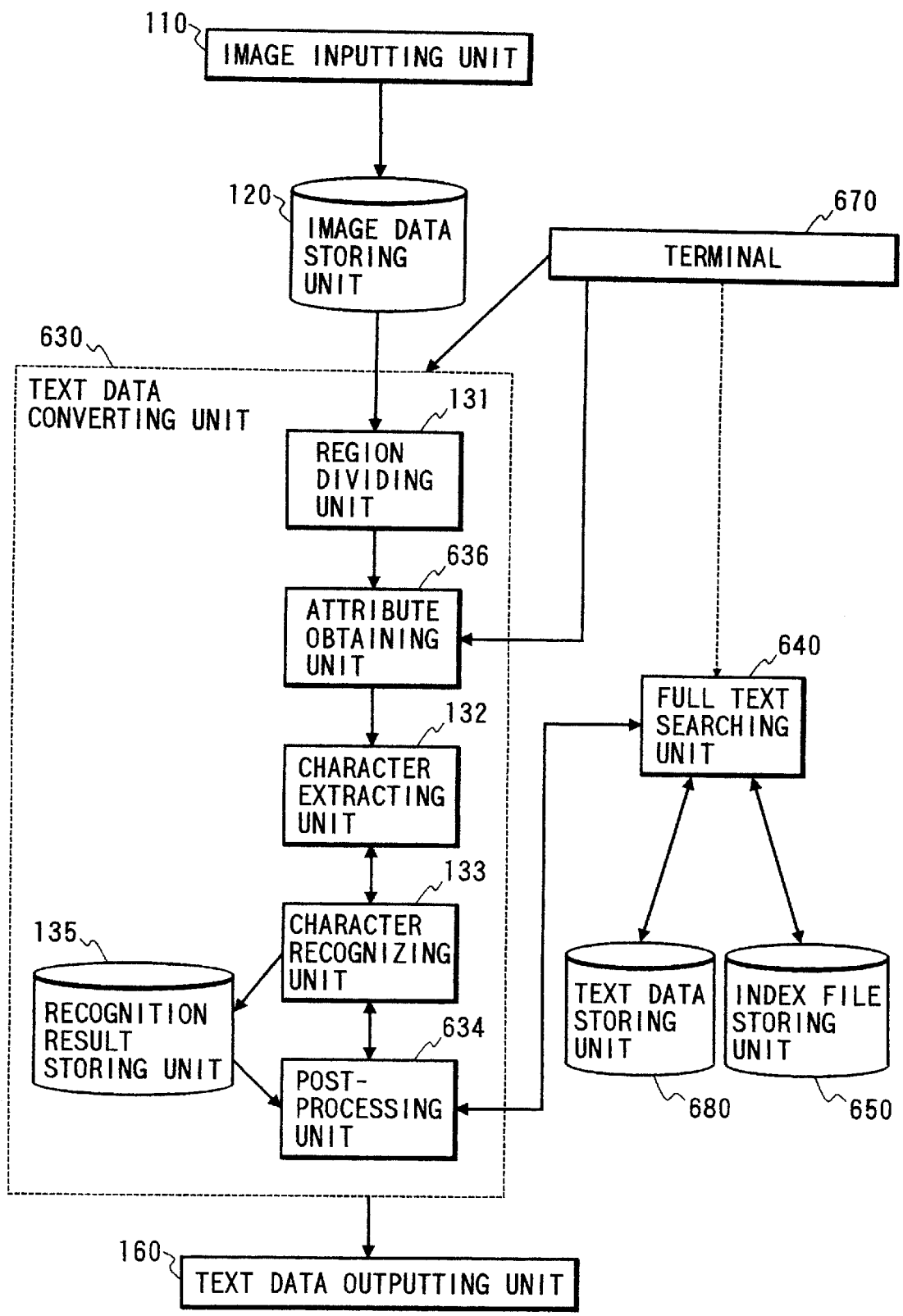
FIG. 29 is a block diagram showing a structure of a character recognizing apparatus according to a sixth embodiment of this invention.

Now, description will be made of a sixth embodiment of this invention referring to FIGS. 29 through 31. FIG. 29 is a block diagram showing a structure of a character recognizing apparatus according to the sixth embodiment. In FIG. 29, the character recognizing apparatus according to the sixth embodiment has an image inputting unit 110, an image data storing unit 120, a text data converting unit 630 including a region dividing unit 131, a character extracting unit 132, a character recognizing unit 133, a post processing unit 634, a recognition result storing unit 135, a terminal 670, a whole text retrieving unit 640, a text data storing unit 680, an index file storing unit 650 and a text data outputting unit 160, which are similar to those of the character recognizing apparatus according to the first embodiment shown in FIG. 1, excepting that the text data converting unit 630 additionally includes an attribute obtaining unit 636 for obtaining attributes as to a region divided by the region dividing unit 131, and the post-processing unit 634 designates attributes of registered data to which the attributes have been given when making a search request to correct misrecognition.

Hereinafter, an operation of the character recognizing apparatus of the sixth embodiment will be described. FIG. 30 is a flowchart showing a flow of a whole process conducted by the apparatus. In FIG. 30, Steps F1 and F2 are similar to Steps A1 and A2 according to the first embodiment shown in FIG. 2. At Step K3 in FIG. 30, the attribute obtaining unit 636 obtains attributes of a document in a character region divided at Step K2. Here, the user inputs four attributes of the document, for example, a name of a writer, a date, a mode (hand-written or printed), and a kind (report or paper), through the terminal 670.

Figure 30:
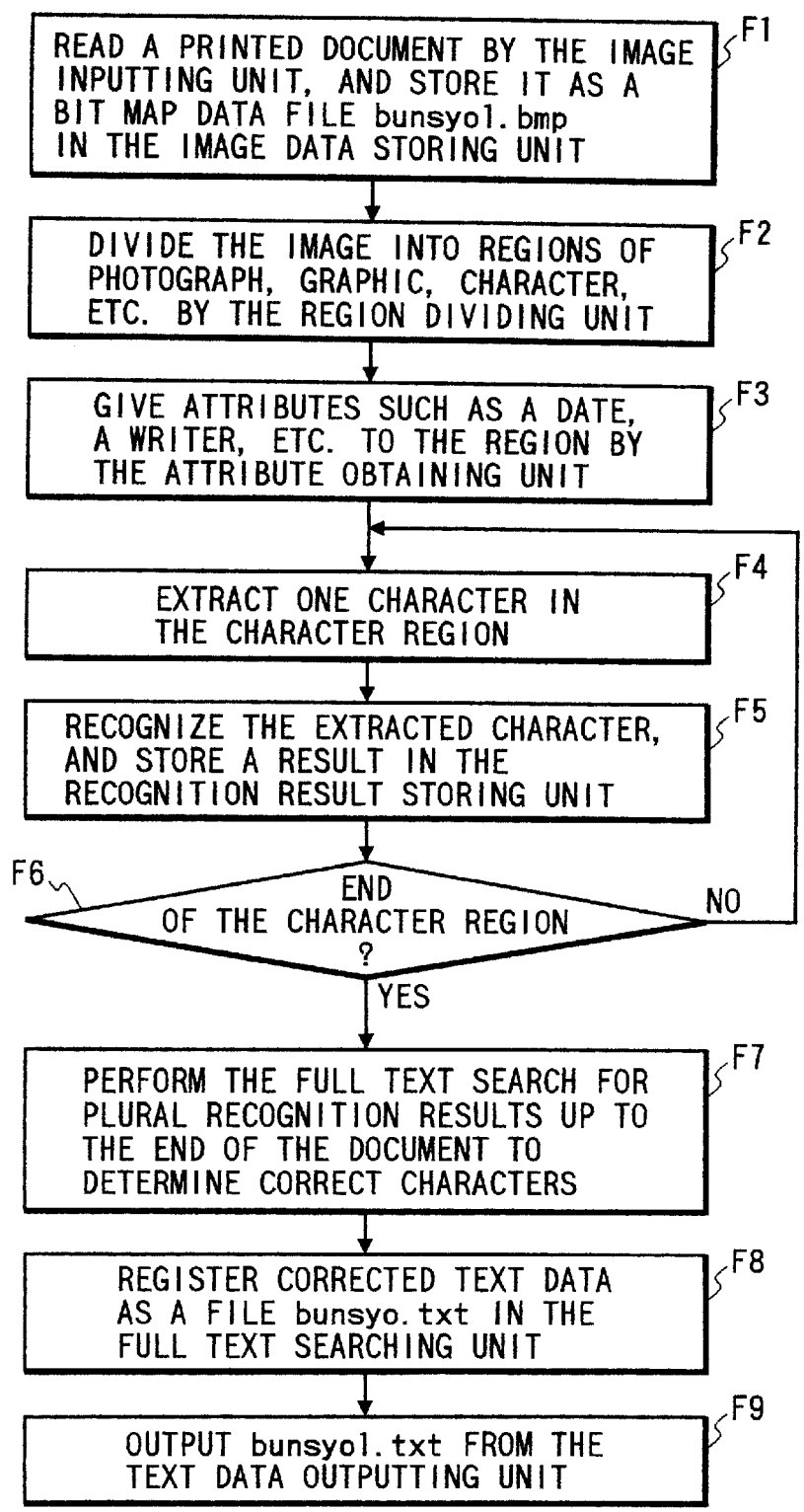
FIG. 30 is a flowchart illustrating a whole process conducted by the character recognizing apparatus according to the sixth embodiment.

Steps E4 through E6 in FIG. 30 are similar to Steps A3 through A5 in FIG. 2.

At Step E7, the post-processing unit 634 designates the attributes of the document when requesting the full text searching unit 640 to search, and responsive to the request, the full text searching unit 640 searches in text data having the attributes designated by the post-processing unit 634, dissimilarly to the process at Step A6 in FIG. 2. Other processes are similar to those according to the first embodiment.

FIG. 31 shows an example of a data structure of text data stored in the text data storing unit 680. The text data storing unit 680 stores text data of documents each having four attributes as to a date, a name of writer, a mode and a kind of the document. The index file storing unit 650 stores index files each made from the text data stored in the text data storing unit 680.

In the example shown in FIG. 31, if a document to be subjected to misrecognition correction was written in 1992, a name of writer of the document is Taro Matsushita, a mode of the document is printed and a kind of the document is paper, the post-processing unit 634 designates attributes of the documents, that is, 1992, Taro Matsushita, printed and paper when requesting the full text searching unit 640 to search. The full text searching unit 640 performs the full text search in only documents having the designated attributes, that is, bodies having the record number 4 and 6 in FIG. 31. After that, the post-processing unit 634 determines correct characters in a similar manner to the first embodiment. As a manner of designating the attributes, it is possible to designate several years before and after a date when the document was written, or only a writer, for example, depending on a characteristic of a document which is an object of character recognition.

The document in which misrecognized characters have been corrected is registered along with its attributes in the full text searching unit 640. The following processes are similar to those according to the first embodiment.

According to this embodiment, even if various documents, dates of which separates many years from each other, which have been written by a plurality of writers, for example, are mingled as database, it is possible to correct misrecognition reflecting a character of a document which is an object of character recognition since the character recognizing apparatus performs the full text search in documents having characters similar to that of the document which is the object of the character recognition.

Since correct characters can be obtained without searching a large volume of text data as above, it is possible to correct misrecognition within a short period.

Even if a large volume of documents are stored as the knowledge database, it is unnecessary to divide the knowledge database according to characteristic of the documents. Therefore, it is possible to configure the character recognizing apparatus without being conscious of the characters of the documents so that the system can be configured readily and within a short period.

In this embodiment, the user inputs attributes of a document which is an object of character recognition to the attribute obtaining unit 636. However, it is alternatively possible to automatically obtain the attributes from, for example, position information of a character region. The manner of obtaining attribute is not limited to the above example.

(g) Description of Seventh Embodiment

Now, description will be made of a seventh embodiment of this invention with reference to FIGS. 32 through 35. The seventh embodiment differs from the first embodiment in that a character string including misrecognition requested to be searched and a character string including a correct character obtained by the full text search are corresponded to each other to make misrecognition data, and the misrecognition data is registered in the full text searching unit after the misrecognition is corrected, so as to be also used in correcting another misrecognition after that.

Figure 32:
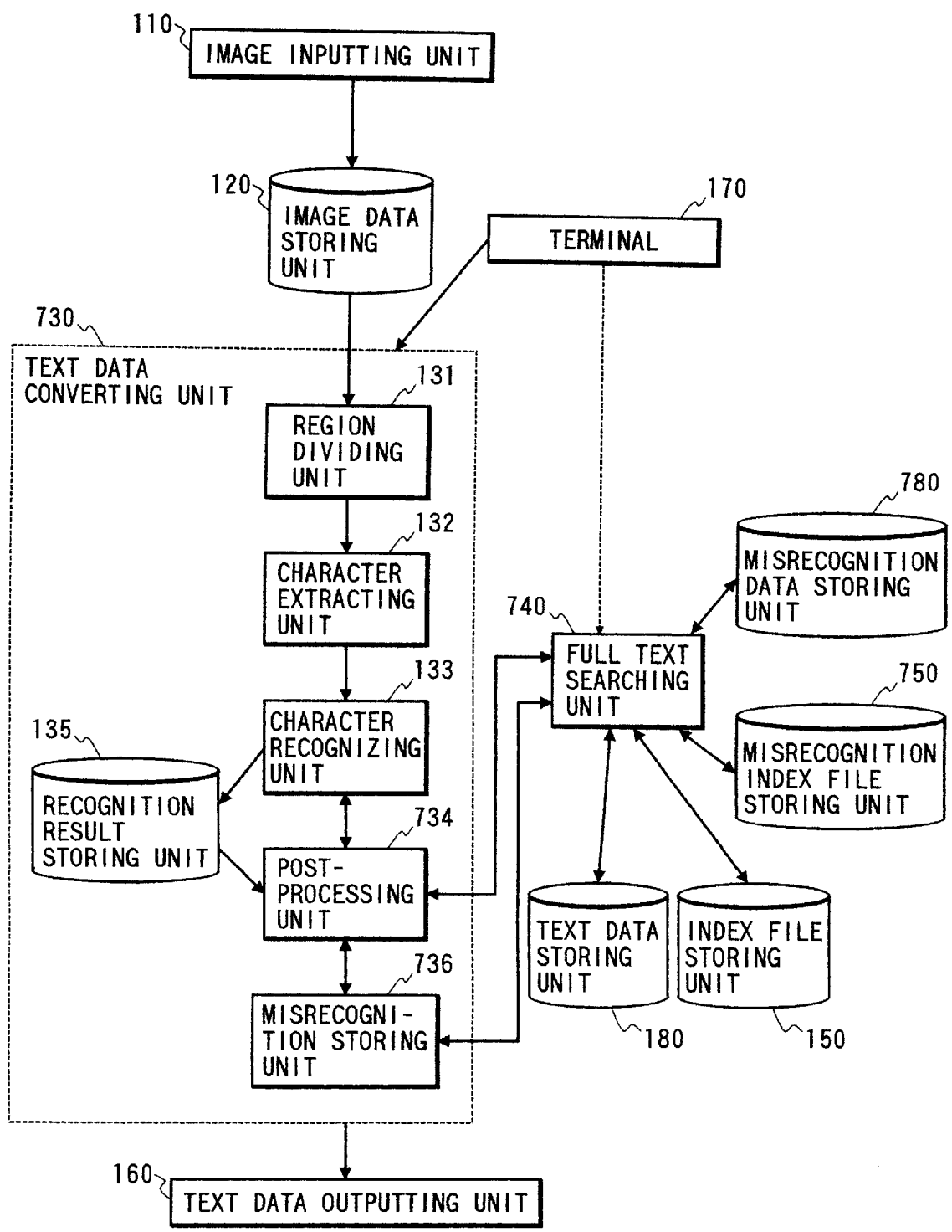
FIG. 32 is a block diagram showing a structure of a character recognizing apparatus according to a seventh embodiment of this invention.

FIG. 32 is a block diagram showing a character recognizing apparatus according to the seventh embodiment of this invention. The character recognizing apparatus shown in FIG. 32 has an image inputting unit 110, an image data storing unit 120, a text data converting unit 730 including a region dividing unit 131, a character extracting unit 132, a character recognizing unit 133, a post-processing unit 734 and a recognition result storing unit 135, a terminal 170, a whole text retrieving unit 740, a text data storing unit 180, an index file storing unit 150 and a text data outputting unit 160, which are similar to those of the character recognizing apparatus according to the first embodiment shown in FIG. 2. The character recognizing apparatus shown in FIG. 32 additionally has a misrecognition storing unit 736 in the text data converting unit 730 for registering misrecognition data made by corresponding a character string including a misrecognized character (hereinafter referred a misrecognized character string) used as a search character string when the misrecognized character is corrected by the post-processing unit 734 and a character string including a correct character (hereinafter referred a correct character string) in the full text searching unit 740, a misrecognized data storing unit 780 for storing the misrecognized data registered in the full text searching unit 740 in a form of file, and a misrecognition index file storing unit 750 for storing an index file made from the misrecognized data by the full text searching unit 740.

Figure 33:
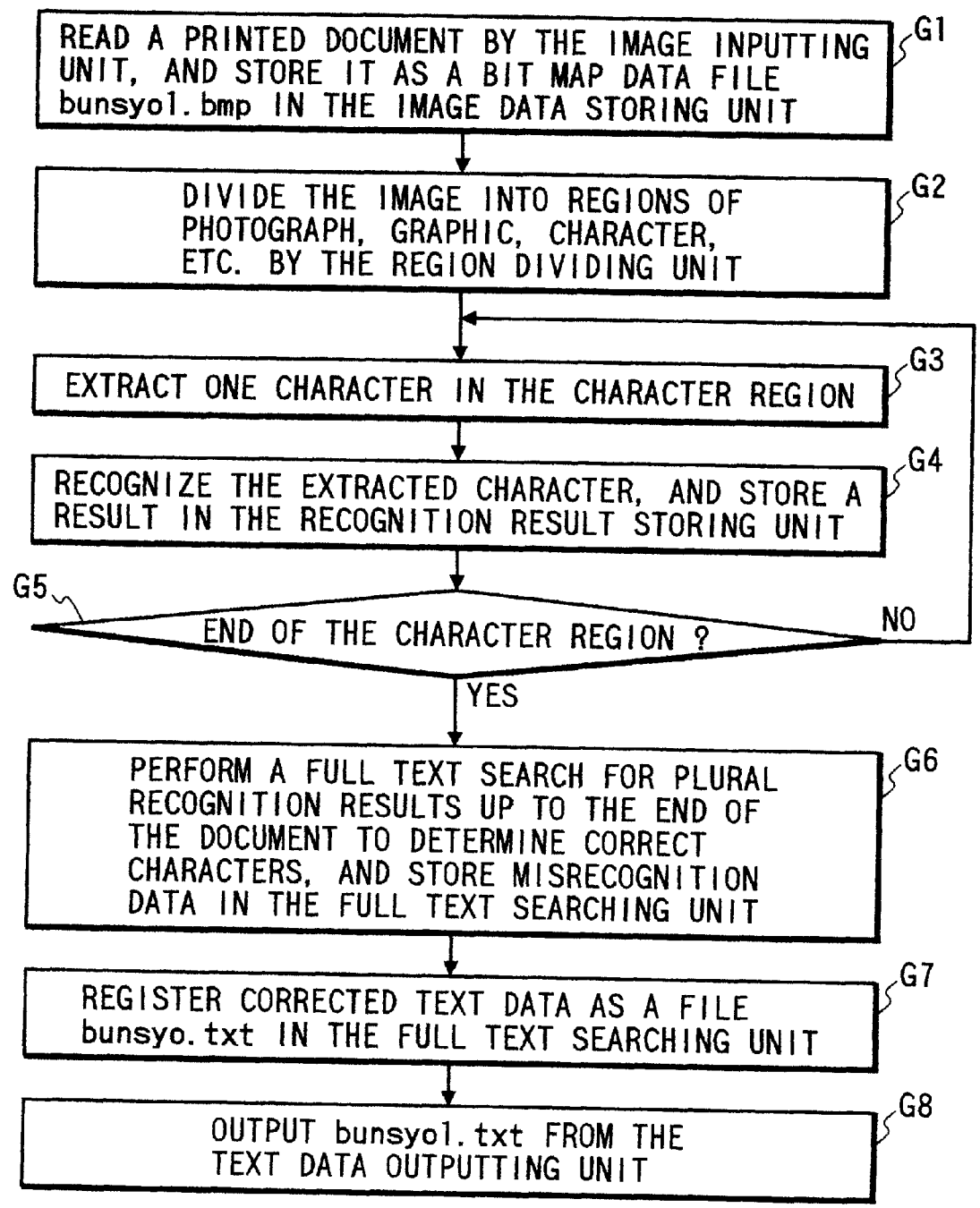
FIG. 33 is a flowchart illustrating a whole process conducted by the character recognizing apparatus according to the sixth embodiment.

Hereinafter, an operation of the character recognizing apparatus with the above structure according to the seventh embodiment will be described. FIG. 33 shows a flow of a whole process conducted by the apparatus. Processes at Steps G1 through G5 in FIG. 33 are similar to those at Steps A1 through A5 according to the first embodiment shown in FIG. 2.

Figure 34:
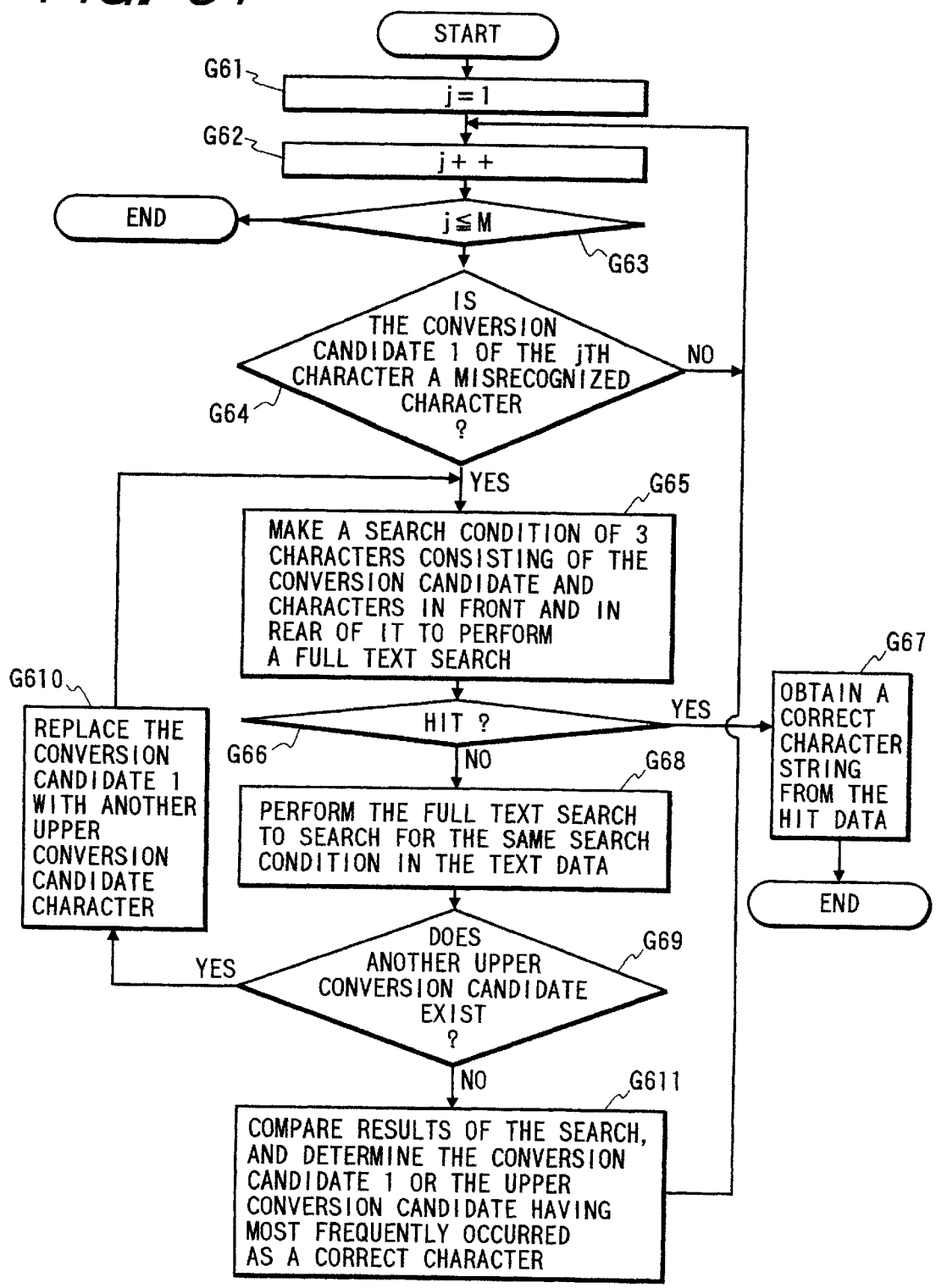
FIG. 34 is a flowchart illustrating a process of correcting a misrecognized character according to the sixth embodiment.

A process at Step G6 in FIG. 33 is shown in detail in FIG. 34. First, a misrecognized character is determined and a search condition is made, similarly to the first embodiment. The post-processing unit 734 requests the full text searching unit 740 to search for the search condition in the misrecognized data.

The full text searching unit 740 searches for the search condition in misrecognition character strings of the registered misrecognition data stored in the misrecognition data storing unit 780 by using an index file stored in the misrecognition index file storing unit 750, and if relevant data exists, the full text searching unit 740 sends back a correct character string of a record thereof as a result of the search to the post-processing unit 734. If no relevant data exists, the full text searching unit 740 replies to the post-processing unit 734 that there is no relevant data.

FIG. 35 shows a data structure of the misrecognition data stored in the misrecognition data storing unit 780. The full text searching unit 740 makes an index file from the misrecognition character strings of the misrecognition data in a manner similar to when the document data is registered according to the first embodiment.

When receiving a correct character string from the full text searching unit 740, the post-processing unit 734 determines the character string as being correct. When receiving a reply that there is not relevant data, the post-processing unit 734 requests the full text searching unit 740 to search in the text data. When no correct character can be obtained from a result of the search in the misrecognition data, the post-processing unit 734 requests the full text searching unit 740 to search for all retrieval conditions in the above two kinds of data, and compares results of the search similarly to the first embodiment to determine a correct character. When a correct character is determined in any manner, the post-processing unit 734 stores both the misrecognition character string used as the search condition to determine the correct character and a correct character string in the data structure shown in FIG. 35 in the misrecognition storing unit 736.

The misrecognition storing unit 736 registers the misrecognition data received from the post-processing unit 734 in the full text searching unit 740. The following processes are similar to the first embodiment.

According to this embodiment, data of a misrecognized character and a corresponding correct character is stored each time the misrecognized character is corrected, and misrecognition data in the past is also used as the knowledge database, whereby correction of misrecognition reflecting characteristics of the image inputting unit 110 is possible.

It is also possible to obtain a correct character by searching in the misrecognition data without searching in a large volume of text data so that correction of the misrecognition within a short period becomes possible.

Incidentally, it is alternatively possible to give attributes to a document as described in the sixth embodiment when the misrecognition data is searched, and search in the misrecognition data by designating the attributes.

(h) Description of Eighth Embodiment

Now, description will be made of an eighth embodiment of this invention with reference to FIGS. 36 through 40. The eighth embodiment differs from the first embodiment in that document data converted into text data is displayed in a layout looking like input image data when the document data is outputted.

Figure 36:
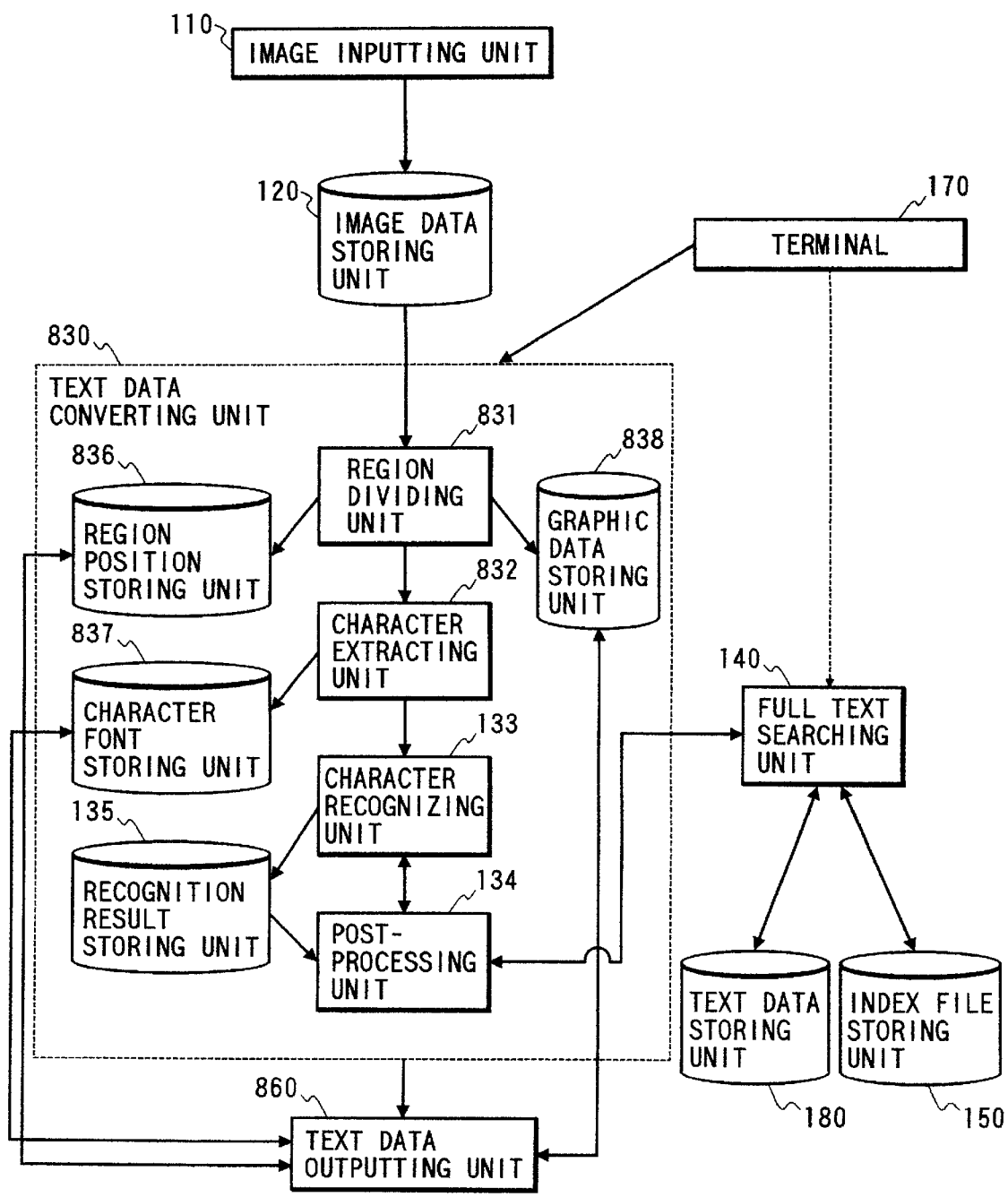
FIG. 36 is a block diagram showing a structure of a character recognizing apparatus according to an eighth embodiment of this invention.

FIG. 36 is a block diagram showing a structure of a character recognizing apparatus according to the eighth embodiment of this invention. The character recognizing apparatus shown in FIG. 36 has an image inputting unit 110, an image data storing unit 120, a text data converting unit 830 including a region dividing unit 831, a character extracting unit 832, a character recognizing unit 133, a post-processing unit 134 and a recognition result storing unit 135, a terminal 170, a full text searching unit 140, a text data storing unit 180, an index file storing unit 150 and a text data outputting unit 860, which are similar to those of the character recognizing apparatus according to the first embodiment shown in FIG. 1. However, the character recognizing apparatus shown in FIG. 36 additionally has, in the text data converting unit 830, a region position storing unit 836 for storing position information of each region when a region is divided by the region dividing unit 831, a graphic data storing unit 838 for storing data of, for example, drawings, photographs and the like other than character data, and a character font storing unit 837 for storing a font and position information of characters obtained by the character extracting unit 832.

Figure 37:
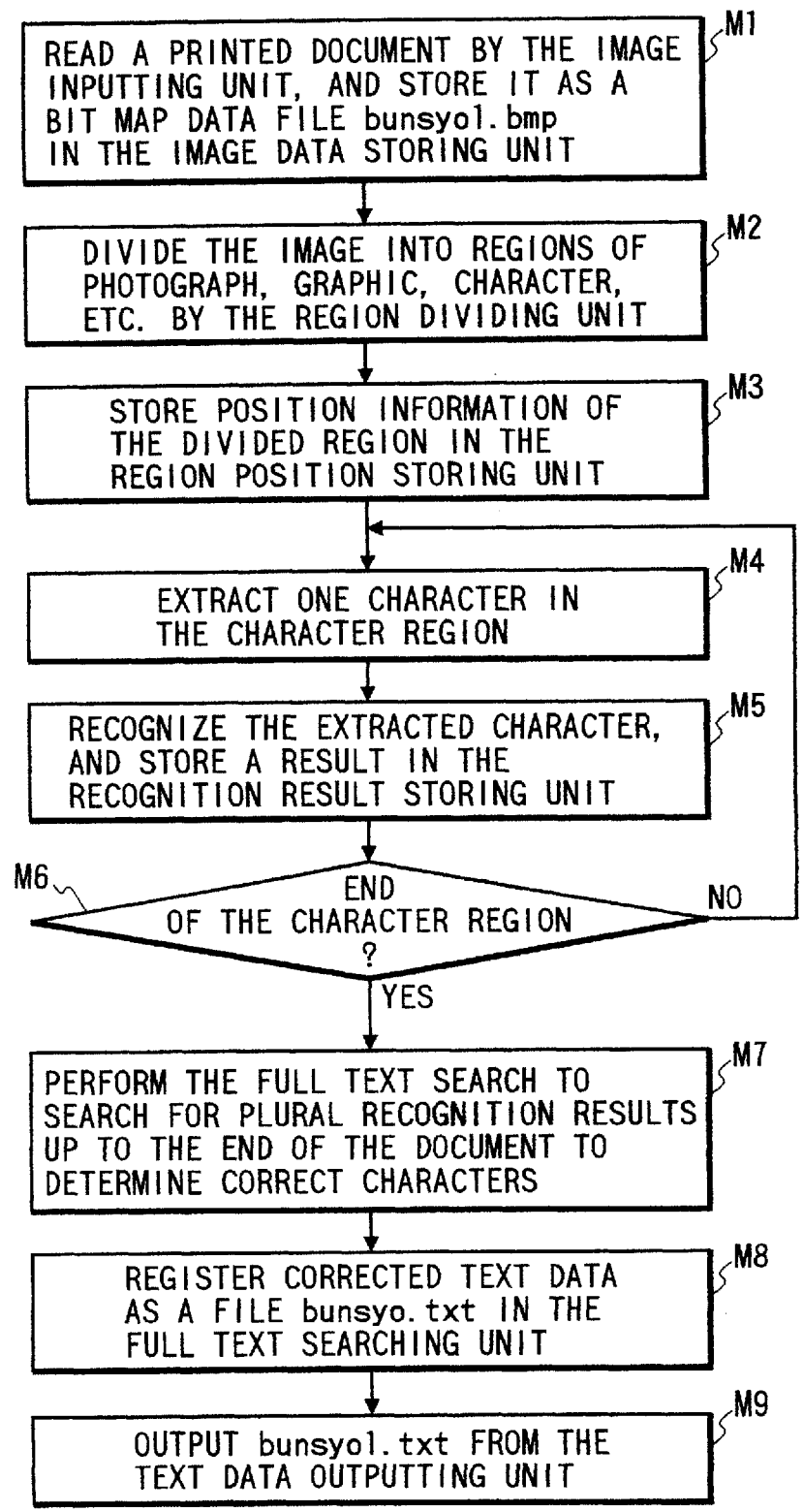
FIG. 37 is a flowchart illustrating a whole process conducted by the character recognizing apparatus according to the eighth embodiment.
Figure 38:
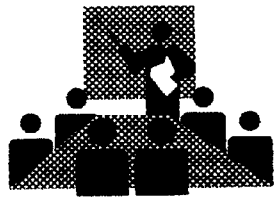
FIG. 38 shows an example of image data used in the eighth embodiment.
Figure 39:
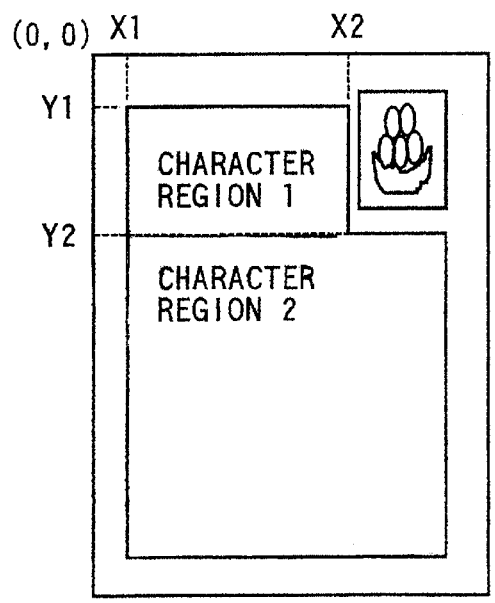
FIG. 39 shows a data structure of position information about regions according to the eighth embodiment.

Hereinafter, an operation of the character recognizing apparatus according to the eighth embodiment will be described. FIG. 37 shows a flow of a whole process conducted by the apparatus. Here is used a printed document, a size of which is readable in one operation by the image inputting unit 110, and in which a character region is separated from a graphic region as shown in FIG. 38.

Steps H1 and H2 in FIG. 37 are similar to Steps A1 and A2 according to the first embodiment shown in FIG. 2.

At Step H3 in FIG. 37, position information of each region divided at Step H2 is stored in the region position storing unit 836. More concretely, there are obtained a horizontal distance X1 and a vertical distance Y1 from an origin at the top left-hand corner of the paper to top left-hand corner of the region, and a horizontal distance X2 and a vertical distance from the origin to the bottom right-hand corner of the region expressed in cm. If the region is of character data, the obtained position information is labeled as NULL, whereas if the region is of graphic data, the obtained position information is given a file name of graphic data, and stored in the region position storing unit 836. Data of, for example, a picture, a photograph or the like other than character data is given a name zul.bmp, for example, in a form of file in the picture data storing unit 838.

Figure 40:
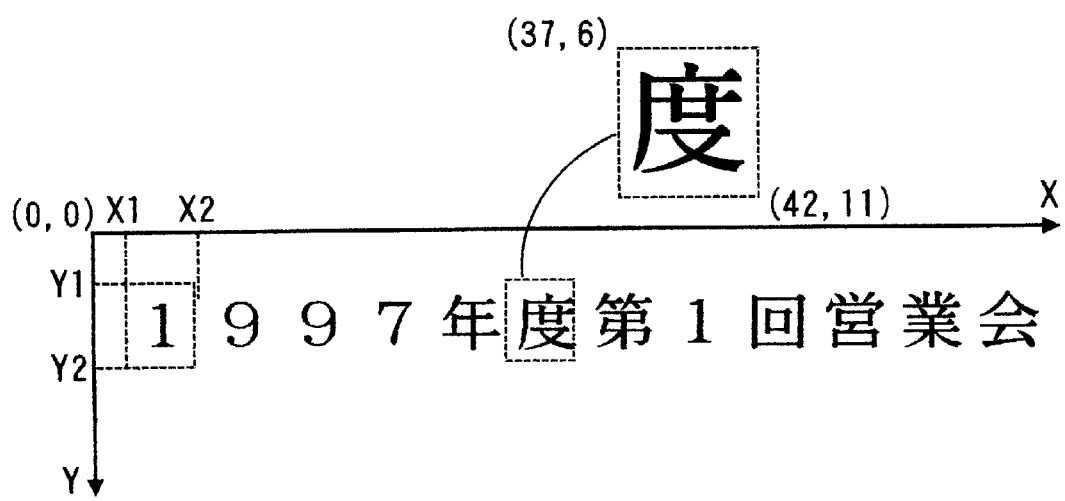
FIG. 40 shows a data structure of position information and font information of characters according to the eighth embodiment.

At Step H4, the character extracting unit 832 extracts a character in the character region similarly to Step A3 in FIG. 2, and stores position information of a horizontal distance X1 and a vertical distance Y1 from the origin at the top left-hand corner of the paper to the top left-hand corner of the character, and a horizontal distance X2 and a vertical distance Y2 from the origin to the bottom right-hand corner of the character expressed in cm along with a font of the character in the character font storing unit 837, as shown in FIG. 40, for example. Processes conducted at Steps H5 through H7 are similar to those at Steps A4 through A7 in FIG. 2.

At Step H9 in FIG. 37, the text data outputting unit 860 obtains the region position information from the region position storing unit 836, the graphic data form the graphic data storing unit 838 and the character font information from the character font storing unit 837 when outputting document data converted into text data, so arranges the graphic data and the document data on the basis of the obtained information that output data is displayed looking like the input data, and outputs the picture data and the document using characters of a size and a font similar to those of characters of the input data.

According to this embodiment, output data can be displayed in a layout looking like inputted image data so that the user can see easily the data. In addition, the outputted data is, not mere displayed imaged data, but text data, the user can edit the document so as to readily make a different document in a layout looking like a paper document.

(i) Description of Ninth Embodiment

Figure 41:
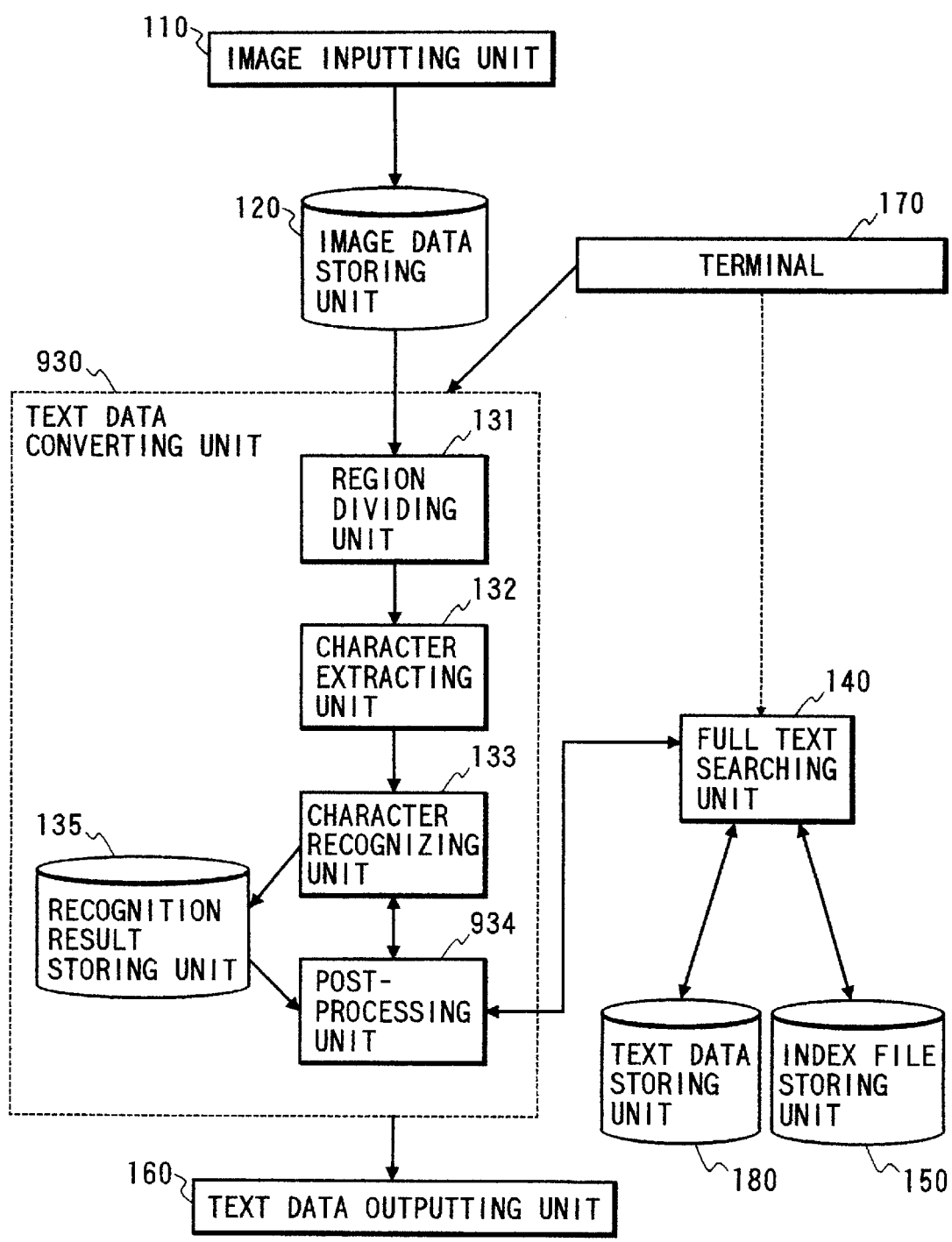
FIG. 41 is a block diagram showing a structure of a character recognizing apparatus according to a ninth embodiment of this invention.
Figure 45:
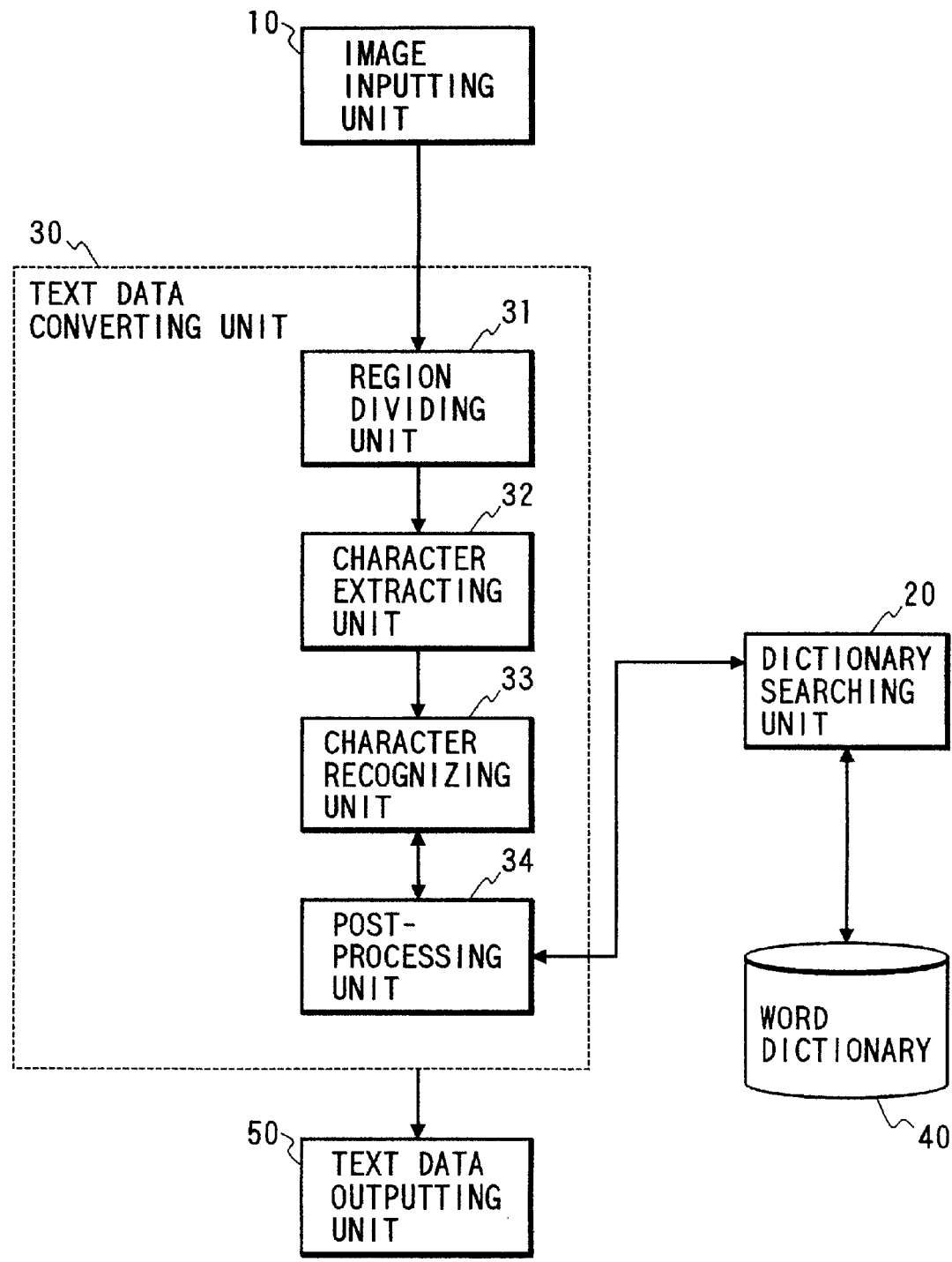
FIG. 45 is a block diagram showing a structure of a general character recognizing apparatus.

Now, description of ninth embodiment of this invention will be described with reference to FIGS. 41 through 44. FIG. 41 is a block diagram showing a structure of a character recognizing apparatus according to the ninth embodiment. The character recognizing apparatus shown in FIG. 41 has an image inputting unit 110, an image data storing unit 120, a text data converting unit 930 including a region dividing unit 131, a character extracting unit 132, a character recognizing unit 133, a post-processing unit 934 and a recognition result storing unit 135, a terminal 170, a full text searching unit 140, a text data storing unit 180, an index file storing unit 150 and a text data outputting unit 160, which are similar to those of the character recognizing apparatus according to the first embodiment shown in FIG. 1, excepting an operation of the post-processing unit 934 in the text data converting unit 930.

The ninth embodiment is characterized in that when the post-processing unit 934 corrects misrecognition of a document written in a language such as English, Hankul (Hangul) or the like other than Japanese in which a character string is written separated by a space or the like, a character string separated by a space, that is, a character string sandwiched between spaces, is used as a search character string.

Hereinafter, an operation of the character recognizing apparatus with the above structure according to the ninth embodiment will be described. FIG. 42 is a flowchart showing a flow of a whole operation conducted by the apparatus. Here is used a printed document in which a word is separated by spaces as done in English or Hunkul (Hngul) language. This embodiment will be described by way of an example where a document written in English language is used as shown in FIG. 43.

Processes at Steps I1 through I6 in FIG. 41 are similar to those at Steps A1 through A6 according to the first embodiment shown in FIG. 2. At Step I7, the post-processing unit 934 combines a misrecognized character determined at Step I6 and characters in the front and in the rear of the misrecognized character to make a search condition, as shown in FIG. 44. At that time, the post-processing unit 934 uses a character string including the misrecognized character sandwiched by spaces as a search condition, and requests the full text searching unit 140 to search for it. Further, the post-processing unit 934 replaces the misrecognized character with an upper conversion candidate character to make a search condition, and requests the full text searching unit 140 to search for it. When the upper conversion candidate letter is plural, the post-processing unit 934 requests the full text searching unit 140 to search for each of all search conditions including the respective upper conversion candidate letters. The following processes are similar to the first embodiment.

In this embodiment, spaces are used to discriminate a character string. However, it is alternatively possible to use periods, specific characters, control codes or symbols instead of spaces. This invention is not limited to the above example.

In this embodiment, a character string sandwiched by spaces is used as a search condition. However, it is alternatively possible to couple a plurality of character strings to use it as a search condition.

According to this embodiment, when misrecognition in a document written in a language such as English or Hunkul (Hangul) where a word is written separated by spaces, the character recognizing apparatus of this embodiment searches for a character string sandwiched by spaces as a search condition. Accordingly, it is possible to correct misrecognition according to characteristics of a language or a document by avoiding a meaningless character string which is a part of a word such as "harac" in a word "character", for example, whereby correction of misrecognition according to characteristics of a language or a document is possible.

What is claimed is:

1. A character recognizing method in which reference text data to be referred to character recognition and an index file of the reference text data are provided, the method comprising the steps of:

recognizing an input character image indicating an input character of an input document as one or more conversion candidate characters denoting candidates for the input character for each of input character images indicating input characters of the input document, the one or more conversion candidate characters each being composed of text data;

selecting a series of search character images indicating a series of search input characters from the series of input character images;

selecting a plurality of particular conversion candidate character strings respectively corresponding to the series of search character images from the particular conversion candidate characters;

searching the reference text data, by using a full text searching technique based on the index file of the reference text data, for one or more particular character strings respectively agreeing with one particular conversion candidate character string for each of the particular conversion candidate character strings to count the number of particular character strings as an occurrence frequency of the particular conversion candidate character string in the reference text data for each of the particular conversion candidate character strings;

selecting a specific particular conversion candidate character string corresponding to the highest occurrence frequency among those of the particular conversion candidate character strings from the particular conversion candidate character strings; and determining a series of specific particular conversion candidate characters composing the specific particular conversion candidate character string as a series of correct characters for the series of search character images.

2. A character recognizing method according to claim 1, in which the step of selecting a plurality of particular conversion candidate character strings comprises the steps of:

calculating an evaluation value indicating a degree of certainty of one conversion candidate character for each of the conversion candidate characters corresponding to the input character images;

selecting one or more specific conversion candidate characters corresponding to the evaluation values higher than those of the other conversion candidate characters from the conversion candidate characters corresponding to one input character image for each of the input character images;

repeatedly selecting one specific conversion candidate character from the specific conversion candidate characters corresponding to one search character image for each of the search character images to produce a plurality of specific conversion candidate character string respectively corresponding to the series of search character images; and setting each specific conversion candidate character string as one particular conversion candidate character string.

3. A character recognizing method according to claim 1, further comprising the steps of:

repeatedly selecting another series of search character images indicating another series of search input characters from the input character images; and determining the series of correct characters each time the series of search character images is selected from the input character images to recognize all input character images.

4. A character recognizing method according to claim 1, in which the number of particular conversion candidate characters in each particular conversion candidate character string is fixed.

5. A character recognizing method according to claim 1, in which the series of search character images is interposed between two punctuation marks in the input image data.

6. A character recognizing method according to claim 1, in which the search input characters are expressed by a character type selected from the group consisting of a Japanese Hiragana character type, a Japanese Katakana character type and a Kanji character type.

7. A character recognizing method according to claim 1, in which the step of searching the reference text data comprises the steps of searching the reference text data and the input document for one particular conversion candidate character string for each of the particular conversion candidate character strings to count an occurrence frequency of the particular conversion candidate character string in the reference text data and the input document for each of the particular conversion candidate character strings.

8. A character recognizing method according to claim 1, in which the step of recognizing an input character image includes the steps of specifying a plurality of character regions existing in the input document; and extracting each of the input character images from the character regions, the step of selecting a series of search character images includes the step of combining one or a series of particular input character images extracted from a final portion of one character region and one or a series of particular input character images extracted from a top portion of another character region into the series of search character images, for each pair of character regions, and the step of determining a series of specific particular conversion candidate characters includes the step of coupling a first character region and a second character region together in that order, in cases where one particular conversion candidate character string corresponding to one series of search character images obtained by combining one or a series of particular input character images extracted from a final portion of the first character region and one or a series of particular input character images extracted from a top portion of the second character region is selected as one specific particular conversion candidate character string, for each specific particular conversion candidate character string.

9. A character recognizing method according to claim 1, in which the step of searching the reference text data comprises the steps of selecting a plurality of shortened conversion candidate character strings corresponding to a series of search character images from the particular conversion candidate character strings;

searching the reference text data for one shortened conversion candidate character string for each of the shortened conversion candidate character strings to count an occurrence frequency of the shortened conversion candidate character string in the reference text data for each of the shortened conversion candidate character strings;

selecting a specific shortened conversion candidate character string corresponding to the highest occurrence frequency among those of the shortened conversion candidate character strings from the shortened conversion candidate character strings;

producing a plurality of particular conversion candidate character strings respectively including the specific shortened conversion candidate character string and corresponding to the series of search character images; and searching the reference text data for each particular conversion candidate character string to count an occurrence frequency of each particular conversion candidate character string in the reference text data.

10. A character recognizing method according to claim 1, in which the step of recognizing an input character image includes the steps of specifying an input attribute of the input document, classifying the reference text data into the plurality of registered documents respectively specified by a registered attribute, and wherein the step of searching the reference text data comprises the steps of selecting one or more particular registered documents respectively specified by the registered attribute, which is the same as the input attribute of the input document, from the registered documents and searching the particular registered documents for one particular conversion candidate character string for each of the particular conversion candidate character strings to count an occurrence frequency of the particular conversion candidate character string in the reference text data for each of the particular conversion candidate character strings.

11. A character recognizing method according to claim 1, comprising the further step of:

preparing misrecognition data respectively composed of a misrecognized character string including a misrecognized character and a correct character string made of a plurality of correct characters, and wherein the step of searching the reference text data comprises the steps of:

searching the misrecognized character strings of the misrecognition data for one particular conversion candidate character string for each of the particular conversion candidate character strings;

recognizing the series of search character images as a series of correct characters composing a correct character string corresponding to one particular conversion candidate character string in the misrecognition data in cases where the particular conversion candidate character string exists in the misrecognized character strings; and searching the reference text data for one particular conversion candidate character string for each of the particular conversion candidate character strings, in cases where any particular conversion candidate character string does not exist in the misrecognized character strings, to count an occurrence frequency of the particular conversion candidate character string in the reference text data for each of the particular conversion candidate character strings.

12. A character recognizing method according to claim 1, further comprising the steps of:

storing an input layout of the input character images of the input document; and displaying a corrected document, which is obtained by replacing the series of search character images of the input document with the series of correct characters, in the input layout of the input document.

13. A character recognizing method according to claim 1, in which the step of selecting a series of search character images comprises the steps of:

detecting a series of particular input character images sandwiched by a pair of partition symbols from the series of input character images of the input document; and setting the series of particular input character images as the series of search character images indicating the series search input characters.

14. A character recognizing method in which reference text data to be referred to character recognition and an index file of the reference text data are provided, the method comprising the steps of:

recognizing an input character image indicating an input character of an input document as one or more conversion candidate characters denoting candidates for the input character for each of input character images indicating input characters of the input document, the one or more conversion candidate characters each being composed of text data, the recognizing step including calculating an evaluation value indicating a degree of certainty of one conversion candidate character for each of the conversion candidate characters corresponding to the input character images;

selecting one or more particular conversion candidate characters corresponding to the evaluation values higher than those of the other conversion candidate characters from the conversion candidate characters corresponding to one input character image for each of the input character images;

selecting a series of search character images indicating a series of search input characters from the series of input character images;

selecting a plurality of particular conversion candidate character strings respectively corresponding to the series of search character images from the particular conversion candidate characters;

searching the reference text data, by using a full text searching technique based on the index file of the reference text data, for one or more particular character strings respectively agreeing with one particular conversion candidate character string for each of the particular conversion candidate character strings to select a specific particular conversion candidate character string occurring at the highest frequency in the reference text data from the particular conversion candidate character strings; and determining a series of specific particular conversion candidate characters composing the specific particular conversion candidate character string as a series of correct characters for the series of search character images.

15. A character recognizing method according to claim 14, in which the step of selecting one or more particular conversion candidate characters comprises the steps of:

specifying a highest evaluation value among the evaluation values of the conversion candidate characters corresponding to one input character image for each of the input character images;

determining a threshold value lower than the highest evaluation value by a prescribed value for each of the input character images;

and adopting one or more conversion candidate characters having the evaluation values equal to or higher than the threshold value as the particular conversion candidate characters for each of the input character images.

16. A character recognizing method according to claim 14, in which the step of selecting one or more particular conversion candidate characters includes the step of:

selecting one or more conversion candidate characters having the evaluation values equal to or higher than a threshold value as the particular conversion candidate characters for each of the input character images.

17. A character recognizing method according to claims 14, in which the step of selecting one or more particular conversion candidate characters comprises the steps of:

specifying a highest evaluation value among the evaluation values of the conversion candidate characters corresponding to one input character image for each of the input character mages;

determining a threshold value lower than the highest evaluation value by a prescribed value for each of the input character images;

adopting one or more conversion candidate characters having the evaluation values equal to or higher than the threshold value as the particular conversion candidate characters for each of the input character images; and judging the particular conversion candidate character having the highest evaluation value corresponding to one input character image as a misrecognized character, in cases where the plurality of particular conversion candidate characters corresponding to the input character image are adopted, for each of the input character images, and the step of selecting a series of search character images includes the step of:

selecting the series of search character images, respectively corresponding to the particular conversion candidate characters including the misrecognized character, from the input character images.

18. A character recognizing method according to claim 14, in which the step of selecting one or more particular conversion candidate characters includes the steps of:

adopting one or more conversion candidate characters having the evaluation values equal to or higher than a threshold value as the particular conversion candidate characters for each of the input character images; and judging the particular conversion candidate character having the highest evaluation value corresponding to one input character image as a misrecognized character, in cases where the plurality of particular conversion candidate characters corresponding to the input character image are adopted, for each of the input character images, and the step of selecting a series of search character images includes the step of:

selecting the series of search character images, respectively corresponding to the particular conversion candidate characters including the misrecognized character, from the input character images.

19. A character recognizing method according to claim 14, in which the step of searching the reference text data comprises the step of searching the reference text data and the input document for one particular conversion candidate character string for each of the particular conversion candidate character strings to select a specific particular conversion candidate character string occurring at the highest frequency in the reference text data and the input document from the particular conversion candidate character strings.

20. A character recognizing method according to claim 14, in which the step of searching the reference text data comprises the steps of searching the reference text data for one particular conversion candidate character string for each of the particular conversion candidate character strings to count a first occurrence frequency of the particular conversion candidate character string in the reference text data for each of the particular conversion candidate character strings;

determining a threshold value lower than the highest first occurrence frequency by a prescribed value;

selecting one or more first selected conversion candidate character strings corresponding to the first occurrence frequencies equal to or higher than the threshold value among those of the particular conversion candidate character strings from the particular conversion candidate character strings;

searching the input document for one first selected conversion candidate character string for each of the first selected conversion candidate character strings to count a second occurrence frequency of the first selected conversion candidate character string in the input document for each of the first selected conversion candidate character strings; and selecting a specific particular conversion candidate character string corresponding to the highest second occurrence frequency among those of the first selected conversion candidate character strings from the first selected conversion candidate character strings.

21. A character recognizing method according to claim 14, in which the step of recognizing an input character image includes the steps of determining a first character image position of one input character image in the input document; and extracting the input character image supposed to be placed at the first character image position from the input document, and the step of calculating an evaluation value includes the steps of again determining a second character image position of the input character image in cases where all evaluation values of the conversion candidate characters corresponding to the input character image supposed to be placed at the first character image position are lower than a threshold value;

again extracting the input character image supposed to be placed at the second character image position from the input document;

again recognizing the input character image placed at the second character image position as one or more conversion candidate characters; and again calculating an evaluation value of each conversion candidate character corresponding to the input character image placed at the second character image position.

22. A character recognizing method according to claim 14, in which the step of recognizing an input character image includes the steps of specifying a plurality of character regions existing in the input document; and extracting each of the input character images from the character regions, the step of selecting a series of search character images includes the step of combining one or a series of particular input character images extracted from a final portion of one character region and one or a series of particular input character images extracted from a top portion of another character region into the series of search character images, for each pair of character regions, and the step of determining a series of specific particular conversion candidate characters includes the step of coupling a first character region and a second character region together in that order, in cases where one particular conversion candidate character string corresponding to one series of search character images obtained by combining one or a series of particular input character images extracted from a final portion of the first character region and one or a series of particular input character images extracted from a top portion of the second character region is selected as one specific particular conversion candidate character string, for each specific particular conversion candidate character string.

23. A character recognizing method according to claim 14, in which the step of recognizing an input character image includes the step of specifying an input attribute of the input document, further comprising the step of classifying the reference text data into the plurality of registered documents respectively specified by a registered attribute, and wherein the step of searching the reference text data comprises the steps of selecting one or more particular registered documents respectively specified by the registered attribute, which is the same as the input attribute of the input document, from the registered documents; and searching the particular registered documents for one particular conversion candidate character string for each of the particular conversion candidate character strings to select a specific particular conversion candidate character string occurring at the highest frequency in the reference text data from the particular conversion candidate character strings.

24. A character recognizing method according to claim 14, comprising the further step of:

preparing misrecognition data respectively composed of a misrecognized character string including a misrecognized character and a correct character string made of a plurality of correct characters, and the step of searching the reference text data comprises the steps of:

searching the misrecognized character strings of the misrecognition data for one particular conversion candidate character string for each of the particular conversion candidate character strings;

recognizing the series of search character images as a series of correct characters composing a correct character string corresponding to one particular conversion candidate character string in the misrecognition data in cases where the particular conversion candidate character string exists in the misrecognized character strings; and searching the reference text data for one particular conversion candidate character string for each of the particular conversion candidate character strings, in cases where any particular conversion candidate character string does not exist in the misrecognized character strings, to select a specific particular conversion candidate character string frequently occurred in the reference text data from the particular conversion candidate character strings.

25. A character recognizing method according to claim 14, further comprising the steps of:

storing an input layout of the input character images of the input document; and displaying a corrected document, which i s obtained by replacing the series of search character images of the input document with the series of correct characters, in the input layout of the input document.

26. A character recognizing method according to claim 14, in which the step of selecting a series of search character images comprises the steps of:

detecting a series of particular input character images sandwiched by a pair of partition symbols from the series of input character images of the input document; and setting the series of particular input character images as the series of search character images indicating the series of search input characters.

27. A character recognizing apparatus, comprising:

character recognizing means for recognizing an input character image indicating an input character of an input document as one or more conversion candidate characters denoting candidates for the input character for each of input character images indicating input characters of the input document, the one or more conversion candidate characters each being composed of text data, selecting a series of search character images indicating a series of search input characters from the series of input character images and selecting a plurality of particular conversion candidate character strings respectively corresponding to the series of search character images from the particular conversion candidate characters;

reference text data storing means for storing reference text data indicating characters arranged in series in one or more registered documents and storing an index file of the reference text data;

full text searching means, using a full text searching technique based on the index file of the reference text data, for searching the reference text data stored by the reference text data storing means for one or more particular stored character strings respectively agreeing with one particular conversion candidate character string for each of the particular conversion candidate character strings recognized by the character recognizing means to count the number of particular stored character strings as an occurrence frequency of the particular conversion candidate character string in the reference text data for each of the particular conversion candidate character strings;

post-processing means for selecting a specific particular conversion candidate character string corresponding to the highest occurrence frequency among those of the particular conversion candidate character strings counted by the full text searching means from the particular conversion candidate character strings recognized by the character recognizing means, and determining a series of specific particular conversion candidate characters composing the specific particular conversion candidate character string as a series of correct characters for the series of search character images; and text data outputting means for outputting the series of correct characters determined by the post-processing means as the series of search character images.

28. A character recognizing apparatus according to claim 27, in which the reference text data and the input document are searched for one particular conversion candidate character string by the full text searching means for each of the particular conversion candidate character strings to count an occurrence frequency of the particular conversion candidate character string in the reference text data and the input document for each of the particular conversion candidate character strings.

29. A character recognizing apparatus according to claim 27, further comprising:

region dividing means for dividing the input document, in which a plurality of character regions are arranged in a particular order, into a plurality of regions of different attributes;

character extracting means for specifying the character regions existing in the particular order in the regions of the input document divided by the region dividing means and extracting each of the input character images from the character regions, each of the input character images extracted being recognized as the conversion candidate characters by the character recognizing means; and region coupling means for coupling the character regions extracted by the character extracting means together in the particular order, in cases where one particular conversion candidate character string corresponding to one series of search character images of one series of search input characters which extends over two or more character regions divided by the region dividing means is selected as one specific particular conversion candidate character string by the post-processing means.

30. A character recognizing apparatus according to claim 27, further comprising:

attribute obtaining means for obtaining an input attribute of the input document, wherein the reference text data stored by the text data storing means is classified into the plurality of registered documents respectively specified by a registered attribute, one or more particular registered documents respectively specified by the registered attribute, which is the same as the input attribute of the input document obtained by the attribute obtaining means, are selected from the registered documents by the character recognizing means, and the particular registered documents are searched for one particular conversion candidate character string for each of the particular conversion candidate character strings by the full text searching means to count an occurrence frequency of the particular conversion candidate character string in the reference text data for each of the particular conversion candidate character strings.

31. A character recognizing apparatus according to claim 27, further comprising:

misrecognition data storing means for storing misrecognition data respectively composed of a misrecognized character string including a misrecognized character and a correct character string made of a plurality of correct characters, wherein the misrecognized character strings of the misrecognition data stored by the misrecognition data storing means are searched for one particular conversion candidate character string by the full text searching means for each of the particular conversion candidate character strings, the series of search character images is recognized by the postprocessing means as a series of correct characters composing correct character string corresponding to one particular conversion candidate character string in the misrecognition data in cases where the particular conversion candidate character string exists in the misrecognized character strings of the misrecognition data, and the reference text data is searched for one particular conversion candidate character string by the full text searching means for each of the particular conversion candidate character strings, in cases where any particular conversion candidate character string does not exist in the misrecognized character strings of the misrecognition data, to count an occurrence frequency of the particular conversion candidate character string in the reference text data for each of the particular conversion candidate character strings.

32. A character recognizing apparatus according to claim 27, further comprising:

layout storing means for storing an input layout of the input character images of the input document recognized by the character recognizing means; and displaying means for displaying a corrected document, which is obtained by replacing the series of search character images of the input document selected by the character recognizing means with the series of correct characters determined by the post-processing means, in the input layout of the input document stored by the layout storing means.

33. A character recognizing apparatus according to claim 27, in which a series of particular input character images separated by a pair of partition symbols from a pair of input character images adjacent to the series of particular input character images is detected by the character recognizing means from the series of input character images of the input document, and the series of particular input character images is set as the series of search character images indicating the series of search input characters.

34. A character recognizing apparatus according to claim 33 in which the partition symbol is selected from the group consisting of a space, a period, a specific character, a specific symbol and a control code.

35. A character recognizing apparatus according to claim 27, in which an evaluation value indicating a degree of certainty of one conversion candidate character is calculated by the character recognizing means for each of the conversion candidate characters corresponding to the input character images, one or more specific conversion candidate characters corresponding to the evaluation values higher than those of the other conversion candidate characters are selected from the conversion candidate characters corresponding to one input character image by the character recognizing means for each of the input character images, one specific conversion candidate character from the specific conversion candidate characters corresponding to one search character image is repeatedly selected by the character recognizing means for each of the search character images to produce a plurality of specific conversion candidate character string respectively corresponding to the series of search character images, and each specific conversion candidate character string is set as one particular conversion candidate character string by the character recognizing means.

36. A character recognizing apparatus according to claim 27, further comprising:

region dividing means for dividing an area of the input document into a plurality of regions having different attributes; and character extracting means for specifying a character region divided by the region dividing means and extracting each of the input character images from the character region.

37. A character recognizing apparatus according to claim 27, in which a plurality of shortened conversion candidate character strings corresponding to a series of search character images is selected by the character recognizing means from the particular conversion candidate character strings, the reference text data is searched for one shortened conversion candidate character string by the full text searching means for each of the shortened conversion candidate character strings to count an occurrence frequency of the shortened conversion candidate character string in the reference text data for each of the shortened conversion candidate character strings, a specific shortened conversion candidate character string corresponding to the highest occurrence frequency among those of the shortened conversion candidate character strings is selected from the shortened conversion candidate character strings by the post-processing means, a plurality of particular conversion candidate character strings respectively including the specific shortened conversion candidate character string and corresponding to the series of search character images are produced by the character recognizing means, and the reference text data is searched for each particular conversion candidate character string by the full text searching means to count an occurrence frequency of each particular conversion candidate character string in the reference text data.

38. A character recognizing apparatus, comprising:

character recognizing means for recognizing an input character image indicating an input character of an input document as one or more conversion candidate characters denoting candidates for the input character for each of input character images indicating input characters of the input document, the one or more conversion candidate characters each being composed of text data, calculating an evaluation value indicating a degree of certainty of one conversion candidate character for each of the conversion candidate characters corresponding to the input character images, selecting one or more particular conversion candidate characters corresponding to the evaluation values higher than those of the other conversion candidate characters from the conversion candidate characters corresponding to one input character image for each of the input character images, selecting a series of search character images indicating a series of search input characters from the series of input character images, and selecting a plurality of particular conversion candidate character strings respectively corresponding to the series of search character images from the particular conversion candidate characters;

reference text data storing means for storing reference text data indicating characters arranged in series in one or more registered documents and storing an index file of the reference text data;

full text searching means, using the index file of the reference text data, for searching the reference text data stored by the reference text data storing means for one or more particular stored character strings respectively agreeing with one particular conversion candidate character string for each of the particular conversion candidate character strings produced by the character recognizing means to obtain a full text search result;

post-processing means for selecting a specific particular conversion candidate character string occurring at the highest frequency in the reference text data from the particular conversion candidate character strings according to the full text search result obtained by the full text searching means, and determining a series of specific particular conversion candidate characters composing the specific particular conversion candidate character string as a series of correct characters for the series of search character images; and text data outputting means for outputting the series of correct characters determined by the post-processing means as the series of search character images.

39. A character recognizing apparatus according to claim 38, in which the reference text data and the input document are searched for one particular conversion candidate character string by the full text searching means for each of the particular conversion candidate character strings to select a specific particular conversion candidate character string occurring at the highest frequency in the reference text data and the input document from the particular conversion candidate character strings.

40. A character recognizing apparatus according to claim 38, in which the reference text data is searched for one particular conversion candidate character string by the full text searching means for each of the particular conversion candidate character strings to count a first occurrence frequency of the particular conversion candidate character string in the reference text data for each of the particular conversion candidate character strings, the input document is searched for one particular conversion candidate character string by the full text searching means for each of the particular conversion candidate character strings to count a second occurrence frequency of the particular conversion candidate character string in the input document for each of the particular conversion candidate character strings, a threshold value lower than the highest first occurrence frequency by a prescribed value is determined by the post-processing means, one or more first selected conversion candidate character strings corresponding to the first occurrence frequencies equal to or higher than the threshold value are selected from the particular conversion candidate character strings by the post-processing means, and a specific particular conversion candidate character string corresponding to the highest second occurrence frequency is selected from the first selected conversion candidate character strings by the post-processing means.

41. A character recognizing apparatus according to claim 38, further comprising:

character extracting means for determining a first character image position of one input character image in the input document, extracting the input character image supposed to be placed at the first character image position from the input document, again determining a second character image position of the input character image in cases where all evaluation values of the conversion candidate characters corresponding to the input character image supposed to be placed at the first character image position are lower than a threshold value and again extracting the input character image supposed to be placed at the second character image position from the input document, wherein the input character image placed at the second character image position is again recognized as one or more conversion candidate characters by the character recognizing means, and an evaluation value of each conversion candidate character corresponding to the input character image placed at the second character image position is again calculated by the character recognizing means.

42. A character recognizing apparatus according to claim 38, further comprising:

character extracting means for specifying a plurality of character regions existing in the input document and extracting each of the input character images from the character regions, wherein one or a series of particular input character images extracted from a final portion of one character region and one or a series of particular input character images extracted from a top portion of another character region are combined into the series of search character images by the character recognizing means, for each pair of character regions; and region coupling means for coupling a first character region and a second character region extracted by the character extracting means together in that order, in cases where one particular conversion candidate character string corresponding to one series of search character images obtained by combining one or a series of particular input character images extracted from a final portion of the first character region and one or a series of particular input character images extracted from a top portion of the second character region is selected as one specific particular conversion candidate character string by the post-processing means, for each specific particular conversion candidate character string.

43. A character recognizing apparatus according to claim 38, further comprising:
attribute obtaining means for obtaining an input attribute of the input document, wherein the reference text data stored by the text data storing means is classified into the plurality of registered documents respectively specified by a registered attribute, one or more particular registered documents respectively specified by the registered attribute, which is the same as the input attribute of the input document obtained by the attribute obtaining means, are selected from the registered documents by the character recognizing means, and the particular registered documents are searched for one particular conversion candidate character string for each of the particular conversion candidate character strings by the full text searching means to obtain a full text search result.

44. A character recognizing apparatus according to claim 38, further comprising:
misrecognition data storing means for storing misrecognition data respectively composed of a misrecognized character string including a misrecognized character and a correct character string made of a plurality of correct characters,
wherein the misrecognized character strings of the misrecognition data stored by the misrecognition data storing means are searched for one particular conversion candidate character string by the full text searching means for each of the particular conversion candidate character strings, the series of search character images is recognized by the postprocessing means as a series of correct characters composing a correct character string corresponding to one particular conversion candidate character string in the misrecognition data in cases where the particular conversion candidate character string exists in the misrecognized character strings of the misrecognition data, and the reference text data is searched for one particular conversion candidate character string by the full text searching means for each of the particular conversion candidate character strings, in cases where any particular conversion candidate character string does not exist in the misrecognized character strings of the misrecognition data, to obtain a full text search result.

45. A character recognizing apparatus according to claim 38, further comprising: layout storing means for storing an input layout of the input character images of the input document recognized by the character recognizing means; and displaying means for displaying a corrected document, which is obtained by replacing the series of search character images of the input document selected by the character recognizing means with the series of correct characters determined by the post-processing means, in the input layout of the input document stored by the layout storing means.

46. A character recognizing apparatus according to claim 38, which a series of particular input character images separated by a pair of partition symbols from a pair of input character images adjacent to the series of particular input character images is detected by the character recognizing means from the series of input character images of the input document, and the series of particular input character images is set as the series of search character images indicating the series of search input characters.

47. A character recognizing apparatus according to claim 46 in which the partition symbol is selected from the group consisting of a space, a period, a specific character, a specific symbol and a control code.

48. A character recognizing apparatus according to claim 38, further comprising:
region dividing means for dividing an area of an input document into a plurality of regions having different attributes; and
character extracting means for specifying a character region divided by the region dividing means and extracting each of the input character images from the character region.

49. A character recognizing apparatus according to claim 38, in which a highest evaluation value among the evaluation values of the conversion candidate characters corresponding to one input character image is specified by the character recognizing means for each of the input character images, a threshold value lower than the highest evaluation value by a prescribed value is determined by the character recognizing means for each of the input character images, and one or more conversion candidate characters having the evaluation values equal to or higher than the threshold value are adopted as the particular conversion candidate characters by the character recognizing means for each of the input character images.

50. A character recognizing apparatus according to claim 38, in which one or more conversion candidate characters having the evaluation values equal to or higher than a threshold value are adopted as the particular conversion candidate characters by the character recognizing means for each of the input character images.

51. A character recognizing apparatus according to claim 38, in which a highest evaluation value among the evaluation values of the conversion candidate characters corresponding to one input character image is specified by the character recognizing means for each of the input character images, a threshold value lower than the highest evaluation value by a prescribed value is determined by the character recognizing means for each of the input character images, one or more conversion candidate characters having the evaluation values equal to or higher than the threshold value are adopted as the particular conversion candidate characters by the character recognizing means for each of the input character images, the particular conversion candidate character having the highest evaluation value corresponding to one input character image is judged as a misrecognized character by the character recognizing means, in cases where the plurality of particular conversion candidate characters corresponding to the input character image are adopted, for each of the input character images, and the series of search character images respectively corresponding to the particular conversion candidate characters including the misrecognized character are selected from the input character images by the character recognizing means.

52. A character recognizing apparatus according to claim 38, in which one or more conversion candidate characters having the evaluation values equal to or higher than a threshold value are adopted as the particular conversion candidate characters by the character recognizing means for each of the input character images, the particular conversion candidate character having the highest evaluation value corresponding to one input character image is judged as a misrecognized character by the character recognizing means, in cases where the plurality of particular conversion candidate characters corresponding to the input character image are adopted, for each of the input character images, and the series of search character images respectively corresponding to the particular conversion candidate characters including the misrecognized character are selected from the input character images by the character recognizing means.

53. A character recognizing method in which reference text data to be referred to character recognition and an index file of the reference text data are provided, comprising the steps of:

recognizing a character image provided so as to include a single character to be recognized as one or more conversion candidate characters for the character, the one or more conversion candidate characters each being composed of text data, and the character image being newly and repeatedly provided so that one or more conversion candidate characters are obtained for every character image;

producing a plurality of search character strings based on the one or more conversion candidate characters;

searching the reference text data, by using a full text search technique based on the index file of the reference text data, for each of the plurality of search character strings to provide an occurrence frequency of each of the search character strings included in the reference text data; and determining a character most appropriate for the character image by using the occurrence frequency of each of the search character strings.

54. A character recognizing method according to claim 53, wherein the producing step includes a first producing step and a second producing step, in which the first producing step is a step of producing the plurality of search character strings by combining one of the one or more conversion candidate characters for a first character with one of the one or more conversion candidate characters for a second character; and the second producing step includes the steps of receiving an occurrence frequency obtained responsively to the search character strings produced at the first producing step, removing any of the search character strings, having an occurrence frequency which is lower than a predetermined value, and producing again the plurality of search character strings by adding one of the one or more conversion candidate characters for a third character to remaining strings of the search character strings.

55. A character recognizing method according to claim 54, wherein the searching step includes a first search step and a second search step, in which the first search step is a step of searching the reference text data for the search character strings produced by the first producing step and providing information about the occurrence frequency to the second producing step; and the second search step is a step of searching the reference text data for the search character strings produced by the second producing step.

56. A character recognizing method according to claim 53, wherein the recognizing step includes calculating an evaluation value indicating a degree of certainty of each of the conversion candidate.

57. A character recognizing method according to claim 56, wherein the plurality of search character strings are changeable with regard to at least one of the number of characters and a type of characters.

58. A character recognizing method according to claim 56, wherein the plurality of search character strings comprise a fixed number of characters.

59. A character recognizing method according to claim 56, wherein the producing step includes the steps of:

determining whether or not one of the one or more conversion candidate characters, which is the highest in the occurrence frequency, is similar to others of one or more conversion candidate characters using the evaluation value and a threshold value thereof; and designating as a misrecognized character the character having the one of the one or more conversion candidate characters similar to the others of the one or more conversion candidate characters.

60. A character recognizing method according to claim 56, wherein the producing step is a step of producing the plurality of search character strings from the one or more conversion candidate characters using the evaluation value and a threshold value thereof set so as to distinguish a misrecognized character from the one or more conversion candidate characters.

61. A character recognizing method according to claim 60, wherein the step of determining the correct character includes the steps of:

comparing the occurrence frequency of each of the plurality of search character strings with each other;

selecting one of the plurality of search character strings, which has a highest value of the occurrence frequency, from the plurality of search character strings; and obtaining the correct character from the one of the plurality of search character strings.

62. A character recognizing method according to claim 61, further comprising a step of correcting the misrecognized character with the correct character.

63. A character recognizing method according to claim 53, wherein the reference text data comprise chain information of characters which constitute a word and function as a knowledge database.

64. A character recognizing method according to claim 53, wherein the searching step includes the step of searching, in a full text search technique, the text data of the one or more conversion candidate characters for each of the plurality of search character strings.

65. A character recognizing method according to claim 53, further comprising the steps of:

providing a document including a character region including the character image to be recognized;

dividing the character region from the document; and extracting the character image of every character from the character region, and providing the extracted character to the recognizing step.

66. A character recognizing method according to claim 65, wherein the searching step includes the step of instructing the extracting step to re-extract the characters one by one from the character region.

67. A character recognizing method according to claim 65, further comprising the step of recombining the correct characters of the character regions using a search for a character string connecting the correct character at an end of one region to the correct character at an end of another region.

68. A character recognizing apparatus, in which reference text data to be referred to character recognition and an index file of the reference text data are provided, comprising:

recognizing means for recognizing a character image provided so as to include a single character to be recognized as one or more conversion candidate characters for the character, the one or more conversion candidate characters each being composed of text data;

producing means for producing a plurality of search character strings based on the one or more conversion candidate characters;

searching means for searching the reference text data, by using a full text search technique based on the index file of the reference text data, for each of the plurality of search character strings to provide an occurrence frequency of each of the search character strings included in the reference text data: and determining means for determining a character most appropriate for the character image by using the occurrence frequency of each of the search character strings.

* * * * *